(12) United States Patent
Araki et al.

(10) Patent No.: US 9,223,403 B2
(45) Date of Patent: Dec. 29, 2015

(54) TACTILE INPUT AND OUTPUT DEVICE

(71) Applicant: PANASONIC CORPORATION, Osaka (JP)

(72) Inventors: Shoichi Araki, Osaka (JP); Yoshifumi Hirose, Kyoto (JP); Kenji Fujiune, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 161 days.

(21) Appl. No.: 13/827,680

(22) Filed: Mar. 14, 2013

(65) Prior Publication Data

US 2014/0168110 A1 Jun. 19, 2014

Related U.S. Application Data

(60) Provisional application No. 61/739,125, filed on Dec. 19, 2012.

(51) Int. Cl.
*G06F 3/01* (2006.01)
*G06F 3/041* (2006.01)

(52) U.S. Cl.
CPC ............ *G06F 3/016* (2013.01); *G06F 3/041* (2013.01); *G06F 2203/014* (2013.01)

(58) Field of Classification Search
CPC ....... G06F 3/016; G06F 3/041; G06F 3/0412; G06F 3/0414; G06F 3/044; G06F 3/0488; G06F 3/04886; G06F 3/03547; G06F 3/045; G06F 3/0416; H01H 13/85; H01L 41/09
See application file for complete search history.

(56) References Cited

U.S. PATENT DOCUMENTS

| | | |
|---|---|---|
| 8,232,969 B2 | 7/2012 | Grant et al. |
| 8,264,465 B2 | 9/2012 | Grant et al. |
| 2006/0109256 A1 | 5/2006 | Grant et al. |
| 2006/0119586 A1 | 6/2006 | Grant et al. |
| 2009/0002328 A1 | 1/2009 | Ullrich et al. |
| 2010/0156818 A1* | 6/2010 | Burrough et al. ............. 345/173 |
| 2011/0072345 A1* | 3/2011 | Lim ............................. 715/702 |
| 2011/0202880 A1 | 8/2011 | Kawana et al. |
| 2011/0234503 A1* | 9/2011 | Fitzmaurice et al. ......... 345/173 |
| 2011/0285653 A1 | 11/2011 | Kojima |
| 2011/0285667 A1* | 11/2011 | Poupyrev et al. ............. 345/174 |
| 2012/0075221 A1 | 3/2012 | Yasuda |

(Continued)

FOREIGN PATENT DOCUMENTS

| | | |
|---|---|---|
| JP | 2005-266992 | 9/2005 |
| JP | 3888099 | 2/2007 |

(Continued)

*Primary Examiner* — Nalini Mummalaneni
(74) *Attorney, Agent, or Firm* — Wenderoth, Lind & Ponack, L.L.P.

(57) ABSTRACT

A tactile input and output device includes: a panel; a touch information obtaining unit obtaining touch positions; an order input determining unit determining setting information; a vibration position determining unit determining a first touch position and a second touch position, the first touch position observed in a spatial order, and corresponding to the determined setting information, and the second touch position being another one of the touch positions than the first touch position; and a multi-point simultaneous vibration control unit controlling the vibration on the panel to provide a predetermined vibration to the first touch position and provide no predetermined vibration to the second touch position.

4 Claims, 31 Drawing Sheets

(56) References Cited

U.S. PATENT DOCUMENTS

| | | |
|---|---|---|
| 2012/0268386 A1 | 10/2012 | Karamath et al. |
| 2012/0299857 A1 | 11/2012 | Grant et al. |
| 2013/0147738 A1* | 6/2013 | Lee et al. .................. 345/173 |

FOREIGN PATENT DOCUMENTS

| | | |
|---|---|---|
| JP | 2008-15584 | 1/2008 |
| JP | 2010-55282 | 3/2010 |
| JP | 2010-532043 | 9/2010 |
| JP | 2011-54196 | 3/2011 |
| JP | 2011-150467 | 8/2011 |
| JP | 2011-170523 | 9/2011 |
| JP | 2011-248400 | 12/2011 |
| JP | 2012-69042 | 4/2012 |
| JP | 2012-226743 | 11/2012 |
| WO | 2009/002605 | 12/2009 |

* cited by examiner

FIG. 3

| Input determination | Number of touches | Setting item | Spatial order of touch positions | Input item | Increase or decrease level of setting value | Setting value |
|---|---|---|---|---|---|---|
| [1] | 1 | Content item selection | First touch position in order | Touch position coordinates | Touch position coordinates | Coordinates of selection displaying frame |
| [2] | 2 | Volume setting | First touch position in order | Volume down | $\Delta V = -1$ | Volume level [0, 49] $V = V + \Delta V$ 15 |
| [3] | | | Second touch position in order | Volume up | $\Delta V = +1$ | |
| [4] | 3 | Play setting | First touch position in order | Rewind | +1 | Rewind speed [0, 4] 0 |
| [5] | | | Second touch position in order | Play (1)/Pause (2) | NULL | [0, 2] 0 |
| [6] | | | Third touch position in order | Fast-forward | +1 | Fast-forward speed [0, 4] 2 |

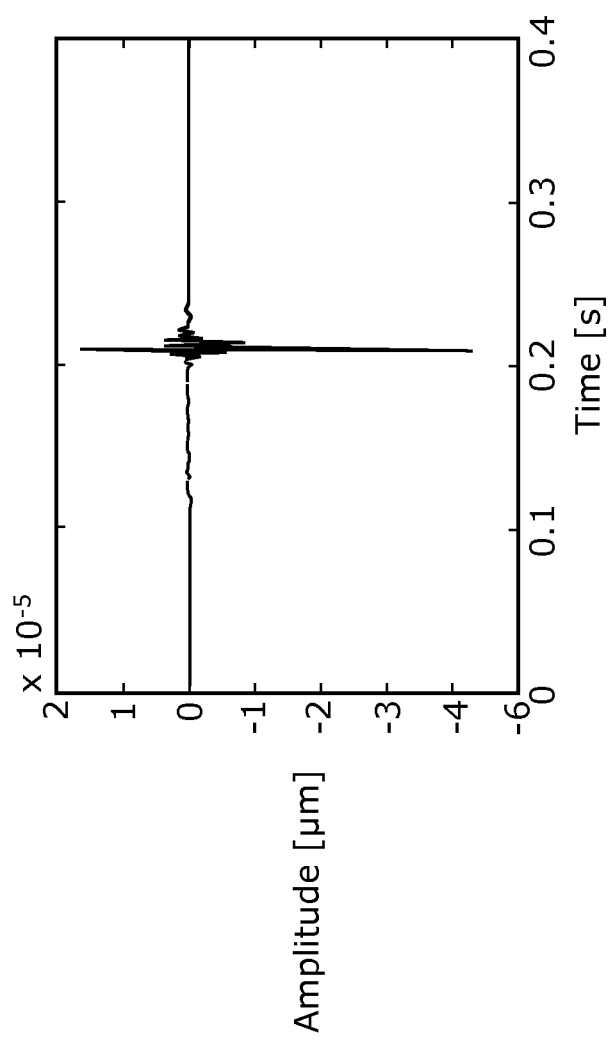

FIG. 18

| Input determination | Number of touches | Setting item | Spatial order (First touch position) | Shifting direction | Shifting distance | Stopping time period | Input item | Increase or decrease level of setting value | Setting value |
|---|---|---|---|---|---|---|---|---|---|
| [1] | 1 | Map scrolling | First touch position in order | v1 | \|v1\| | NULL | Shifting distance scrolling | v1 | Display reference coordinates for map −v1 |
| [2] | | | First touch position in order | v1 | Greater than or equal to D | Greater than or equal to $T^s$ | Continuous scrolling | D | Display reference coordinates for map at predetermined time interval −αv1 |
| [3] | 2 | Volume setting | First touch position in order | NULL | NULL | NULL | Volume down | $\Delta V = -1$ | Volume level $V = V + \Delta V$ |
| [4] | | | First touch position in order | NULL | NULL | Greater than or equal to $T^s$ | Continuous volume down | $\Delta V = -1$ | $V = V + \Delta V$ for each volume level $T^s$ |
| [5] | | | Second touch position in order | NULL | NULL | NULL | Volume up | $\Delta V = +1$ | Volume level $V = V + \Delta V$ |
| [6] | | | Second touch position in order | NULL | NULL | Greater than or equal to $T^s$ | Continuous volume up | $\Delta V = +1$ | $V = V + \Delta V$ for each volume level $T^s$ |
| [7] | 2 | Track setting | Starting touch position with respect to shifting direction | Shifting direction v1 and v2 are same and negative on predetermined coordinate axis | Greater than or equal to D | NULL | Track down | $\Delta Nt = -1$ | Track number $Nt = Nt + \Delta Nt$ |
| [8] | | | Starting touch position with respect to shifting direction | Shifting direction v1 and v2 are same and negative on predetermined coordinate axis | Greater than or equal to D | Greater than or equal to $T^s$ | Continuous track down | $\Delta Nt = -1$ | $Nt = Nt + \Delta Nt$ for each track number $T^s$ |
| [9] | | | Starting touch position with respect to shifting direction | Shifting direction v1 and v2 are same and positive on predetermined coordinate axis | Greater than or equal to D | NULL | Track up | $\Delta Nt = +1$ | Track number $Nt = Nt + \Delta Nt$ |
| [10] | | | Starting touch position with respect to shifting direction | Shifting direction v1 and v2 are same and positive on predetermined coordinate axis | Greater than or equal to D | Greater than or equal to $T^s$ | Continuous track up | $\Delta Nt = +1$ | $Nt = Nt + \Delta Nt$ for each track number $T^s$ |

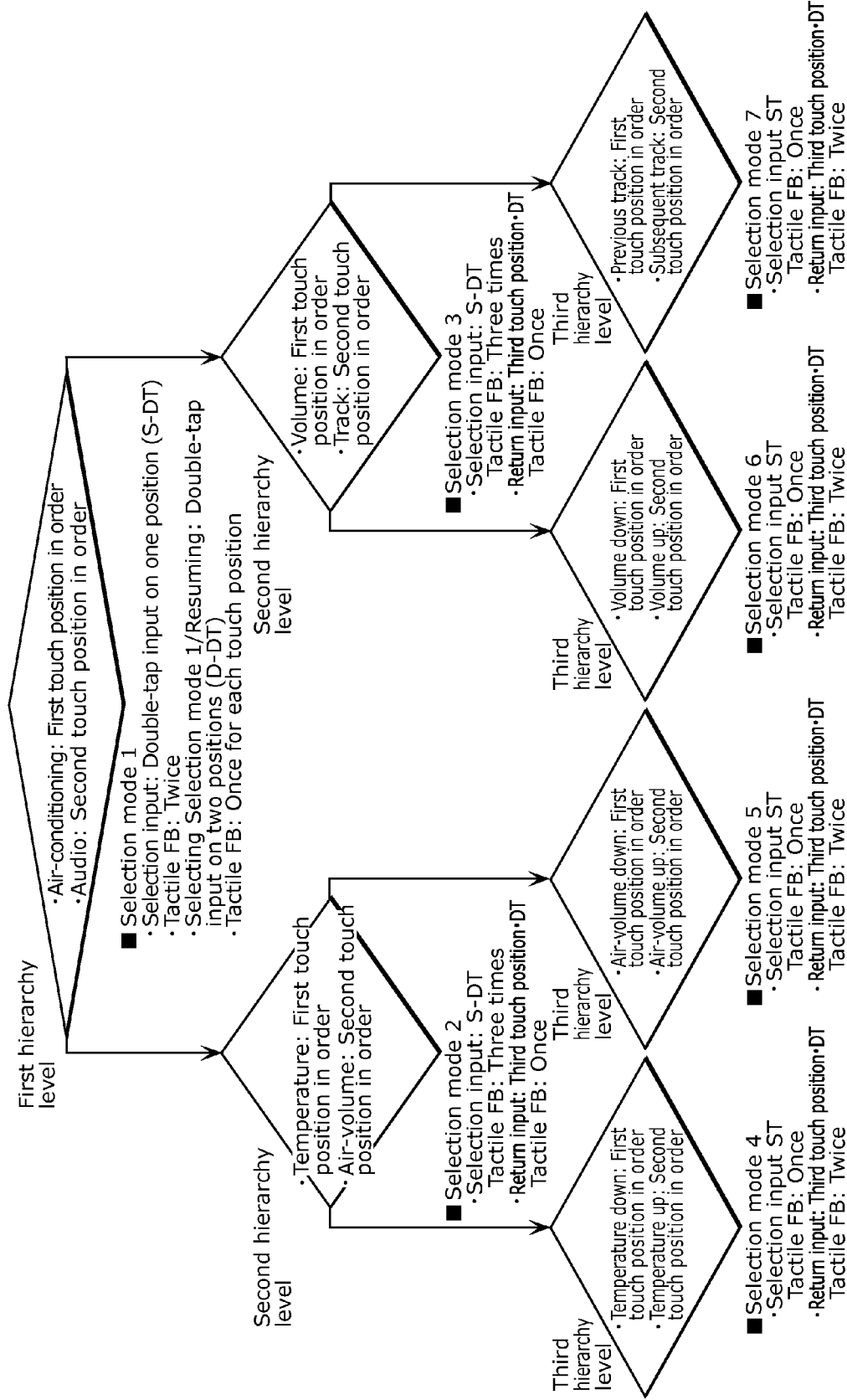

TACTILE INPUT AND OUTPUT DEVICE

CROSS REFERENCE TO RELATED APPLICATION

The present application claims the benefit of U.S. Provisional Patent Application No. 61/739,125 filed on Dec. 19, 2012. The entire disclosure of the above-identified application, including the specification, drawings and claims is incorporated herein by reference in its entirety.

FIELD

The present disclosure relates to a technique to notify a user of reception of his or her input by a touch operation through a vibration of a panel capable of detecting a touch position, when the touch operation is performed on the panel. In particular, the present disclosure relates to a tactile input and output device and an electronic device which, when the user performs the touch operation with two or more fingers, inform the user of the reception of an input by simultaneously providing a different vibration to each of the fingers.

BACKGROUND

In recent years, touch panels and touch pads are included in various devices, such as smart phones, tablet computers, car navigation systems, personal computers, games, ATMs, and ticket machines. Such devices detect a position where a user touches on a touch panel, and the user operates a graphical user interface (GUI) displayed at the touch position. In general, the touch panel is different from a mechanical button switch in that, when the user operates a GUI, the touch panel cannot give him or her a sense of tactile feeling which comes when he or she presses the button switch. One of implemented techniques causes a touch panel to vibrate when he or she operates a GUI, and let the user recognize the input result using the vibration.

Patent Literature discloses how to provide information tactually to a fingertip of a user touching a touch panel utilizing a vibration pattern generated by the vibration of the touch panel, and how to guide the touching fingertip to a predetermined button position displayed on the touch panel.

CITATION LIST

Patent Literature

Japanese Patent No. 3888099

SUMMARY

Technical Problem

Patent Literature discloses how to provide information tactually to a fingertip of a user touching a touch panel utilizing a vibration pattern, and how to guide the touching fingertip to a predetermined button position displayed on the touch panel.

The techniques in Patent Literature, however, have a problem in that the user cannot perform quick input operations since the finger should be guided to the position of a button to be operated. One non-limiting and exemplary embodiment provides a tactile input and output device which allows a user to check the result of a user input with the vibration of a panel.

Solution to Problem

A tactile input and output device according to an aspect of the present disclosure includes: a panel which generates a vibration and provides an output; actuators each of which is provided to a different position on the panel and vibrates the panel; a touch information obtaining unit which obtains touch positions which are simultaneously detected at positions on the panel; a setting information storage unit which stores pieces of setting information, to be inputted through the touch input, in association with a spatial order of the touch positions; an order input determining unit which (i) calculates, based on time-series information of the touch positions which are simultaneously detected on the panel, a spatial order indicating a spatial relationship among the touch positions, and (ii) compares the calculated spatial order with the stored spatial order and determine one of the pieces of the setting information corresponding to the spatial order; a vibration position determining unit which determines a first touch position and a second touch position among the touch positions, the first touch position corresponding to the determined one piece of the setting information and the second touch position being another one of the touch positions than the first touch position; and a multi-point simultaneous vibration control unit which calculates, for each of the actuators, a drive signal that provides a predetermined vibration to the first touch position and provides no predetermined vibration to the second touch position, and drives each of the actuators based on the calculated drive signal to simultaneously control the vibration on the panel for each of the touch positions.

The general and specific aspects of the above structure may be implemented in the form of a system, a method, an integrated circuit, a computer program, a computer-readable recording medium such as a CD-ROM or a storage device, or any combination of systems, methods, integrated circuits, computer programs, computer-readable recording media, or a storage device Additional benefits and advantages of the disclosed embodiments will be apparent from the Specification and Drawings. The benefits and/or advantages may be individually obtained by the various embodiments and features of the Specification and Drawings. Not all the benefits and/or advantages are required just because of one or more of such benefits and/or advantages.

Advantageous Effects

One of the advantageous effects of a tactile input and output device according to an implementation of the present disclosure is to control which touch position of a user is to receive a vibration, and to let the user appropriately check setting information received by the user.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 shows exemplary setting information to be used for the tactile input and output device according to Embodiment 1.

FIG. 10D shows an exemplary impulse response calculated from a TSP response.

FIG. 18 shows exemplary setting information to be used for the tactile input and output device according to Embodiment 2.

FIG. 23 shows an example of hierarchy setting information.

DESCRIPTION OF EMBODIMENTS

Figure 1:
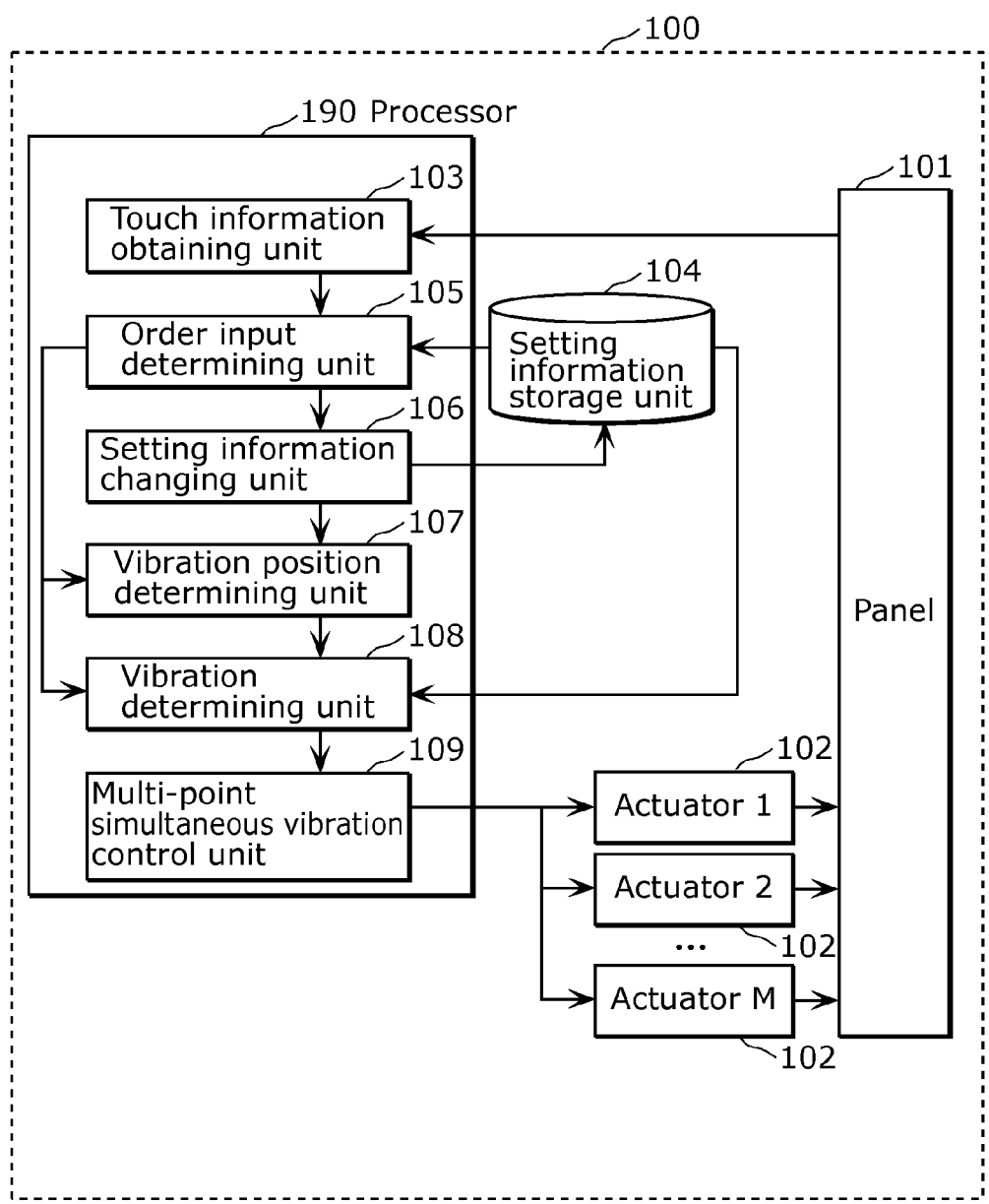
FIG. 1 depicts a block diagram showing a structure of a tactile input and output device according to Embodiment 1.

In order to solve the aforementioned problems, a touch panel controlling method according to an aspect of the present disclosure includes: detecting at least two inputs which are performed on or near a surface of a touch panel with a multi-touch technique and include a first touch input and a second touch input; detecting a first position at which the first touch input is performed, and a second position at which the second touch input is performed; determining a detection order in which the first touch input and the second touch input are detected; selecting and executing a designated operation based on the detection order and a positional relationship between the first position and the second position; and vibrating one of an area including the first position and an area including the second position, the one vibrating area corresponding to a more recently detected one of the first touch input and the second touch input.

Such features of the method make it possible to control which touch position of the user is to receive a vibration. Hence, the user can easily check which setting information inputted with his or her touch input has been received by the device.

A touch panel controlling device according to an aspect of the present disclosure includes: a touch panel for a multi-touch input; actuators; and a processor, wherein the processor: detects at least two inputs which are performed on or near a surface of a touch panel with a multi-touch technique and include a first touch input and a second touch input; detects a first position at which the first touch input is performed, and a second position at which the second touch input is performed; determines a detection order in which the first touch input and the second touch input are detected; selects and executes a designated operation based on the detection order and a positional relationship between the first position and the second position; and vibrates one of an area including the first position and an area including the second position, the one vibrating area corresponding to a more recently detected one of the first touch input and the second touch input.

The features of the device make it possible to control which touch position of the user is to receive a vibration. Hence, the user can easily check which setting information inputted with his or her touch input has been received by the device.

A tactile input and output device according to an aspect of the present disclosure includes: a panel which receives a touch input from a user and generates a vibration, and shows a result of the touch input; actuators each of which is provided to a different position on the panel and vibrates the panel; a touch information obtaining unit which obtains touch positions which are simultaneously detected at positions on the panel; a setting information storage unit which stores pieces of setting information, to be inputted through the touch input, in association with a spatial order of the touch positions; an order input determining unit which (i) calculates, based on time-series information of the touch positions which are simultaneously detected on the panel, a spatial order indicating a spatial relationship among the touch positions, and (ii) compares the calculated spatial order with the stored spatial order and determine one of the pieces of the setting information corresponding to the calculated spatial order; a vibration position determining unit which determines a first touch position and a second touch position among the touch positions, the first touch position corresponding to the determined one piece of the setting information and the second touch position being another one of the touch positions than the first touch position; and a multi-point simultaneous vibration control unit which calculates, for each of the actuators, a drive signal that provides a predetermined vibration to the first touch position and provides no predetermined vibration to the second touch position, and drives each of the actuators based on the calculated drive signal to simultaneously control the vibration on the panel for each of the touch positions.

Such features make it possible to control which finger (a touch position in which spatial order) of the user is to receive the vibration based on the spatial order, of touch positions, previously associated with multiple pieces of setting information to be used as options. Hence, the user can easily check which piece of the setting information inputted with his or her touch input has been received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

A tactile input and output device according to an aspect of the present disclosure further includes: a setting information changing unit which changes a setting value of the one piece of the setting information determined by the order input determining unit; and a vibration determining unit which determines a tactile feedback signal that indicates the predetermined vibration to be provided to the first touch position, based on the setting value of the setting information.

Such features allow the user to check the setting value of the received setting information through the vibration of the tactile feedback signal.

A tactile input and output device according to an aspect of the present disclosure includes a panel which receives a touch input from a user and generates a vibration, and shows a result of the touch input. The tactile input and output device includes: the panel; actuators each of which is provided to a different position on the panel and vibrates the panel; a touch information obtaining unit which obtains touch positions which are simultaneously detected at positions on the panel; a setting information storage unit which stores pieces of setting information, to be inputted through the touch input, in association with a shifting direction of the touch positions; a shift input determining unit which (i) calculates, based on time-series information of the touch positions which are detected on the panel, a shifting direction of the touch positions, and (ii) compares the calculated shifting direction with the stored shifting direction and determines one of the pieces of the setting information corresponding to the calculated shifting direction; a setting information changing unit which changes a setting value of the one piece of the setting information determined by the shift input determining unit, based on one of (i) whether or not the touch positions have shifted, (ii) how far the touch positions have shifted, (iii) how often the touch positions have shifted, and (iv) how fast the touch positions have shifted; a vibration providing condition determining unit which, when the touch positions shift in a same direction, calculates a starting touch position with respect to the same shifting direction among the touch positions, and determines the starting touch position as a first touch position for providing the vibration and another one of the touch positions than the starting touch position as a second touch position providing no vibration; a vibration determining unit which generates, based on the setting value of the one piece of the setting information, a tactile feedback signal indicating the vibration to be provided to the first touch position; and a multi-point simultaneous vibration control unit which calculates, for each of the actuators, a drive signal that provides the vibration to the first touch position and provides no vibration to the second touch position, and drives each of the actuators based on the calculated drive signal and simultaneously controls the vibration on the panel for each of the touch positions.

Such features make it possible to determine a shift input by which the user shifts the touch positions with his or her fingers kept touching the touch positions, and change, based on the shifting direction, the touch positions that provide vibrations. Consequently, the user can check through tactility the direction of the shift input and the moving direction of the target to be operated which the device has received.

In a tactile input and output device according to an aspect of the present disclosure, the vibration providing condition determining unit may, when the touch positions shift in a same direction, calculate a starting touch position with respect to the same shifting direction among the touch positions, and determine, in the case where the touch positions are kept detected in the shifting and/or in an area in which the touch positions stop shifting, (i) the starting touch position as a first touch position for providing the vibration and (ii) another one of the touch positions than the starting touch position as a second touch position for providing no vibration.

Such features allow the user to check the received setting information and the setting value through a vibration, even though a shift input ends.

A tactile input and output device according to an aspect of the present disclosure includes a panel which receives a touch input from a user and generates a vibration, and shows a result of the touch input. The tactile input and output device includes: the panel; a touch information obtaining unit which obtains touch positions which are simultaneously detected at positions on the panel; actuators each of which is provided to a different position on the panel and vibrates the panel; a hierarchy setting information storage unit which organizes setting information of a device into selection modes and arrange the selection modes in a hierarchy, and stores the arranged selection modes in association with a spatial order of the touch positions; a hierarchy information input determining unit which: calculates, based on time-series information of the touch positions which are simultaneously detected on the panel, a detection order and a spatial order of the simultaneously detected touch positions; based on (i) the calculated spatial order of the touch positions selected based on the detection order and (ii) the spatial order of a setting item in one of the selection modes found in an Nth hierarchy level and stored in the hierarchy setting information storage unit, determines the setting item corresponding to the spatial order of the selected touch positions and enter one of the selection modes in an N+1th hierarchy level; and further, enters (i) one of the selection modes in a first hierarchy level when a first input pattern is detected, and (ii) one of the selection modes in the N−1th hierarchy level when a second input pattern is detected; a setting information changing unit which changes a setting value of the setting information determined by the hierarchy information input determining unit; a hierarchy level vibration providing condition determining unit which determines for each of hierarchy levels and or the selection modes, a first touch position for providing the vibration and a second touch position for providing no vibration; a vibration determining unit which determines a tactile feedback signal indicating the vibration to be provided to the first touch position based on at least one of the first input pattern, the second input pattern, the setting value of the setting information, and a number N of the Nth hierarchy level; and a multi-point simultaneous vibration control unit which calculates, for each of the actuators, a drive signal which provides a predetermined vibration to the first touch position and provides no predetermined vibration to the second touch position, and drives each of the actuators based on the calculated drive signal and simultaneously controls the vibration on the panel for each of the touch positions.

Hence, even in a system having functions of multiple devices, the features allow the vibration to inform the user that he or she has selected which setting item that assigned to a hierarchy level is selected in which hierarchy level. Thus, the user can perform input setting without watching the panel for touch input.

In the second input pattern in each of the selection modes in a tactile input and output device according to an aspect of the present disclosure, as many touch positions are detected as options and a touch position other than the touch positions are detected.

Hence, even in a system having functions of multiple devices, the features allow the vibration to inform the user that he or she has selected which setting item that assigned to a hierarchy level is selected in which hierarchy level. Thus, the user can perform input setting without watching the panel for touch input.

A tactile input and output method according to an aspect of the present disclosure is used for vibrating a panel based on a touch input from a user, and causing actuators each of which is provided to a different position near the panel to vibrate the panel. The tactile input and output method includes: obtaining touch positions which are simultaneously detected at positions on the panel; calculating, based on time-series information of the touch positions which are simultaneously detected on the panel, a spatial order of the touch positions; determining setting information associated with the spatial order; determining a first touch position and the second touch position among the touch positions, the first touch position corresponding to the detected setting information and providing the vibration and the second touch position being another one of the touch positions than the first touch position and providing no vibration; and calculating, for each of the actuators, a drive signal which provides a predetermined vibration to the first touch position and provides no predetermined vibration to the second touch position, and driving each of the actuators based on the calculated drive signal to simultaneously control the vibration on the panel for each of the touch positions.

Such features make it possible to control which finger (a touch position in which spatial order) of the user is to receive the vibration based on the spatial order, of touch positions, previously associated with multiple pieces of setting information to be used as options. Hence, the user can easily check which piece of the setting information inputted with his or her touch input has been received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

A tactile input and output method according to an aspect of the present disclosure further includes: changing a setting value of the determined setting information; and determining a tactile feedback signal which indicates the vibration provided to the first touch position, based on the setting value of the setting information.

Such features allow the user to check the setting value of the received setting information through the vibration of the tactile feedback signal.

A tactile input and output method according to an aspect of the present disclosure is used for vibrating a panel based on a touch input from a user, and causing actuators each of which is provided to a different position near the panel to vibrate the panel. The tactile input and output method includes: obtaining touch positions which are simultaneously detected at positions on the panel; calculating, based on time-series information on the touch positions which are detected on the panel, a shifting direction of the touch positions; determining setting information corresponding to the shifting direction of the touch positions; changing a setting value of the determined setting information, based on one of (i) whether or not the touch positions have shifted, (ii) how far the touch positions have shifted, (iii) how often the touch positions have shifted, and (iv) how fast the touch positions have shifted; calculating, when the touch positions shift in a same direction, a starting touch position with respect to the same shifting direction among the touch positions, and determining the starting touch position as a first touch position for providing the vibration and another one of the touch positions than the starting touch position as a second touch position providing no vibration; generating, based on the setting value of the setting information, a tactile feedback signal indicating the vibration to be provided to the first touch position; and calculating, for each of the actuators, a drive signal which provides the vibration to the first touch position and provides no vibration to the second touch position, and driving each of the actuators based on the calculated drive signal and simultaneously controlling the vibration on the panel for each of the touch positions.

Such features make it possible to determine a shift input by which the user shifts the touch positions with his or her fingers kept touching the touch positions, and change, based on the shifting direction, the touch positions that provide vibrations. Consequently, the user can check through tactility the direction of the shift input and the moving direction of the target to be operated which the device has received.

A computer program according to an aspect of the present disclosure is used for a tactile input and output method according to an aspect of the present disclosure for vibrating a panel based on a touch input from a user, and causing actuators each of which is provided to a different position near the panel to vibrate the panel. The computer program causes a computer to execute the tactile input and output method for: obtaining touch positions which are simultaneously detected at positions on the panel; calculating, based on time-series information of the touch positions which are simultaneously detected on the panel, a spatial order of the touch positions; determining setting information associated with the spatial order; determining a first touch position and the second touch position among the touch positions, the first touch position corresponding to the detected setting information and providing the vibration and the second touch position being another one of the touch positions than the first touch position and providing no vibration; and calculating, for each of the actuators, a drive signal which provides a predetermined vibration to the first touch position and provides no predetermined vibration to the second touch position, and driving each of the actuators based on the calculated drive signal to simultaneously control the vibration on the panel for each of the touch positions.

Such features make it possible to control which finger (a touch position in which spatial order) of the user is to receive the vibration based on the spatial order, of touch positions, previously associated with multiple pieces of setting information to be used as options. Hence, the user can easily check which piece of the setting information inputted with his or her touch input has been received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

A storage device according to an aspect of the present disclosure stores a computer program for vibrating a panel based on a touch input from a user, and causing actuators each of which is provided to a different position near the panel to vibrate the panel. The storage stores the computer program which includes: an instruction for obtaining touch positions which are simultaneously detected at positions on the panel; an instruction for calculating, based on time-series information of the touch positions which are simultaneously detected on the panel, a spatial order of the touch positions; an instruction for determining setting information associated with the spatial order; an instruction for determining a first touch position and the second touch position among the touch positions, the first touch position corresponding to the detected setting information and providing the vibration and the second touch position being another one of the touch positions than the first touch position and providing no vibration; and an instruction for calculating, for each of the actuators, a drive signal which provides a predetermined vibration to the first touch position and provides no predetermined vibration to the second touch position, and driving each of the actuators based on the calculated drive signal to simultaneously control the vibration on the panel for each of the touch positions.

Such features make it possible to control which finger (a touch position in which spatial order) of the user is to receive the vibration based on the spatial order, of touch positions, previously associated with multiple pieces of setting information to be used as options. Hence, the user can easily check which piece of the setting information inputted with his or her touch input has been received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

A storage device according to an aspect of the present disclosure stores a computer program including: an instruction for detecting at least two inputs which are performed on or near a surface of a touch panel with a multi-touch technique and include a first touch input and a second touch input; an instruction for detecting a first position at which the first touch input is performed, and a second position at which the second touch input is performed; an instruction for determining a detection order in which the first touch input and the second touch input are detected; an instruction for selecting and executing a designated operation based on the detection order and a positional relationship between the first position and the second position; and an instruction for vibrating one of an area including the first position and an area including the second position, the one vibrating area corresponding to a more recently detected one of the first touch input and the second touch input.

The features of the device make it possible to control which touch position of the user is to receive a vibration. Hence, the user can easily check which setting information inputted with his or her touch input has been received by the device.

In the Specification, the term multi-touch refers to simultaneous multiple touches given by the user to a panel with his or her fingers. In other words, the multi-touch means that the user gives touches to the panel with his or her fingers at some point. In other words, the multi-touch includes multiple touches given to multiple positions on the panel and observed at the same time. Hence, the multi-touch includes not only multiple touches started at the same time but also ones started at a different time and simultaneously detected at some point. Specifically, when the first touch is initiated and then the second touch is initiated while the first touch is kept given, the first and second touches are regarded as the multi-touch at the start of the second touch.

Underlying Knowledge Forming Basis of the Present Disclosure

In relation to the techniques disclosed in the Background section, the inventors have found the problems indicated below.

The techniques involve horizontally vibrating a touch panel in all directions to guide a finger to a button displayed on a GUI screen. With these techniques, however, the user cannot perform quick input operations. The techniques also develop a problem of guiding the finger excessively often when the user inputs multiple pieces of setting information and performs a complex operation such as handling a hierarchy menu, which makes input operations complicated.

The present disclosure provides a tactile input and output device having the following features: When a user selects one of multiple pieces of setting information by operating a panel capable of simultaneously detecting multiple touch positions, the tactile input and output device (i) specifies, based on a spatial order of the detected touch positions, the correspondence between each of pieces of previously-stored setting information and the spatial order of an associated one of the touch positions, (ii) detects an input of the user leaving his or her finger, placed at a touch position found in the spatial order and corresponding to one of the pieces of setting information to be selected by the user, from the panel and touching the panel again with the finger within a predetermined time period (hereinafter referred to as tap input), and (iii) provides a vibration to the touch position where the tap input is performed and provides no vibration to a touch position other than the touch position where the tap input is performed; that is to control which finger of the user is to receive the vibration in order to let the user recognize the received setting information. Such features allows the user not to watch the panel to touch any given positions on the panel, so that the user can select pieces of information and check the input result with the vibration of the panel. Instead of having the user preset an input area with an icon and a GUI and perform an input only at the position of the input area, the tactile input and output device allows the user not to watch the panel, so that the user can select multiple pieces of setting information and check the result of an input at any given positions on the panel.

Described hereinafter are embodiments of the present disclosure with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

Embodiment 1 aims to let a user operate the tactile input and output device based on a tactile feedback which vibrates a touch-sensitive panel, so that the user does not have to watch the panel. Specifically, in the case where the user selects one of multiple pieces of setting information stored in association with the spatial order of a corresponding one of touch positions by tapping with his or her finger the touch position, in the spatial order, corresponding to the selected piece of the setting information when the user selects the one piece of the setting information by operating a panel capable of simultaneously detecting multiple touch positions, Embodiment 1 allows the user not to select a GUI (such as an icon and a button) set on a specific position on the panel or to watch the panel in order for the user to (i) easily check which setting information is received by the device by providing a vibration only to the touch position where the user taps his or her finger and by providing no vibration to a touch position other than the touch position where user taps with the finger; that is to control which finger (a touch position in which spatial order) of the user is to receive the vibration, and (ii) to easily select multiple pieces of the setting information at any given position on the panel by establishing association between the spatial order of the touch positions and the setting information.

FIG. 1 depicts a block diagram showing a structure of the tactile input and output device according to Embodiment 1.

A tactile input and output device 100 according to Embodiment 1 includes a panel 101, an actuator 102, a touch information obtaining unit 103, a setting information storage unit 104, an order input determining unit 105, a setting information changing unit 106, a vibration position determining unit 107, a vibration determining unit 108, and a multi-point simultaneous vibration control unit 109. Each of the constituent elements may be implemented either in the form of dedicated hardware or by execution of a software program which suits the constituent element. Each of the constituent element may also be implemented by a program executing unit, such as a CPU and a processor 190, reading and executing a software program recorded in a storage device or a recording medium such as a hard disc drive or a semiconductor memory. Hereinafter, each of the constituent elements shall be described.

[Panel 101]

The panel 101 transmits vibrations. When receiving a touch operation of the user, the panel 101 vibrates to notify the user that the touch operation has been received. The panel 101 may be made of such materials as glass, polycarbonate, acrylic, and acrylonitrile butadiene styrene (ABS), which hold up in touch operations of the user. These materials for the panel 101, however, shall not be defined as they are. Any materials are applicable as far as they can give a tactile feedback through vibration.

The panel 101 shall not be limited in particular in shape, size, thickness, hardness, and how the panel 101 is fixed. It is noted that the transfer characteristics of a vibration from the actuator 102 to each of the positions (hereinafter also referred to as "point") on the panel 101 vary, depending on the shape, size, thickness, hardness, and fixation technique for the panel 101.

[Actuator 102]

The actuator 102 vibrates the panel 101 to provide tactility to the user. An exemplary actuator 102 may be a piezo element, a vibration motor, a voice coil motor, and an electroactive polymer.

Figure 2:
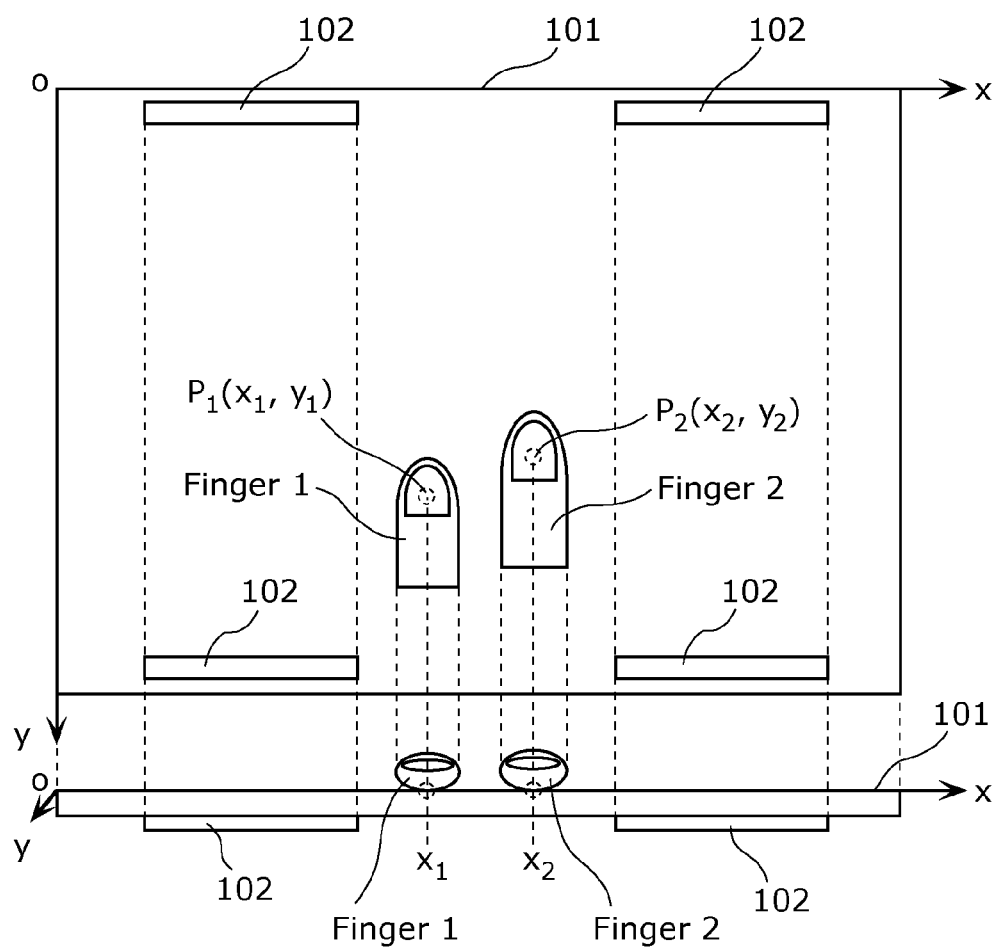
FIG. 2 shows a structure of the tactile input and output device according to Embodiment 1.

FIG. 2 shows an exemplary arrangement of the actuators 102 on the panel 101. The actuators 102 are glued to the panel 101 with, for example, an adhesive (Not shown. When the actuators 102 are piezo elements, the adhesive may be an epoxide-based one).

In Embodiment 1, the exemplary number of the actuators 102 is more than or equal to the number of touch positions which appear when the user performs touch operations on the panel 101. Hence, when the number of the touch positions is equal to the number M of the simultaneously-detected actuators 102 (M is an integer greater than or equal to 2), a different vibration can be provided to each of the touch positions. In Embodiment 1, as shown in FIG. 2, there are four actuators 102 and two touch positions (Fingers 1 and 2).

The positions where the actuators 102 are arranged shall not be limited in particular. For example, the actuators 102 may be arranged for efficient vibrations of the panel 101. In addition, the exemplary number of the actuators 102 is four; however, the number shall not be limited as it is.

[Touch Information Obtaining Unit 103]

The touch information obtaining unit 103 obtains multiple touch positions shown by the user on the panel 101.

When the user performs a touch operation with two of his or her fingers; namely the finger 1 and finger 2, for example, each of the two touch positions for the fingers 1 and 2 is respectively represented in $P_1(x_1, y_1)$ and $P_2(x_2, y_2)$ for convenience sake. In FIG. 2, a touch position is represented in two-dimensional xy coordinates with the upper-left corner of the panel 101 designated as the origin o with respect to the drawing.

An exemplary touch information obtaining unit 103 is a capacitive or resistive multi-touch panel. For example, when the touch information obtaining unit 103 is a capacitive multi-touch panel, the touch information obtaining unit 103 obtains multiple touch positions based on the change in capacitance caused by multiple touches. For example, when the touch information obtaining unit 103 is a pressure-sensitive multi-touch panel, the touch information obtaining unit 103 obtains multiple touch positions based on the change in pressure caused by multiple touches.

It is noted that the technique to detect multiple touches shall not be limited to either the capacitive system or the pressure-sensitive system. Any given multi-touch detecting techniques can be applied to the touch information obtaining unit 103. For example, the position of a finger may be captured with a charge-coupled device (CCD) camera or a complementary metal-oxide semiconductor (CMOS) camera and obtained through image processing. Another such technique is the frustrated total internal reflection (FTIR). When the panel 101 made of clear acrylic receives infrared light at its sidewall, the infrared light is trapped in the panel 101 due to the total reflection—a nature of the panel 101. The FTIR technique utilizes a camera equipped with an infrared filter to detect leaking infrared light out of the distortion of the panel 101 caused by the touch operation.

[Setting Information Storage Unit 104]

The setting information storage unit 104 stores setting information of the device, such as a setting item, an input item, an increase or decrease level of the setting value due to the selection of an input item, and a setting value, in association with touch-input-related-information including the number of touches and the spatial order of the touch position. The setting information storage unit 104 is a memory such as a hard disc and a semiconductor memory.

[Order Input Determining Unit 105]

The order input determining unit 105 calculates, based on time-series information on multiple touch positions simultaneously detected on the panel 101, the detection order and a spatial order of the simultaneously detected touch positions. Then, the order input determining unit 105 compares a spatial order of the touch positions selected based on the detection order with the spatial order stored in the setting information storage unit 104, and determines a setting item corresponding the simultaneously detected touch positions.

[The Setting Information Changing Unit 106]

The setting information changing unit 106 changes the setting value of the setting item determined by the order input determining unit 105.

[Vibration Position Determining Unit 107]

The vibration position determining unit 107 determines a first touch position for providing a vibration and a second touch position for providing no vibration. The first touch position is found in the spatial order corresponding to the determined setting item. The second touch position is simultaneously detected with but different from the first touch position. In other words, the vibration position determining unit 107 determines, as the first touch position, a vibrating touch position in the order corresponding to the device's setting item determined by the order input determining unit 105, and simultaneously determines, as the second touch position, another non-vibrating touch position. Hence, the user can check that the device has received the setting item determined by him or her, by feeling the vibration on one of the fingers that touch the panel 101 and represent multiple touch positions.

[Vibration Determining Unit 108]

The vibration determining unit 108 determines a tactile feedback signal which indicates the vibration to be provided to the first touch position, based on the setting value of the setting item.

[Multi-Point Simultaneous Vibration Control Unit 109]

The multi-point simultaneous vibration control unit 109 calculates a drive signal for each of the actuators 102 in order to provide, to the first touch position, the vibration indicated by the tactile feedback signal and provide no vibration to the second touch position. Then, the multi-point simultaneous vibration control unit 109 drives the actuators based on the calculated driving signals and simultaneously controls vibrations on the panel for each of the touch positions.

[Operation]

The operation of the above-structured tactile input and output device 100 according to Embodiment 1 shall be described with reference to FIGS. 3 to 15.

Figure 4:
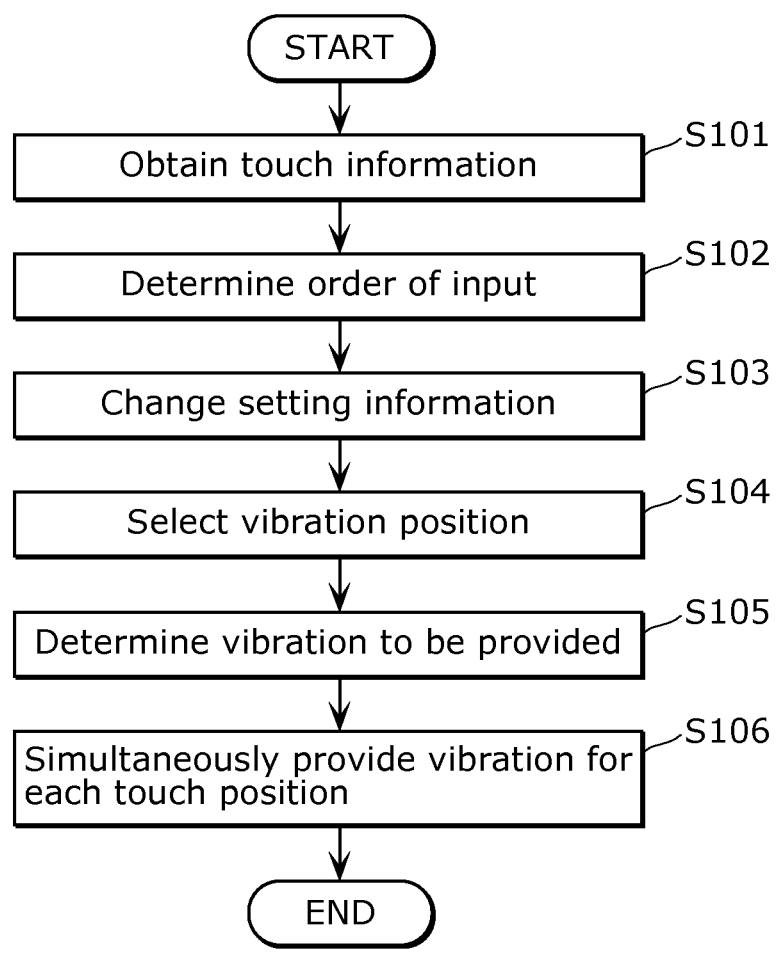
FIG. 4 depicts a flowchart showing an operation of the tactile input and output device according to Embodiment 1.

FIG. 4 depicts a flowchart showing the operation of the tactile input and output device 100 according to Embodiment 1. The operation thereof shall be detailed based on the flowchart.

Figure 5A:
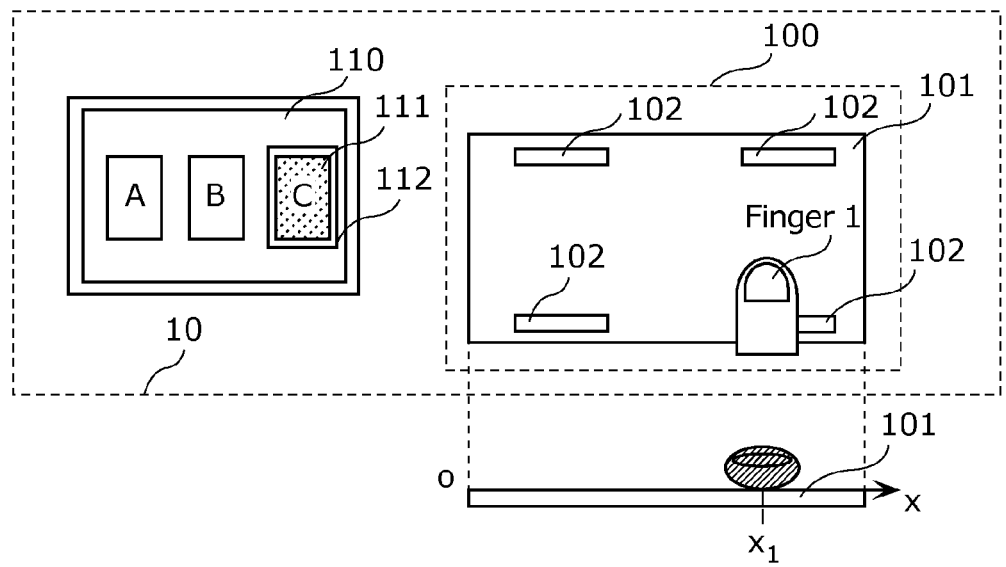
FIG. 5A exemplifies a touch input for selecting a content item and a vibration position of a panel.

The exemplified case in Embodiment 1, as shown in FIG. 5A, is that the tactile input and output device 100 is included in an electronic device 10 which performs play control on an image content item 111 to be displayed on a monitor 110. Exemplified here is a case where each of the monitor 110 and the tactile input and output device 100 is included in a physically separated controller. An exemplary controller may be implemented in the form of a remote controller equipped with a touch panel or a touch pad, and a tablet computer and a smart phone connected to a network. Based on the examples, described here is the operation according to Embodiment 1 that enable the user to perform operations for, for example, volume setting and play setting while he or she is watching the video content item 111 displayed on the monitor 110 but not watching the panel 101 in his or her hand.

[Step S101: Obtaining Touch Information]

The touch information obtaining unit 103 obtains multiple touch positions shown by the user on the panel 101.

Figure 5B:
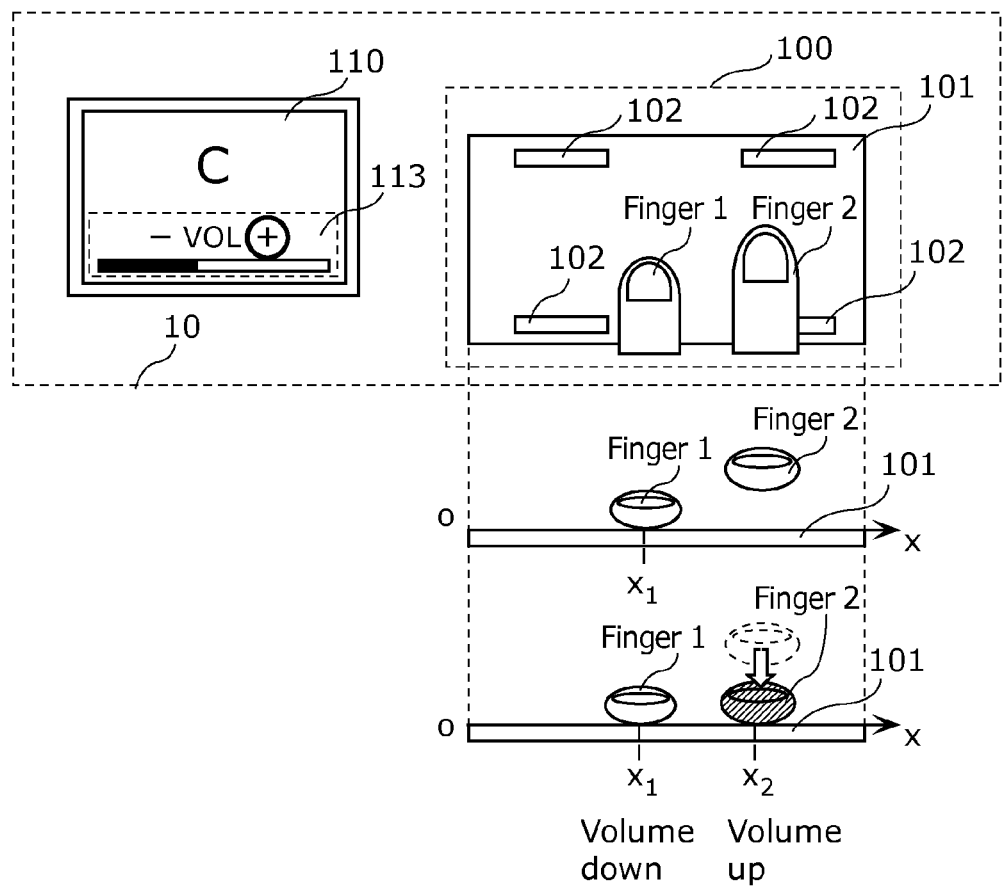
FIG. 5B exemplifies a touch input for turning up the volume and a vibration position of the panel.
Figure 5C:
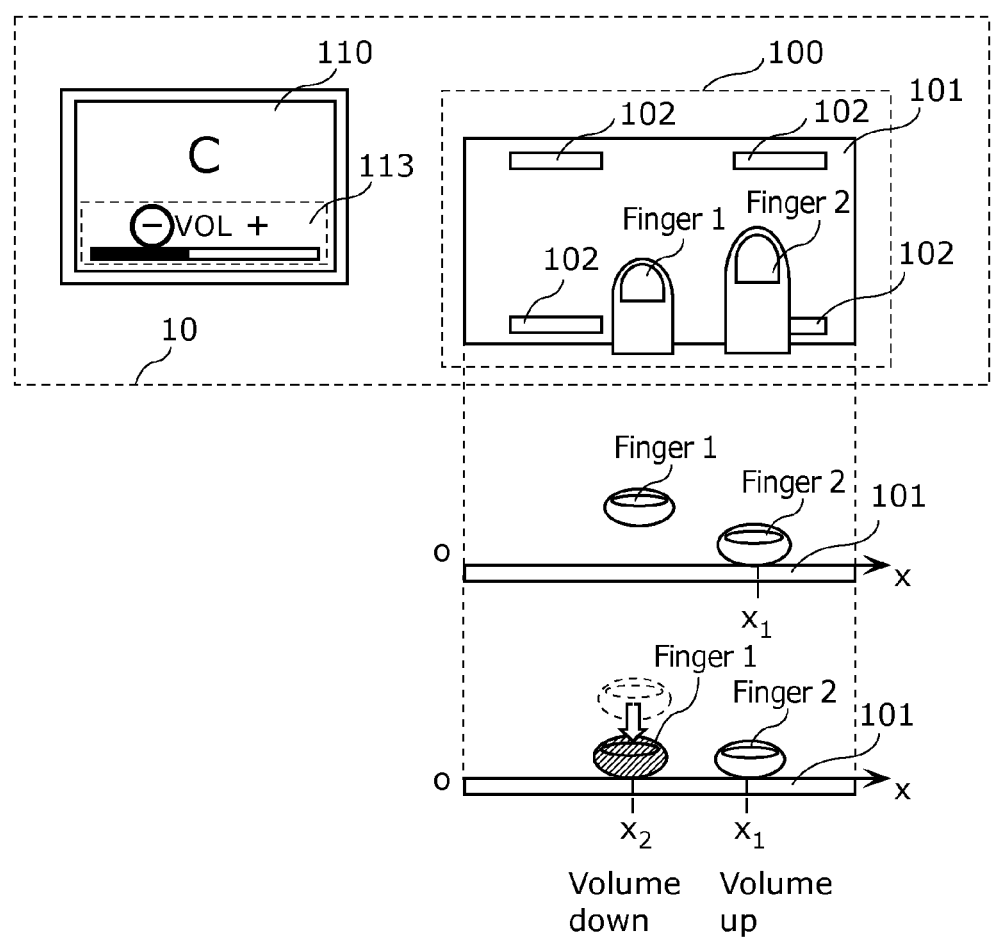
FIG. 5C exemplifies a touch input for turning down the volume and a vibration position of the panel.

In the example in FIG. 5A, the touch information obtaining unit 103 obtains, at the time t1, the x-axis touch position $x_1$ of the finger 1 on the panel 101. The touch position x1 is obtained as time-series information at a sampling interval of, for example, 10 ms. The example in FIG. 5B shows the following case: After the x-axis touch position $x_1$ of the finger 1 is obtained at the time t1 on the panel 101, another x-axis touch position $x_2$ of the finger 2, which is different from the touch position $x_1$, is detected at a time t2 while the touch position $x_1$ of the finger 1 has been detected on the panel 101. The example in FIG. 5C shows the following case: When the x-axis touch position $x_1$ of the finger 2 is detected at the time t1 on the panel 101, another x-axis touch position $x_2$ of the finger 1, which is different from the x-axis touch position $x_1$, is detected at the time t2.

[Step S102: Determining Order of Input]

The order input determining unit 105 determines, based on a spatial order of touch positions calculated from a touch position continuously detected on the panel 101 and another touch position simultaneously detected on the panel 101, an input item previously stored in the setting information storage unit 104 in association with the spatial order of touch positions.

The setting information storage unit 104 stores setting information of the device, such as a setting item, an input item, an increase or decrease level of the setting value due to the selection of an input item, and a setting value, in association with touch-input-related-information including the number of touches and the spatial order of the touch position.

FIG. 3 shows an example of the setting information. As shown in FIG. 3, for example, when the device is used for playing content items, the setting items for the device include content item selection, volume setting, and play setting such as fast-forward and rewind. For each of setting values, a value representing a volume level, a rewind speed, and a fast-forward speed is stored. In the content item selection, a first touch position in the order which is touch-inputted with one finger is stored in association with "touch position coordinates" representing an input item to be selected by the user through a touch input. In the volume setting, "volume down" representing an input item for the first touch position in the order and "volume up" representing an input item for the second touch position in the order touch position are stored in association with the spatial order of simultaneously detected two touch positions. In the play setting, "rewind" representing an input item for the first touch position in the order, "play and pause" representing an input item for the second touch position in the order touch position, and "fast-forward" representing an input item for a third-in-order touch position are stored in association with the spatial order of simultaneously detected three touch positions.

It is noted that, the number of input items to be selected all together is simply the number of touches to be detected by the touch information obtaining unit 103. More setting items than the number of touches may be set with the combination of the touch positions to be simultaneously used.

The order input determining unit 105 performs input determinations of [1] to [6] shown in FIG. 3, based on the detection order and the spatial order of the touch positions. Exemplified here is a case of selecting an input item associated with the spatial order of the most-recently-detected touch position.

[Determining Input for Content Item Selection]

Described as Input determination [1] is input determination for content item selection, with reference to FIGS. 3 and 5A. When one touch is detected by the touch information obtaining unit 103, the order input determining unit 105 determines that the input is for selecting a content item stored in the setting information storage unit 104, as shown in FIG. 3, and selects the touch position coordinates representing a stored input item shown in FIG. 3 in association with the first touch position in the order $x_1$ representing an input with the finger 1.

[Determining Input for Volume Setting]

Described as Input determination [1] and Input determination [3] are input determination for volume setting, with reference to FIGS. 3 5B, and 5C. When two touches are detected by the touch information obtaining unit 103, the order input determining unit 105 selects the volume setting stored in the setting information storage unit 104 as shown in FIG. 3. Described next is an example of how the order input determining unit 105 determines the detection order and the spatial order of the two touch positions to change the volume setting. Exemplified here is the case where the input item of the first touch position in the order is stored as "volume down" and the input item of the second touch position in the order touch position is stored as "volume up". With reference to FIGS. 5B and 5C, exemplified in Embodiment 1 is the case where the order input determining unit 105 executes the determination of the detection order and the spatial order of the touch positions on the panel 101 on the x-coordinate—the horizontal direction (long axis direction of the panel). However, the determination shall not be defined as it is, and be executed at a coordinate in any directions. For example, the determination may be made on the y-coordinate—the vertical direction.

Described below is Input determination [3]. FIG. 5B shows the case where the touch position $x_1$ of the finger 1 has continuously been detected, and another touch position x2 of the finger 2 is additionally detected on the panel 101. The detection order is $x_1$ followed by $x_2$, and the most-recent touch position is determined to be $x_2$. Here, the most-recent touch position $x_2$ satisfies $x_1 < x_2$. When the touch positions are arranged on the x-axis in an ascending order of the coordinates, $x_1$ is at the first touch position in the order and $x_2$ is at the second touch position in the order touch position. The order input determining unit 105 determines the input at the most-recent touch position $x_2$ with the finger 2 as an input at the second touch position in the order touch position. Hence, the order input determining unit 105 determines that the user has selected the input item of "volume up".

Described below is Input determination [2]. FIG. 5C shows the case where the touch position $x_1$ of the finger 2 has continuously been detected, and another touch position $x_2$ of the finger 1 is additionally detected on the panel 101. The detection order is $x_1$ followed by $x_2$, and the most-recent touch position is determined to be $x_2$. Here, the most-recent touch position $x_2$ of the finger 1 satisfies $x_2 < x_1$. When the touch positions are arranged on the x-axis in an ascending order of the coordinates, the other touch position $x_2$ is at the first touch position in the order and $x_1$ is at the second touch position in the order touch position. The order input determining unit 105 determines the input at the most-recent touch position $x_2$ with the finger 1 as an input at the first touch position in the order. Hence, the order input determining unit 105 determines that the user has selected the input item of "volume down".

[Determining Input for Play Setting]

Figure 6A:
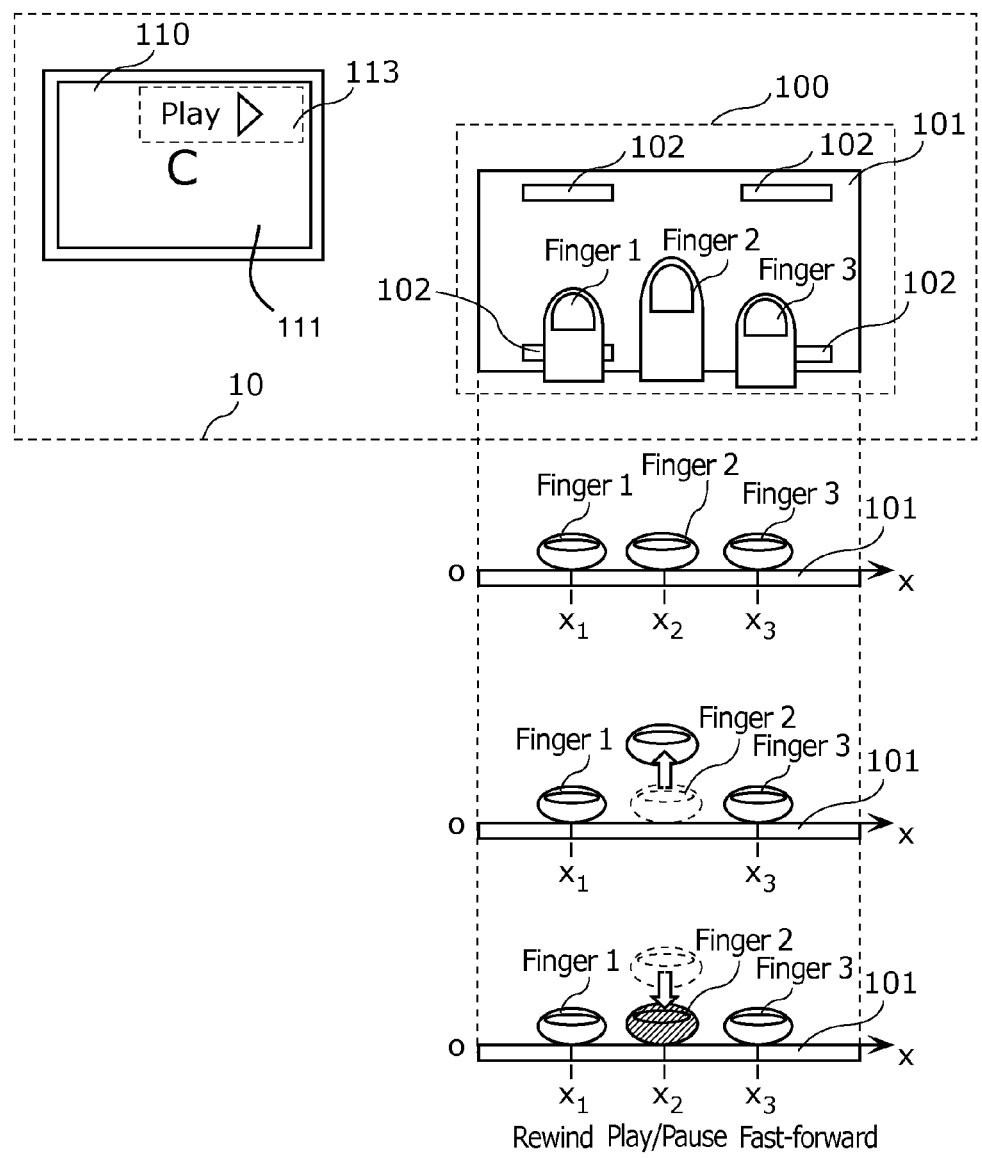
FIG. 6A exemplifies a touch input for play or pause and a vibration position of the panel.
Figure 6B:
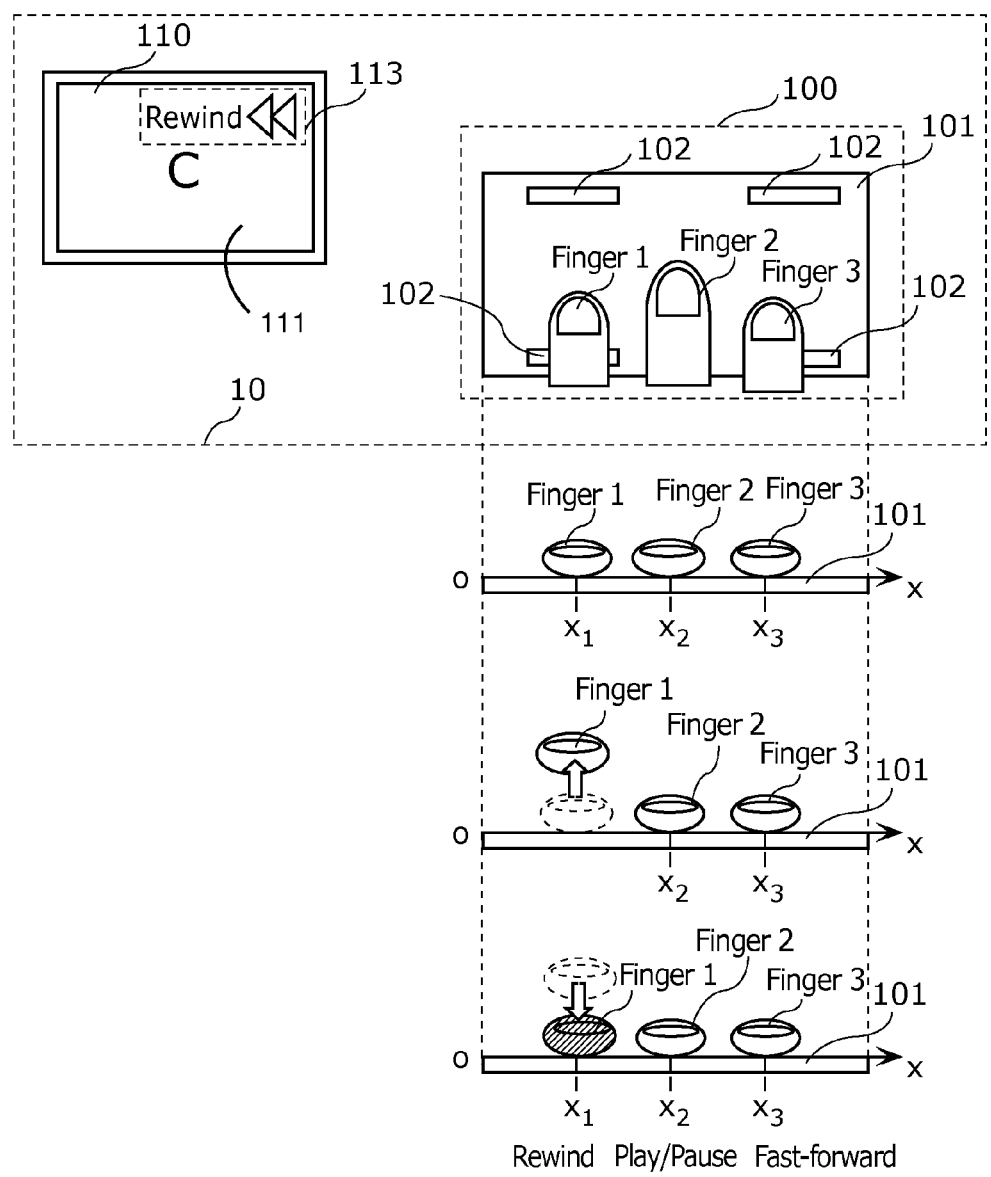
FIG. 6B exemplifies a touch input for rewinding a content item and a vibration position of the panel.
Figure 6C:
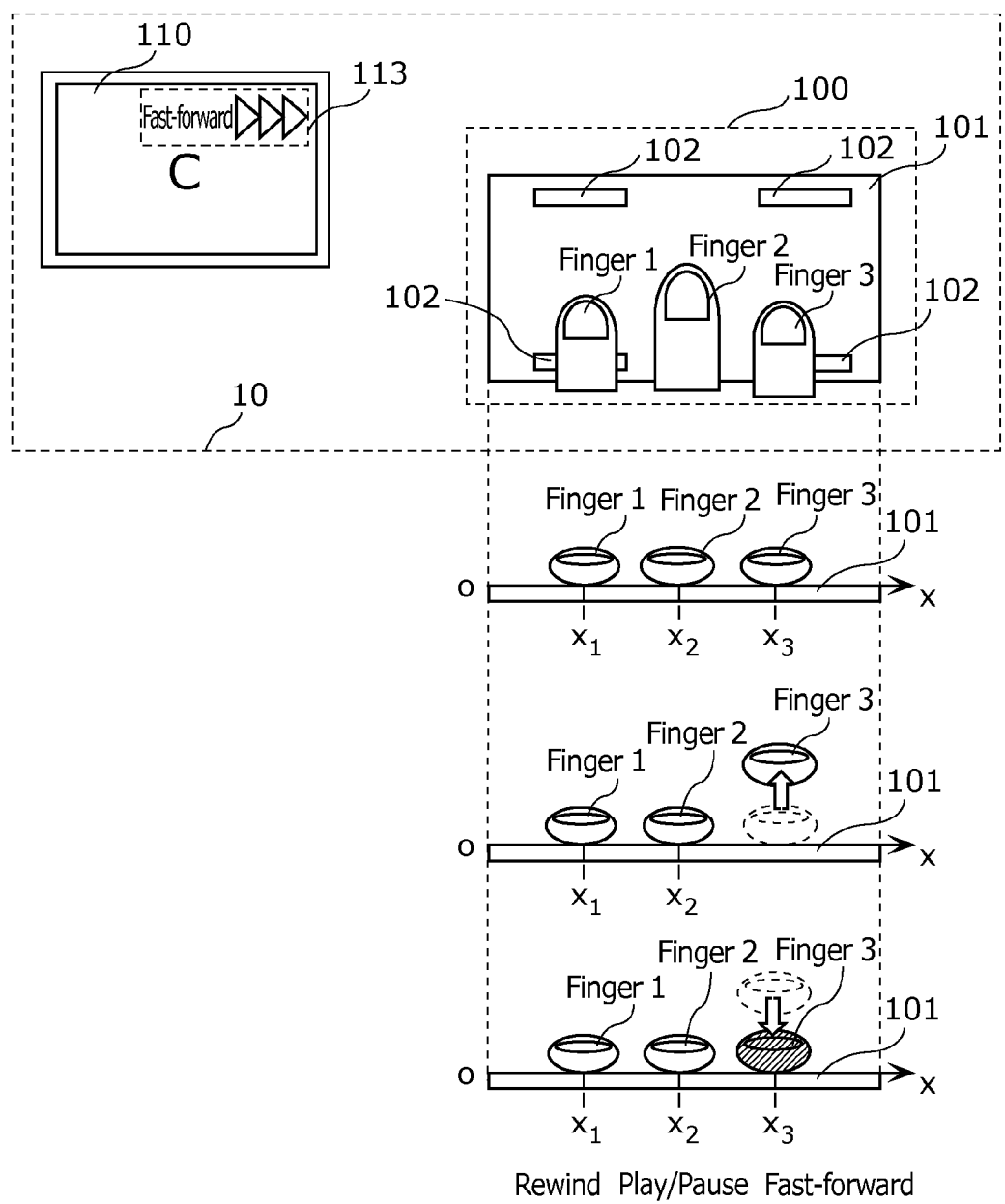
FIG. 6C exemplifies a touch input for fast-forwarding a content item and a vibration position of the panel.

Described as Input determination [4] to Input determination [6] are determination for play setting, with reference to FIGS. 3, 6A, and 6B. When three touches are detected by the touch information obtaining unit 103, the order input determining unit 105 selects the play setting stored in the setting information storage unit 104 as shown in FIG. 3. Described next is an example of how the order input determining unit 105 determines the detection order and the spatial order of the three touch positions to change the play setting. Exemplified here is the case where the input item of the first touch position in the order is stored as "rewind", the input item of the second touch position in the order touch position is stored as "play and pause", and the input item of a third-in-order touch position is stored as "fast-forward". With reference to FIGS. 6A, 6B, and 6C, exemplified here is the case where the order input determining unit 105 executes the determination of the detection order and the spatial order of the touch positions on the panel 101 on the x-coordinate.

Described below is Input determination [5]. FIG. 6A shows an input by the user of "play and pause". First, the fingers 1, 2, and 3 are respectively detected at the touch positions $x_1$, $x_2$, and $x_3$. Since three touches are detected, the order input determining unit 105 determines, based on the setting information stored in the setting information storage unit 104 as shown in FIG. 3, that the input has been performed for play setting. Next, in order to play the video content item 111, the user performs an input—that is to once leave his or her finger 2 from the panel 101, and touch the panel 101 within a predetermined time period (within 200 ms, for example). Such an input is hereinafter referred to as "tap input". Here, the touch positions $x_1$ and $x_3$ of the fingers 1 and 3 have continuously been detected, and another touch position $x_2$ of the finger 2 is additionally detected. Thus, the most-recent touch position in detection order is $x_2$. The relationship of the order of the touch positions $x_1$, $x_2$, and $x_3$ is $x_1 < X_2 < x_3$. The tap input by the user with the finger 2 is performed at the touch position $x_2$; that is the most resent touch position in detection order and the second touch position in the order touch position. As shown in FIG. 3, the order input determining unit 105 determines that the user has selected the input item of "play and pause" stored in the setting information storage unit 104.

Described below is Input determination [4]. FIG. 6B shows an input by the user of "rewind". First, the fingers 1, 2, and 3 are respectively detected at the touch positions $x_1$, $x_2$, and $x_3$. Since three touches are detected, the order input determining unit 105 determines, based on the setting information stored in the setting information storage unit 104 as shown in FIG. 3, that the input has been performed for play setting. Next, in order to rewind the video content item 111, the user performs a tap input—that is to once leave his or her finger 1 from the panel 101, and touch the panel 101 again within a predetermined time period (within 200 ms, for example). Here, the touch positions $x_2$ and $x_3$ of the fingers 2 and 3 have continuously been detected, and another touch position $x_1$ of the finger 1 is additionally detected. Thus, the most-recent touch position in detection order is $x_1$. The relationship of the order of the touch positions $x_1$, $x_2$, and $x_3$ is $x_1 < X_2 < x_3$. The tap input by the user with the finger 1 is performed at the touch position $x_1$; that is the most recent touch position in the detection order and the first touch position in the order. As shown in FIG. 3, the order input determining unit 105 determines that the user has selected the input item of "rewind" stored in the setting information storage unit 104.

Described below is Input determination [6]. FIG. 6C shows an input by the user of "fast-forward". First, the fingers 1, 2, and 3 are respectively detected at the touch positions x1, x2, and x3. Since three touches are detected, the order input determining unit 105 determines, based on the setting information stored in the setting information storage unit 104 as shown in FIG. 3, that the input has been performed for play setting. Next, in order to fast forward the video content item 111, the user performs a tap input—that is to once leave his or her finger 3 from the panel 101, and touch the panel 101 again within a predetermined time period (within 200 ms, for example). Here, the touch positions $x_1$ and $x_2$ of the fingers 1 and 2 have continuously been detected, and another touch position $x_3$ of the finger 3 is additionally detected. Thus, the most-recent touch position in detection order is $x_3$. The relationship of the order of the touch positions $x_1$, $x_2$, and $x_3$ is $x_1 < x_2 < x_3$. The tap input by the user with the finger 3 is performed at the touch position $x_3$; that is the most resent touch position in detection order and the third-in-order touch position. As shown in FIG. 3, the order input determining unit 105 determines that the user has selected the input item of "fast-forward" stored in the setting information storage unit 104.

[Step S103: Changing Setting Information]

The setting information changing unit 106 changes the setting value of the setting item determined by the order input determining unit 105 when the user touches the most-recent touch position.

[Changing Setting Value for Selecting a Content Item]

Hereinafter described is how to change a setting value for selecting a content item, with reference to FIGS. 3 and 5A. Based on touch position coordinates, which are the input item selected in Step S102, the setting information changing unit 106 changes the coordinates of a selection displaying frame, the coordinates which are setting values in the Input determination [1] of FIG. 3 (position coordinates of a selection displaying frame 112 in FIG. 5A). Here, based on the coordinates of the touch position $x_1$ shown in FIG. 5A, the selection displaying frame 112 displays the selection status of a content item A, a content item B or a content item C displayed on the monitor 110. Then, the information changing unit 106 determines the selection of one of the content items when the user leaves his or her finger 1 from the touch position $x_1$ on the panel 101.

[Changing Setting Value for Volume Setting]

Hereinafter exemplified with reference to FIGS. 3, 5B, and 5C is how to change a setting value for volume setting when the touch information obtaining unit 103 obtains two touches. First, as shown in FIG. 5B, when (i) the most-recent touch position $x_2$ selected with the finger 2 and determined by the order input determining unit 105 in Step S102 is the second touch position in the order touch position and (ii) a selected input item corresponding to the touch position $x_2$ is "volume up", the setting information changing unit 106 changes the setting value based on an increase or decrease level of the setting value shown in FIG. 3. Specifically, when a tap input is detected at the second touch position in the order touch position, the setting information changing unit 106 increases or decreases the setting value based on the increase or decrease level of the setting value. The increase or decrease level $\Delta V$ of the setting value for "volume up" is +1. Thus, according to V=V+$\Delta V$, the volume level is increased by 1. Here, the monitor 110 displays the setting value displaying unit 113 in order to show the setting value to the user. In the example in FIG. 3, the setting value for volume setting shows the volume level of [0,49], and the current setting value is the level 15. Here, the setting value of the volume level is obtained as 15+1=16. Next, as shown in FIG. 5C, the most-recent touch position $x_2$ selected with the finger 2 and determined by the order input determining unit 105 in Step S102 is the first touch position in the order, and a selected input item corresponding to the touch position $x_2$ is "volume down". Here, the increase or decrease level $\Delta V$ of the setting value is −1. Thus, according to V=V+$\Delta V$, the volume level is decreased by 1. Here, the monitor 110 displays a setting value displaying unit 113 in order to show the setting value to the user.

[Changing Setting Value for Play Setting]

Hereinafter exemplified with reference to FIGS. 3, 6A, and 6B is how to change a setting value for play setting when the touch information obtaining unit 103 obtains three touches. When the order input determining unit 105 determines in Step S102 that the user selects with his or her finger 2 "play and pause" representing an input item for the second touch position in the order touch position $x_2$ as shown in FIG. 6A, the setting information changing unit 106 sets the setting value of the input item shown in FIG. 3. Here, the monitor 110 displays the setting value displaying unit 113 in order to show the setting value to the user. Specifically, the setting information changing unit 106 sets the setting value to 1 in play and to 2 in pause. The play and pause are alternately set. In other words, when the current setting value is 1 (play), the setting value is set to 2 (pause). When the current setting value is 2 (pause), the setting value is set to 1 (play). The setting value is 0 when the input item for the play setting is in the second touch position in the order. This is set when the input item is either fast-forward or rewind. Next, when a selected input item is "rewind" which represents an input item for the first touch position in the order $x_1$ indicated with the finger 1 as shown in FIG. 6B, the setting information changing unit 106 increases or decreases the setting value, using an increase or decrease level of the setting value. The increase or decrease level of the setting value for "rewind" is +1. The speed level of rewind is increased by 1. Here, the monitor 110 displays the setting value displaying unit 113 in order to show the setting value to the user. The level of the rewind speed has four stages from one to four. The setting value is selected from these stages. As shown in FIG. 3, the setting value of the current rewind speed is 0. This is because the current operation of the device is fast-forward, and the setting value is set to 0. The input performed at the touch position $x_1$ sets the setting value to 1. Similar to the rewind in FIG. 6B, "fast-forward" is selected as an input item when the touch position $x_3$ indicated with the finger 3 in FIG. 6C is the touch position in the third-in-order, and the increase or decrease level of the setting value is +1. Hence, the setting value for the fast-forward speed is increased by 1. Here, the monitor 110 displays the setting value displaying unit 113 in order to show the setting value to the user.

[Step S104: Selecting Vibration Position]

The vibration position determining unit 107 determines (i) a touch position in the most-recent detection order as the first touch position for providing a vibration and (ii) a touch position detected before the detection of the touch position in the most-recent detection order as the second touch position for providing no vibration. In other words, the vibration position determining unit 107 determines the first touch position and the second touch position, the first touch position being a vibrating touch position in the spatial order corresponding to a setting item determined by the order input determining unit 105 and the second touch position being another non-vibrating touch position which is simultaneously detected together with the first touch position. Hence, the user can check that the device has received the setting item determined by him or her, by feeling the vibration on one of the fingers that touch the panel 101 and represent multiple touch positions.

It is noted that, in inputting "rewind" and "fast-forward" of a content item, the vibration position determining unit 107 may provide stimulus signals so that the number of the stimulus signals corresponds to a setting value at a predetermined time interval, when the most-recent touch position is tap-inputted and then the touch position is continuously detected at the position. Moreover, when an index such as a scene change and person's information is provided to a content item, the vibration position determining unit 107 may provide a vibration when the scene changes and the person's information appears. Furthermore, when multiple touch positions have continuously been detected, the vibration position determining unit 107 may provide, at a predetermined time interval, a vibration (i) in the order of the second touch position in the order touch position followed by the first touch position in the order in "rewind", and (ii) in the order of the first touch position in the order followed by the second touch position in the order touch position in "fast-forward", so that the vibration position determining unit 107 can show a direction of "rewind" or "fast-forward".

[Step S105: Determining Vibration to be Provided]

The vibration determining unit 108 determines a tactile feedback signal which indicates the vibration to be provided to the first touch position, based on the setting value of the setting item and or an increase or decrease level of the setting value.

Figure 7A:
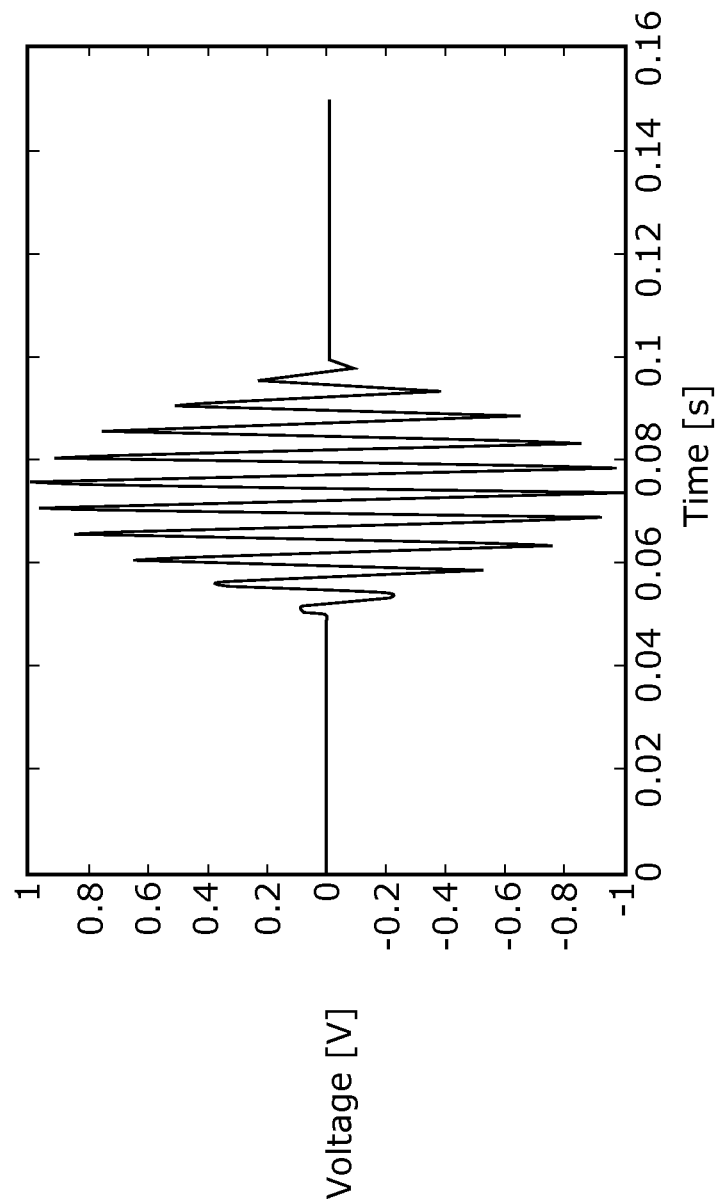
FIG. 7A shows an exemplary tactile feedback signal.

For example, suppose the case where (i) the touch information obtaining unit 103 obtains two touch positions, (ii) the order input determining unit 105 selects a setting item of "volume down" or "volume up" according to a determination criterion indicated in FIG. 3, and (iii) the increase or decrease level of the setting value is either +1 or −1. Here, when the user performs a tap input at the most-recent touch position, the vibration determining unit 108 generates a tactile feedback signal shown, for example, in FIG. 7A in order to inform the user that the setting value has increased or decreased by 1. FIG. 7A shows s(n) of the tactile feedback signals generated based on signals having sinusoidal waves of a frequency fc for r cycles. As indicated in Expression (1), the sinusoidal waves are modulated with a modulation frequency fm whose r cycles are exactly a half cycle.

[Math. 1]

$$s(n) = \sin(2\pi f_m n T_s)\sin(2\pi f_c n T_s) \quad (1)$$
$$f_m = \frac{f_c}{2r}$$

Here, Ts represents a sampling cycle. In the example in FIG. 7A, fc=200 Hz and r=10 hold. Thus, the modulation frequency fm is 10 Hz. The tactile feedback signal generated above can be used to provide the user with the tactility as if he or she clicked a physical switch once (hereinafter referred to as single-stimulus signal). Thus, through the tactility, the user checks the increase or decrease in the setting value by one.

Figure 7B:
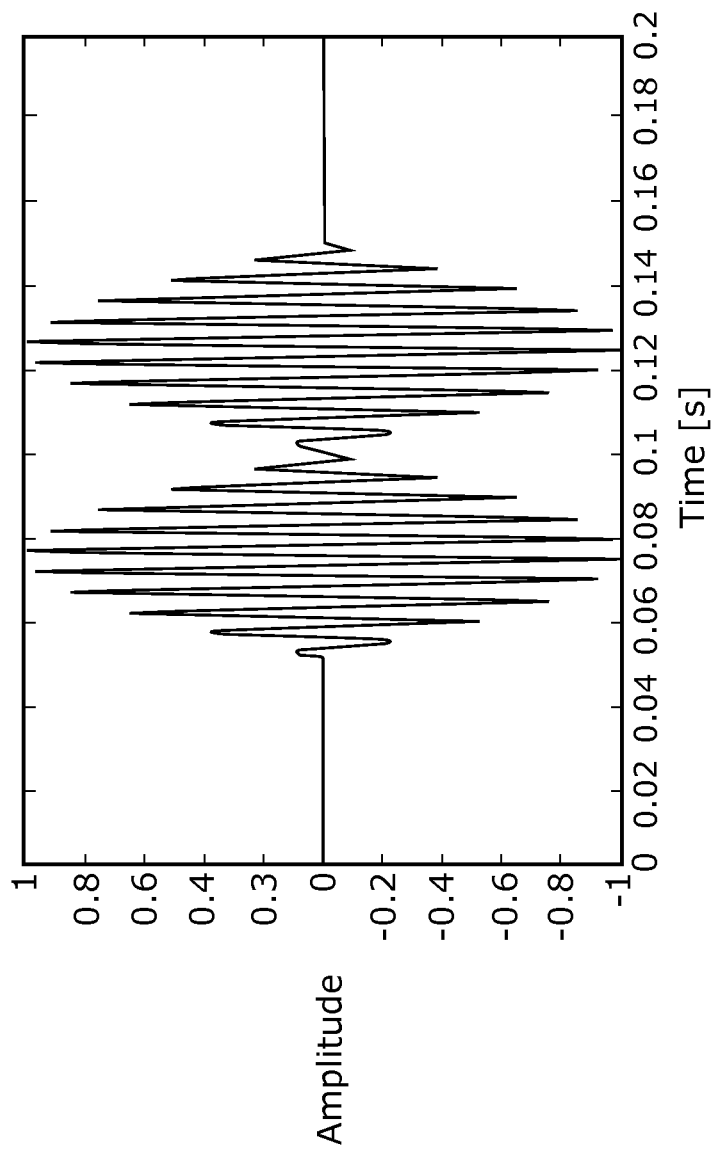
FIG. 7B shows another exemplary tactile feedback signal.

Similarly, FIG. 7B shows sinusoidal waves which are modulated with a modulation frequency fm whose r cycles are exactly one cycle. The modulated sinusoidal waves can be used as signals to provide the user with the tactility as if he or she clicked a physical switch twice in a row (hereinafter referred to as double-stimulus signal). When the setting value for a fast-forward speed is 2, as exemplified in FIG. 3, the vibration determining unit 108 provides the user with the tactility as if he or she clicked a physical switch twice as shown in FIG. 7B. Hence, the user can check through the tactility that 2 is set by his or her touch input as the setting value indicating a fast-forward speed.

It is noted that the tactile feedback signal does not have to be generated as described above. For example, the modulation as indicated in Expression (1) does not have to be performed. In other words, a sinusoidal wave may be used as the tactile feedback signal.

It is noted that the frequency fc may be any given frequency as far as a human can feel the frequency through tactility. For example, the frequency fc may be determined based on vibration characteristics of the panel 101.

For example, the frequency fc may be determined to coincide with the resonant frequency of the panel 101. The above-determined frequency fc successfully reduces the attenuation of a vibration provided by the actuator 102 to the panel 101, which contributes to efficiently providing the tactility.

[Step S106: Simultaneously Controlling Multiple Points]

The multi-point simultaneous vibration control unit 109 calculates a drive signal for each of the actuators 102 in order to provide, to the first touch position, the vibration indicated by the tactile feedback signal and not to provide the vibration to the second touch position. Then, the multi-point simultaneous vibration control unit 109 drives the actuators based on the calculated driving signals and simultaneously controls vibrations on the panel 101 for each of the touch positions.

An example of a specific structure and an operation of the multi-point simultaneous vibration control unit 109 shall be described later.

When the user selects one of pieces of setting information by operating the panel 101 capable of simultaneously detecting multiple touch positions, the above-operating tactile input and output device 100 according to Embodiment 1 with the above-described structure causes: the order input determining unit 105 to select, (i) based on a detection order and a spatial order of multiple touch positions to be detected by the touch information obtaining unit 103 and (ii) using the spatial order of one of the touch positions tap-inputted by the user and corresponding to the most-recent detection order, the one of the pieces of the setting information previously stored in the setting information storage unit 104 in association with the spatial order of the touch positions; the vibration determining unit 108 to determine, as the first touch position for providing a vibration, a touch position in the spatial order corresponding to the selected one piece of the setting information, and, as the second touch position for providing no vibration, another one of the touch positions than the first touch position; the multi-point simultaneous vibration control unit 109 to drive the actuators 102 so that the vibration determining unit 108 (i) provides a vibration, which relates to a setting value of the one piece of setting information, to the first touch position which is a position of a tapping finger, and (ii) provides no vibration to a touch position other than the position of the tapping finger.

Such features make it possible to control which finger (a touch position in which spatial order) of the user is to receive the vibration based on the spatial order, of touch positions, previously associated with multiple pieces of setting information to be used as options. This allows the user to easily check which piece of the setting information has been received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

[Details of an Example of the Structure and the Operation of the Multi-Point Simultaneous Vibration Control Unit 109]

Figure 8:
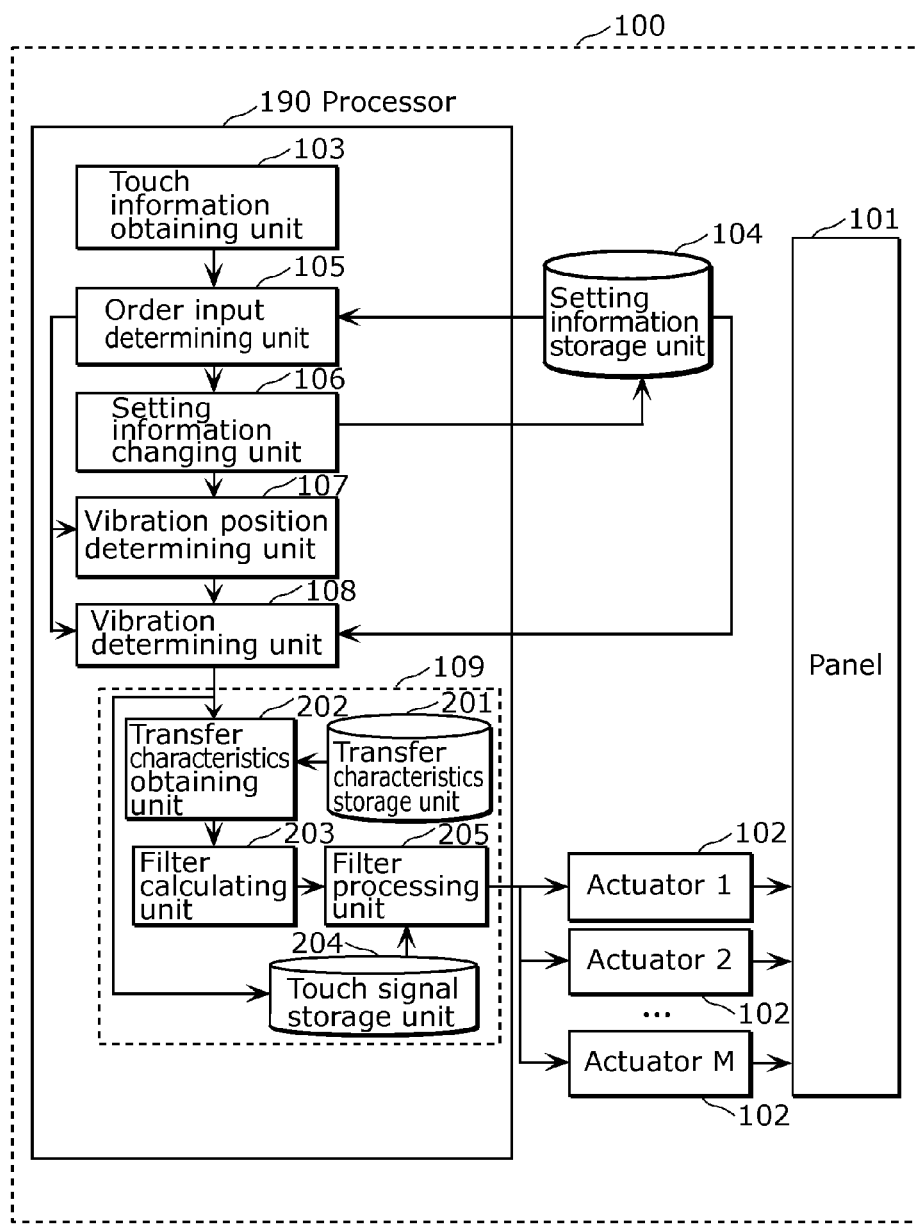
FIG. 8 depicts a block diagram showing an exemplary structure of a multi-point simultaneous vibration control unit according to Embodiment 1.

Detailed here is an example of the structure and operation in Step S106 of the multi-point simultaneous vibration control unit 109 that is a constituent element according to Embodiment 1. FIG. 8 depicts a block diagram showing a detailed structure of the multi-point simultaneous vibration control unit 109. The multi-point simultaneous vibration control unit 109 according to Embodiment 1 includes a transfer characteristics storage unit 201, a transfer characteristics obtaining unit 202, a filter calculating unit 203, a tactile feedback signal storage unit 204, and a filter processing unit 205. Hereinafter, each of the constituent elements and its operation shall be described.

[Transfer Characteristics Storage Unit 201]

An exemplary transfer characteristics storage unit 201 is a hard disc or a semiconductor memory. For each of the points on the panel 101, the transfer characteristics storage unit 201 stores a transfer characteristic to be observed between each of the actuator 102 and the point. In other words, the transfer characteristics storage unit 201 stores the transfer characteristics to be sent from multiple points on the panel 101 to multiple actuators 102 in association with combinations of the positions and the actuators 102.

The transfer characteristics represent a relationship between an input and an output in the system. Here, the input is a drive signal from an actuator, and the output is a vibration at one of the points on the panel 101. In general, the transfer characteristic $G(\omega)$ is expressed in the ratio of an output $Y(\omega)$ from the system to an input $X(\omega)$ to the system ($G(\omega)=Y(\omega)/X(\omega)$). When the input $X(\omega)$ is, for example, an impulse ($X(\omega)=1$), the transfer characteristic coincides with the output $Y(\omega)$ (impulse response).

Hence, in Embodiment 1, the transfer characteristics storage unit 201 stores, for each of the points on the panel 101, an impulse response from each actuator 102 to the point as the transfer characteristic. It is noted that the impulse response may be represented in the form of a time domain or a frequency domain. In other words, the transfer characteristics storage unit 201 may store a time waveform of the impulse response or a spectrum of the impulse response.

Here, each of the points on the panel 101 may represent a corresponding one of the divided areas on the panel 101 (such as a center or a center of gravity). The divided areas are the ones on the panel 101 divided in a reticular pattern in the 10-millimeter length. It is noted that the shapes of the divided areas do not have to be rectangle, and may have a shape other than rectangle. Moreover, the sizes of the divided areas do not have to be the same with one another. For example, the sizes of the divided areas may vary depending on the positions of the panel 101.

Here, when each of the divided areas is smaller (in other words, more divided areas), the resolution for providing a tactile sense is higher. However, the storage capacity for storing the transfer characteristics needs to be increased. In other words, a trade off is found between resolution and storage capacity. Hence, the size of each divided area may be determined based on required resolution or acceptable storage capacity.

Further detailed hereinafter are the transfer characteristics to be stored in the transfer characteristics storage unit 201.

Assumed here is the case where the transfer characteristics storage unit 201 stores M×N transfer characteristics (M and N are integers greater than or equal to 2) from each of M actuators 102 ($A_1, A_2, \ldots A_M$) to each of N positions ($P_1(x_1, P_2(x_2, y_2) \ldots P_N(X_N, Y_N))$).

Figure 9:
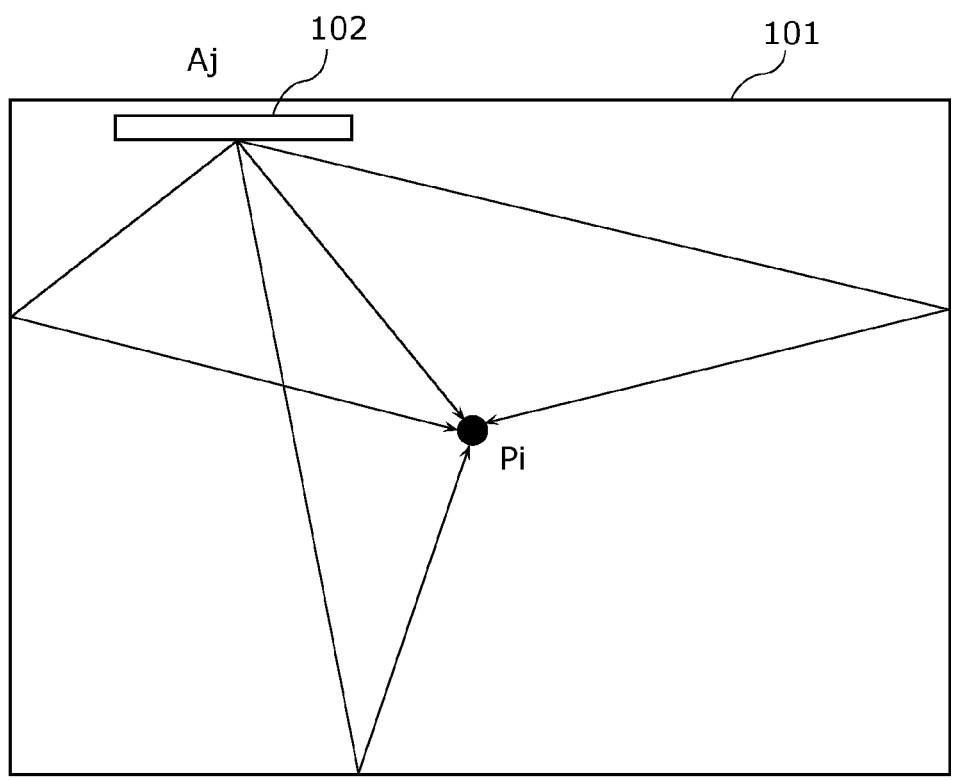
FIG. 9 shows a route of a vibration propagating from an actuator to a position on a panel.

FIG. 9 shows a route of a vibration propagating from one of the actuators 102 to a position on the panel 101.

As shown in FIG. 9, the vibration at the position $P_i$ is a synthetic one including a vibration which directly arrives at the point $P_i(x_i, y_i)$ from the actuator 102 $A_j$, a vibration which reflects off an edge of the panel 101 and arrives at the point $P_i(x_i, y_i)$, and the like. Hence, the transfer characteristics include the ones for every route from the actuator 102 $A_j$ to the position $P_i$ on the panel 101.

It is noted that the transfer characteristics may be represented in the form of time domain or frequency domain. The transfer characteristics expressed in the form of time domain and the transfer characteristics expressed in the form of frequency domain are equal to each other as information, and thus compatible.

The transfer characteristic to be observed between the actuator 102 $A_j$ and the position Pi(xi, yi) can be obtained by, for example, the calculation of vibration (impulse response) at the point $P_i(x_i, y_i)$ where an impulse is inputted to the actuator 102 $A_j$. The impulse response can completely express the characteristic of the system from the actuator 102 $A_j$ to the position Pi(xi, yi). Thus, in Embodiment 1, the impulse response is used as the transfer characteristic.

In general, when an impulse is directly applied, the time period that the impulse lasts is very short. This tends to lower the S/N ratio of the impulse response. Hence, instead of an impulse, a time stretched pulse (TSP) may be used to measure the impulse response. Consequently, an impulse response having a high S/N ratio can be obtained as the transfer characteristic. Described below is how to measure an impulse response, using the TSP.

Figure 10A:
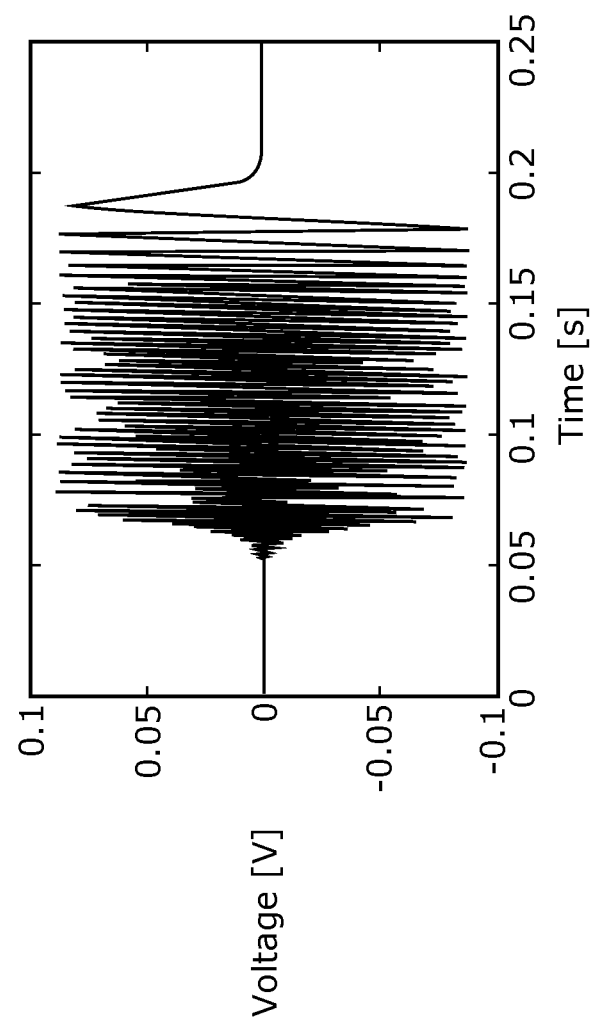
FIG. 10A shows an exemplary time stretched pulse (TSP) response.

As shown in Expression (2), the phase of the impulse is changed in proportion to the squares of the frequency. Hence, the TSP is a signal whose time axis is stretched longer than that of the impulse. FIG. 10A shows an exemplary TSP.

[Math. 2]

$$H(n) = \exp(jkn^2) \quad 0 \le n \le \frac{N}{2} \quad (2)$$
$$H(n) = H^*(N-n) \quad \frac{N}{2}+1 \le n \le N$$

In Expression (2), H(n) represents a TSP in a frequency domain, j represents an imaginary unit (square root of −1), k is a constant and represents the degree of expansion and contraction, n represents a unit of a discretized frequency, and H* represents a complex conjugation of H.

Figure 10B:
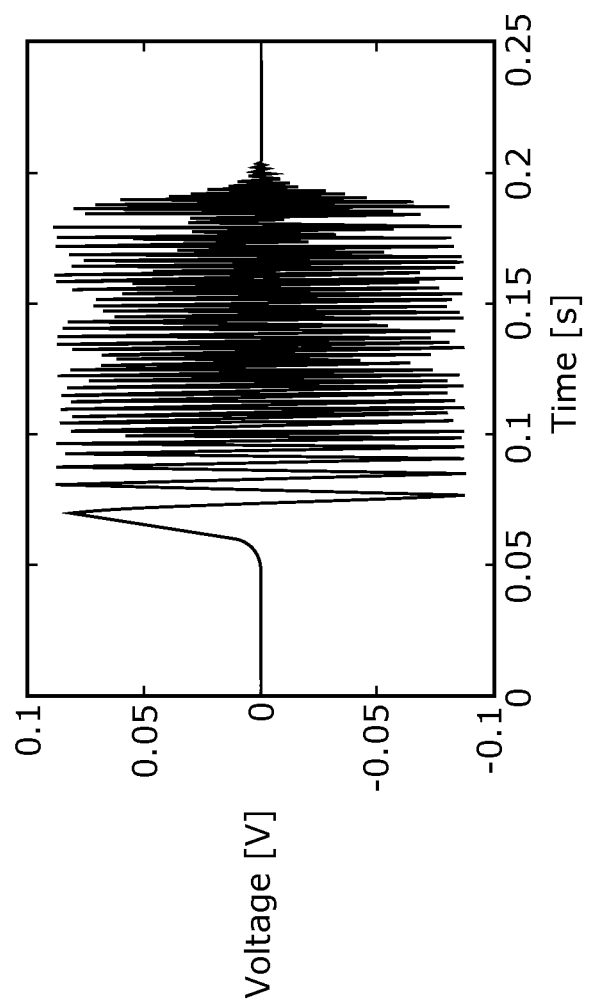
FIG. 10B shows an exemplary TSP response.

A signal is obtained by inverse Fourier transformation performed on the TSP shown in Expression (2). The actuator 102 $A_j$, is driven by the signal, and the vibration (hereinafter referred to as "TSP response") at the position $Pi(x_i, y_i)$ on the panel 101 is measured. Any given measurement technique may be adapted. An exemplary technique to measure the vibration (TSP response) may utilize a Doppler displacement gauge. FIG. 10B shows another exemplary TSP response.

Using the measured TSP response, the impulse response is calculated. Specifically, an inverse function of the TSP shown in Expression (2) is used to perform a convolution operation and obtain the impulse response.

[Math. 3]

$$H^{-1}(n) = \exp(-jkn^2) \quad 0 \le n \le \frac{N}{2} \quad (3)$$
$$H^{-1}(n) = H^*(N-n) \quad \frac{N}{2}+1 \le n \le N$$

Figure 10C:
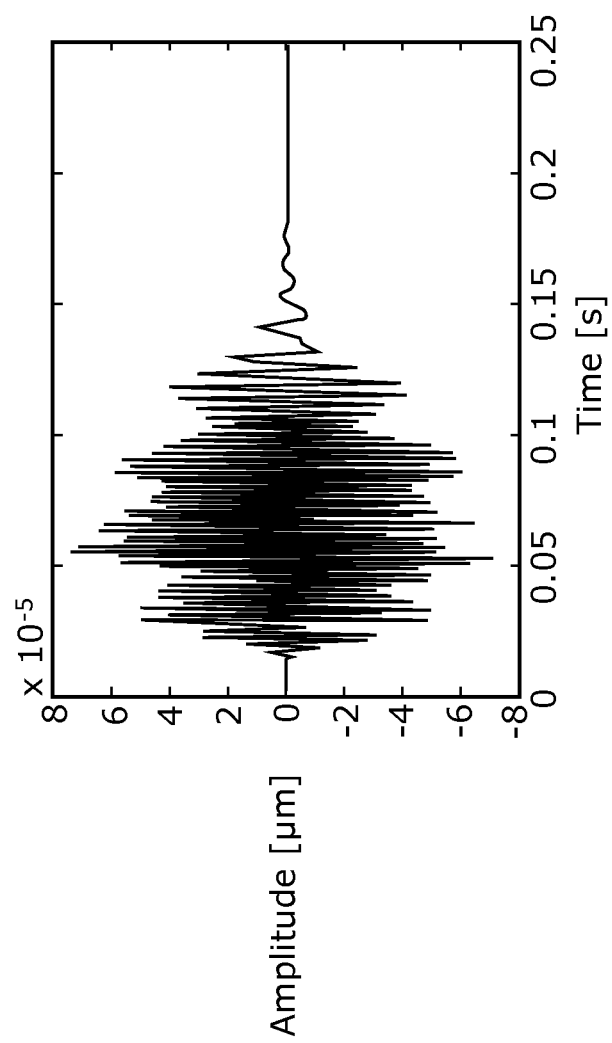
FIG. 10C shows an exemplary inverse function of a TSP.

In Expression (3), H−1(n) is the inverse function of a TSP. FIG. 10C shows an exemplary inverse function of a TSP. FIG. 10D shows an exemplary impulse response calculated from the TSP response in FIG. 10B.

As described above, the impulse response from the actuator 102 $A_j$ to the position $Pi(x_i, y_i)$ is measured based on using a TSP. Such measurements are conducted to all the combinations of M actuators 102 ($A_1, A_2, \ldots, A_M$) and N positions ($P_1(x_1, y_1), P_2(x_2, y_2), \ldots, P_N(x_N, y_N)$) to obtain M×N transfer characteristics. The obtained M×N transfer characteristics are stored in the transfer characteristics storage unit 201.

It is noted that the techniques to measure the transfer characteristics shall not be limited to the ones described above. For example, the transfer characteristics may be measured using an M-sequence signal. As another example, the transfer characteristics may be measured using Gaussian random numbers.

[Transfer Characteristics Obtaining Unit 202]

From among multiple transfer characteristics stored in the transfer characteristics storage unit 201, the transfer characteristics obtaining unit 202 obtains a transfer characteristic corresponding to one of the touch positions obtained by the touch information obtaining unit 103. In other words, the transfer characteristics obtaining unit 202 reads from the transfer characteristics storage unit 201 a transfer characteristic to be observed between each of the actuators 102 and each of the touch positions.

[Filter Calculating Unit 203]

The filter calculating unit 203 is an exemplary filter obtaining unit. The filter calculating unit 203 obtains a filter which performs filtering on any given tactile feedback signals to generate a desired drive signal. Here, the desired drive signal is used to cause each actuator 102 to (i) vibrate the first touch position for providing a vibration to the panel 101 using any given tactile feedback signal and (ii) not to vibrate the second touch position for providing no vibration to the panel 101.

In other words, based on a transfer characteristic obtained by the transfer characteristics obtaining unit 202, the filter calculating unit 203 provides tactility only to the first touch position among the multiple touch positions obtained by the touch information obtaining unit 103, and calculates a filter for providing no tactility to the second touch position (a touch position not providing a vibration). Details of how to calculate the filter shall be described later.

[Tactile Feedback Signal Storage Unit 204]

An exemplary tactile feedback signal storage unit 204 is a hard disc or a semiconductor memory. The tactile feedback signal storage unit 204 stores a tactile feedback signal generated by the vibration determining unit 108. Exemplary tactile feedback signals are illustrated in FIGS. 7A and 7B.

The tactile feedback signal may be any given signal as far as the signal provides tactility to the user. For example, the tactile feedback signal may be determined based on a vibration characteristic of the panel 101. Specifically, an exemplary tactile feedback signal may be one having a resonance frequency of the panel 101 or one having a frequency close to the resonance frequency. Such a feature contributes to improving energy efficiency.

In Embodiment 1, tactile feedback signals are generated on line by the vibration determining unit 108 based on the setting values of setting information. The generated tactile feedback signals are stored in the tactile feedback signal storage unit 204, and the drive signals for the actuators 102 are generated by the filter processing unit 205. In contrast, the vibration determining unit 108 may previously store in the tactile feedback signal storage unit 204 the tactile feedback signals shown in FIGS. 7A and 7B and corresponding to the setting values of the setting information, and may select the tactile feedback signals based on the setting values.

[Filter Processing Unit 205]

The filter processing unit 205 performs filtering on (filters) a tactile feedback signal stored in the tactile feedback signal storage unit 204, using the filter calculated by the filter calculating unit 203 for each of the actuators 102, in order to generate a drive signal for each actuator 102.

According to the drive signal generated by the filter processing unit 205 as described above, each of the actuators 102 vibrates the panel 101. As a result, only the first touch position among the multiple touch positions vibrates based on the tactile feedback signal, and the non-vibrating second touch position is kept from vibrating. Such features allows the multi-point simultaneous vibration control unit 109 to provide tactility to the user at a vibrating position, and provide no tactility to the non-vibrating second touch position.

[Operation]

Figure 11:
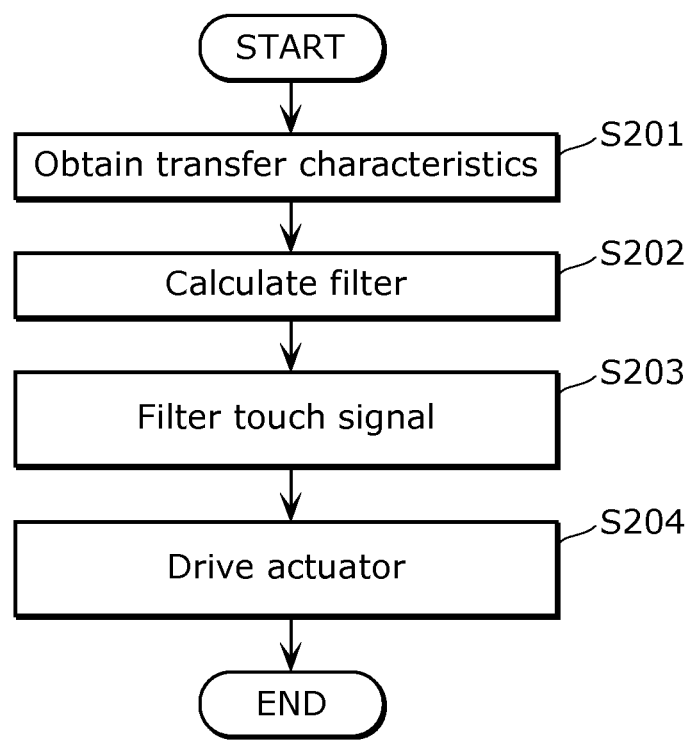
FIG. 11 depicts a flowchart showing an operation of the multi-point simultaneous vibration control unit according to Embodiment 1.
Figure 12:
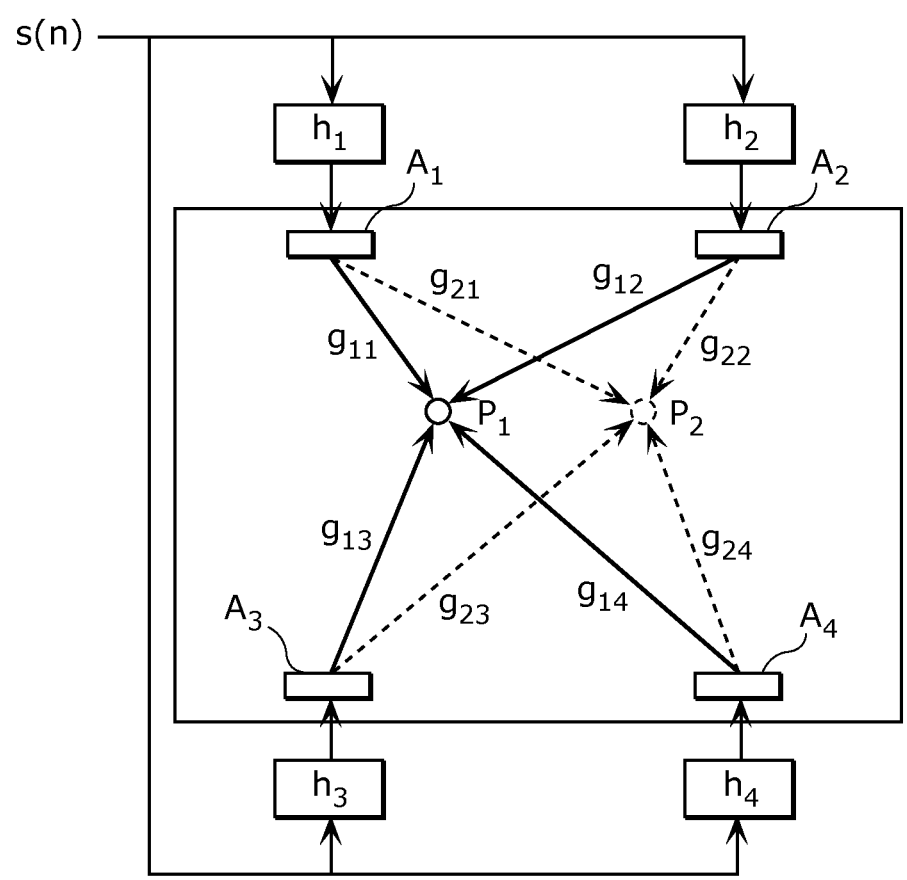
FIG. 12 shows a processing operation of the multi-point simultaneous vibration control unit according to Embodiment 1.

Specifically described next is the operation of each of the constituent elements of the above-structured multi-point simultaneous vibration control unit 109. FIG. 11 depicts a flowchart showing a processing operation of the tactile input and output device 100 according to Embodiment 1. FIG. 12 shows a processing operation of the tactile input and output device 100 according to Embodiment 1.

[Step S201: Obtaining Transfer Characteristic]

The transfer characteristics obtaining unit 202 obtains, from the transfer characteristics storage unit 201, transfer characteristics each corresponding to one of the first touch position and the second touch position determined by the vibration position determining unit 107. As exemplified in FIG. 12, the transfer characteristics obtaining unit 202 reads from the transfer characteristics storage unit 201 (i) transfer characteristics $g_{11}$, $g_{12}$, $g_{13}$, and $g_{14}$ to be respectively observed between the actuators 102 $A_1$, $A_2$, $A_3$, and $A_4$ and the touch position $P_1$ and (ii) transfer characteristics $g_{21}$, $g_{22}$, $g_{23}$, and $g_{24}$ to be respectively observed between the actuators 102 $A_1$, $A_2$, $A_3$, and $A_4$ and the touch position $P_2$. Here, for example, $P_1$ is the first touch position (providing position) and $P_2$ is the second touch position (non-providing position)

[Step S202: Calculating Filter]

Then, the filter calculating unit 203 calculates a filter for providing tactility to the providing position and providing no tactility to the non-providing position. Specifically, the filter calculating unit 203 calculates the filter based on the transfer characteristics to be observed between each of the actuators 102 and the providing position and the transfer characteristics to be observed between each of the actuators 102 and the non-providing position. For example, the filter calculating unit 203 calculates the filter for providing tactility to the touch position P1 and provide no tactility to the touch position P2, based on the transfer characteristics $g_{11}$, $g_{12}$, $g_{13}$, $g_{14}$ $g_{21}$, $g_{22}$, $g_{23}$, and $g_{24}$.

Described below is an exemplary and specific technique to calculate the filter.

Here, Expression (4) represents a transfer characteristic (impulse response) $g_{ij}$ to be observed between the actuator 102 $A_j$ and the touch position $P_i$. Expression (5) represents a filter $h_j$ for generating a drive signal for the actuator 102 $A_j$. Expression (6) represents a response (output) $d_i$ observed at the touch position $P_i$ and made to the inputs to all the actuators 102 $A_1$ to $A_M$.

[Math. 4]

$$g_{ij} = [g_{ij}(0) g_{ij}(1) \ldots g_{ij}(L_g)]^T \quad (4)$$

[Math. 5]

$$h_j = [h_j(0) h_j(1) \ldots h_j(L)]^T \quad (5)$$

[Math. 6]

$$d_i = [d_i(0) d_i(1) \ldots d_i(L_g+L)]^T \quad (6)$$

In Expression (4), $L_g$ represents the length of the impulse response. In Expression (5), L represents the length of the filter (filter length). A longer filter length allows finer control.

Here, considered is the relationship between (i) the filters $h_1$ to $h_M$ and the inputs to the actuators 102 $A_1$ to $A_M$ and (ii) the response $d_i$ at one of the touch positions $P_i$. The response observed at one of the touch positions $P_i$ and made to the input to one of the actuators 102 $A_j$ is obtained by a convolution operation of the filter $h_j$ and the transfer characteristic $g_{ij}$. Then, taking into consideration a response, observed at one of the touch positions $P_i$ and made to the input to one of the actuators 102 $A_j$, for all the actuators 102 $A_1$ to $A_M$, a response $d_i$ can be calculated. Here, the response $d_i$ is observed at one of the touch positions $P_i$ and made to the inputs to all the actuators $A_1$ to $A_M$. In other words, the response $d_i$ can be represented as Expression (7) based on the filter $h_j$ and the transfer characteristic $g_{ij}$.

[Math. 7]

$$D = GH \quad (7)$$

$$D = \begin{bmatrix} d_1(0) \\ d_1(1) \\ \vdots \\ \hline d_N(0) \\ d_N(1) \\ \vdots \end{bmatrix}$$

$$G = \begin{bmatrix} G_{11} & G_{12} & \ldots & G_{1M} \\ G_{21} & G_{22} & \ldots & G_{2M} \\ \vdots & \vdots & \ddots & \vdots \\ G_{N1} & G_{N2} & \ldots & G_{NM} \end{bmatrix}$$

$$G_{ij} = \begin{bmatrix} g_{ij}(0) & 0 & \ldots & 0 & 0 \\ g_{ij}(1) & g_{ij}(0) & \ldots & 0 & 0 \\ g_{ij}(2) & g_{ij}(1) & \ldots & 0 & 0 \\ \vdots & \vdots & \ddots & \vdots & \vdots \\ g_{ij}(L_g) & g_{ij}(L_g-1) & \ldots & g_{ij}(0) & 0 \\ 0 & g_{ij}(L_g) & \ldots & g_{ij}(1) & g_{ij}(0) \\ \vdots & \vdots & \ddots & \vdots & \vdots \\ 0 & 0 & \ldots & 0 & g_{ij}(L_g) \end{bmatrix}$$

$$H = \begin{bmatrix} H_1 \\ H_2 \\ \vdots \\ H_M \end{bmatrix} = \begin{bmatrix} h_1(0) \\ h_1(1) \\ \vdots \\ \hline h_M(0) \\ h_M(1) \\ \vdots \end{bmatrix}$$

As shown in Expression (7), the responses $d_1$ to $d_N$ observed at the touch positions $P_1$ to $P_N$ and made to the inputs to the actuators $A_1$ to $A_M$ are expressed by the sum of the results of convolution operations performed on the filter $h_j$ to be calculated and the transfer characteristics $g_{ij}$ to be observed between each of the actuator 102 $A_j$ and each the touch position $P_i$.

Here, in the case where the calculated filter $h_j$ can (i) create an impulse ($d_k(0)=1$, $d_k(1)=0$, $d_k(2)=0$, ..., $d_k(M)=0$) only from the response $d_k(0<k\le N)$ at the touch position $P_k$ among the touch position $P_1$ to $P_N$, and (ii) set the responses at the other touch position $P_l(0<l\le N, l\ne k)$ to $0(d_l(0)=0, d_l(1)=0, d_l(2)=0, \ldots, d_l(M)=0)$, the filter $h_j$ is a desired one. In other words, the filter $h_j$ that calculated above is used to perform filtering to any given tactile feedback signal to generate a drive signal, so that the drive signal can provide tactility only to the touch position $P_k$ according to the given tactile feedback signal, and cancel tactility to the other touch position $P_l(l\ne k)$.

Hence, the filter calculating unit 203 calculates the filter so that the sum of the results of convolution operations performed in a time domain on the filter and the transfer characteristics from each of the actuators 102 to a providing position indicates an impulse, and the sum of the results of convolution operations performed in the time domain on the filter and the transfer characteristics to be observed between each of the actuators 102 and a non-providing position indicates 0.

The above technique to calculate a filter shall not be limited in particular. An exemplary technique to calculate a filter as seen Expression (8) is to calculate G*; namely, the generalized inverse matrix of G. In other words, H—a desired filter—can be calculated from G* indicating the generalized inverse matrix of G and D indicating an impulse.

[Math. 8]

$$H = G^*D \quad (8)$$

In general, Expression (8) can be solved if the number of actuators (M) is greater than or equal to that of the touch positions (N). In order to stably solve Expression (8) for a combination of any given touch positions, it is desirable that the transfer characteristics $g_{ij}$ from the multiple actuators 102 do not have the same zero point at each touch position. In the case where there are two touch positions, for example, two actuators 102 are arranged to each of the long sides of the panel 101 as shown in FIG. 12. Such an arrangement can make the transfer characteristics different from each other at any given two touch positions.

It is noted that the zero point is a frequency in which the level of a transfer characteristic becomes 0 or infinitely 0 in the frequency domain. In other words, an input includes frequency components of the zero point; however, an output almost never includes such frequency components.

Hence, in the case where the transfer characteristics to be observed between all the actuators 102 and a touch position have zero points at the same frequency, the touch position on the panel 101 does not vibrate at the frequency no matter what signal is inputted. In other words, the vibration cannot be controlled at a specific frequency. Hence, for each of the frequencies to be controlled, it is desirable that the transfer characteristic from at least one actuator 102 is not the zero point.

Figure 13:
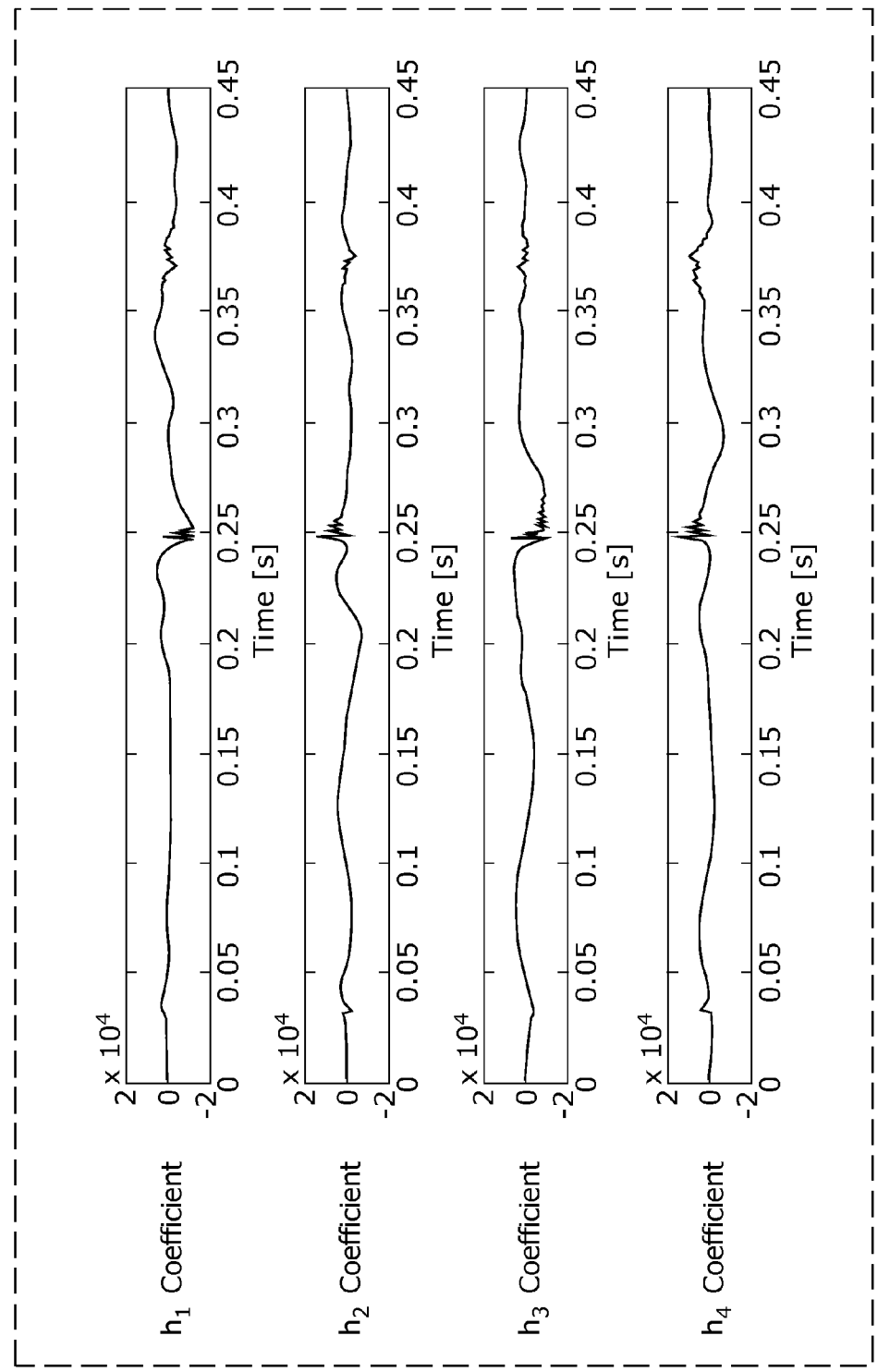
FIG. 13 shows an exemplary filter.

FIG. 13 shows an exemplary filter. Specifically, the filter in FIG. 13 is calculated when the touch position $P_1$ is determined as a providing position in FIG. 12.

[Step S203: Filtering Tactile Feedback Signal]

Next, the filter processing unit 205 performs filtering on a tactile feedback signal stored in the tactile feedback signal storage unit 204, using the filter calculated in Step S202, to generate a drive signal for driving each of the actuators 102. Specifically, the filter processing unit 205 performs a convulsive operation on the tactile feedback signal S(n) and the filter $h_j(n)$ to generate a drive signal for the actuator 102 $A_j$.

Here, as an example, the tactile feedback signal S(n) is determined by the vibration determining unit 108 based on a setting value, and the filtering is performed on the tactile feedback signal shown in FIG. 7A, stored in the tactile feedback signal storage unit 204, and provided to the touch position $P_1$.

Here, the filtering is detailed further.

As shown in Expression (9), the filtering processing unit 109 generates a drive signal $u_j(n)$ for driving the actuator 102 $A_j$. In other words, the filtering unit 109 generates the drive signal $u_j(n)$ by performing a convulsive operation on the tactile feedback signal s(n) and the filter $h_j(n)$ calculated by the filter calculating unit 107.

[Math. 9]

$$u_j(n) = x(n) \otimes h_j(n) = \Sigma x(n-k)h_i(k) \quad (9)$$

Figure 14:
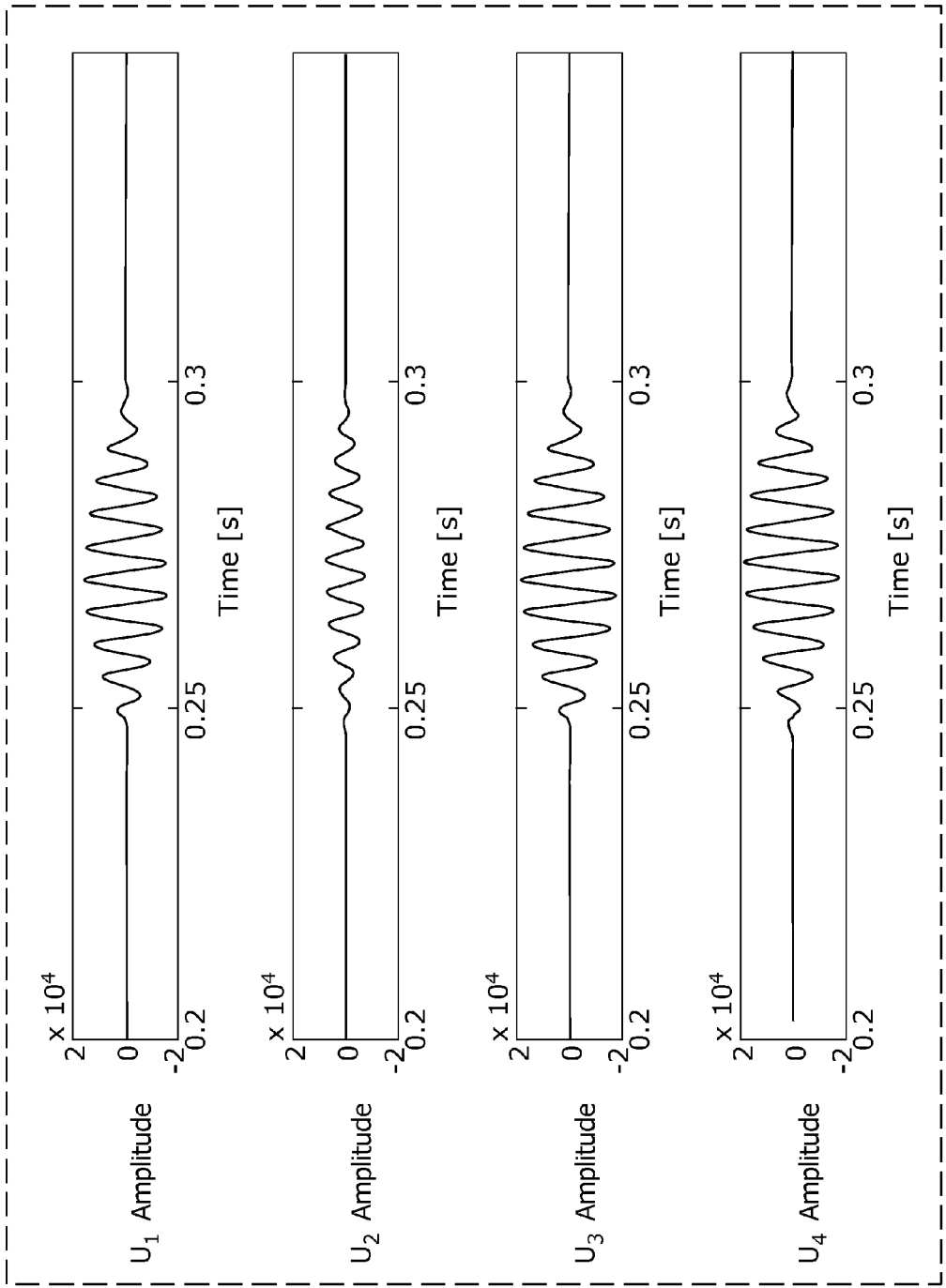
FIG. 14 shows an exemplary drive signal.

FIG. 14 shows an exemplary drive signal. In other words, FIG. 14 exemplifies a drive signal generated by the filter processing unit 205 according to Expression (9). More specifically, FIG. 14 shows a drive signal generated with the filter in FIG. 13 through the processing of the tactile feedback signal in FIG. 7A.

[Step S204: Driving Actuator]

Next, the actuator 102 $A_j$ is driven with the drive signal $u_j(n)$ generated in Step S203. In other words, the actuator 102 $A_j$ vibrates the panel 101 according to the drive signal $u_j(n)$.

It is noted that some kinds of actuators might require high-voltage drive signals. In such a case, the actuators 102 may include amplifiers to amplify the drive signals.

Figure 15:
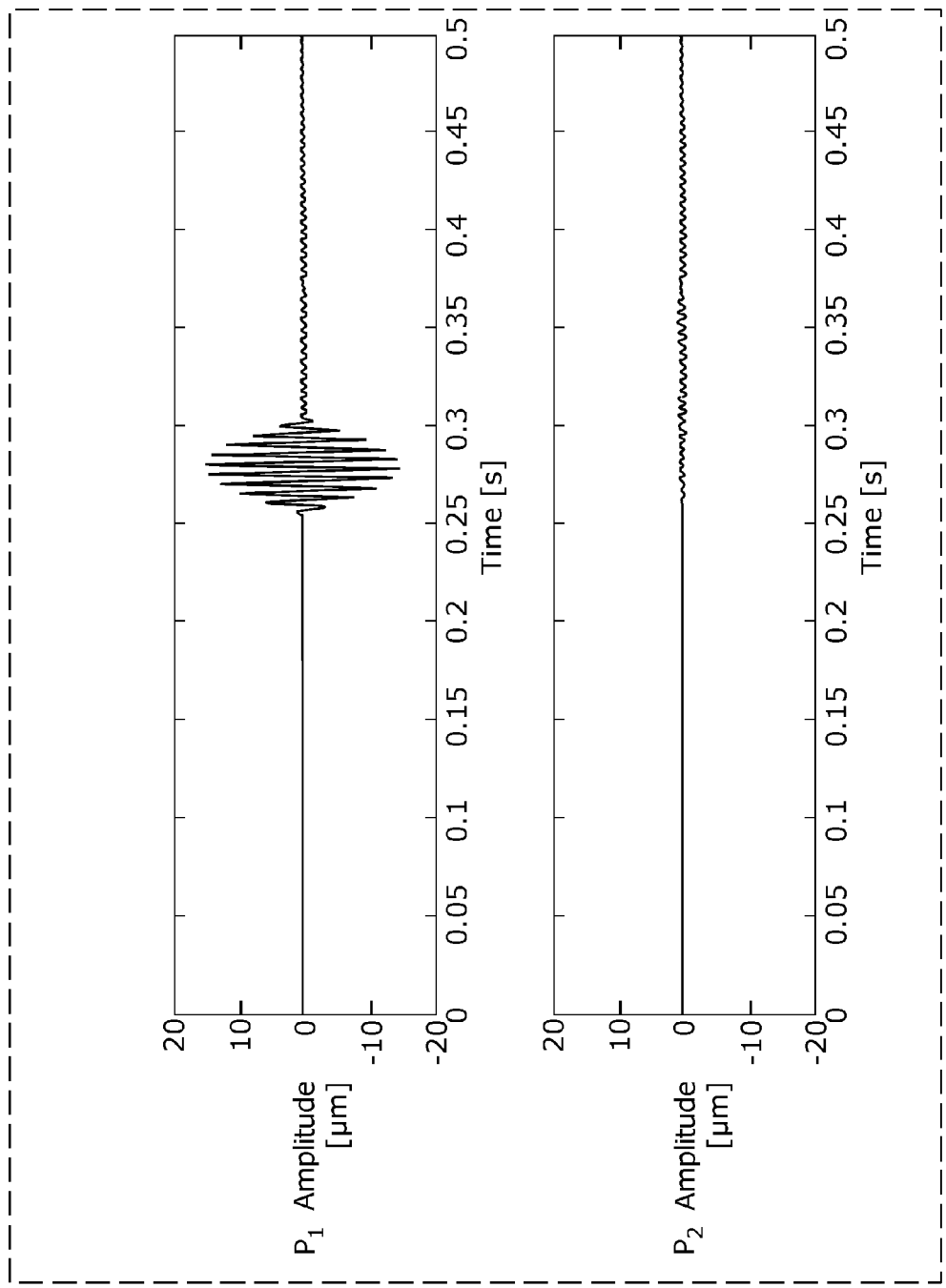
FIG. 15 shows the result of an experiment in vibration at each of touch positions on the panel.

FIG. 15 shows the result of an experiment in vibration at each of touch positions on the panel 101. Specifically, FIG. 15 shows the vibrations at the touch positions $P_1$ and $P_2$ on the panel 101 when the actuators 102 are driven by the drive signals shown in FIG. 15.

At the touch position $P_1$, the difference between the peaks of the vibration (hereinafter referred to as "amplitude intensity") is approximately 30 μm. This shows that the vibration is strong. In contrast, at the touch position P2, the amplitude intensity is approximately 1 μm. This shows that the vibration is too weak for a human to feel.

It is noted that FIG. 15 shows the characteristics of vibrations at the touch positions P1 and P2. The vibrations also occur at the points other than the touch positions $P_1$ and $P_2$. However, the points other than the touch positions $P_1$ and $P_2$ are not touched by the user. Thus, the user does not feel tactility no matter how much vibration occurs.

Thanks to the above structure and operation, the multi-point simultaneous vibration control unit 109 according to Embodiment 1 can provide tactility to the first touch position for providing a vibration, and provide no tactility to the second touch position for providing no vibration. Hence, the multi-point simultaneous vibration control unit 109 can provide tactility in response only to a touch position, among touch positions, to which the tactility needs to be provided.

It is noted that, as Modification 1 of the multi-point simultaneous vibration control unit 109, Embodiment 1 involves calculation of the filter in the time domain. As a matter of course, the filter may be calculated in the frequency domain with less processing load. Moreover, as a matter of course, the processing may be provided only to the frequency with which a human feels tactility, so that the processing load will be reduced.

Furthermore, as Modification 2 of the multi-point simultaneous vibration control unit 109, the processing until the calculation of the filter may be executed off line, so that the processing load will further be reduced.

It is noted that, the following scheme may be employed as Modification 3 of the multi-point simultaneous vibration control unit 109: The drive signals may be calculated for all the patterns of the combinations of multiple touch positions and stored in advance, and selected based on a combination pattern of the touch positions. Such features allows the multi-point simultaneous vibration control unit 109 to reduce its processing load and provide different vibrations for each of the touch positions even though the computational resource for the multi-point simultaneous vibration control unit 109 is low in processing capability.

In addition, the following scheme may be employed as Modification 4 of the multi-point simultaneous vibration control unit 109. The actuators 102 are driven, for example, by drive signals each of which is the sum of a drive signal 1 and a drive signal 2. The drive signal 1 provides the vibration in FIG. 7A to the first touch position $P_1$ and blocks the vibration in FIG. 7A to the second touch position $P_2$. The drive signal 2 provides the vibration in FIG. 7B to $P_2$ as the first touch position and blocks the vibration in FIG. 7B to $P_1$ as the second touch position. Such features allow the multi-point simultaneous vibration control unit 109 to provide to $P_1$ the vibration in FIG. 7A and to simultaneously provide to $P_2$ the vibration in FIG. 7B.

It is noted that the structures and operations of the multi-point simultaneous vibration control unit 109 are examples, and other structures and operations may also be employed as well. For example, the panel may be a flexible display, and include actuators which locally vibrate its surface.

As described above, the tactile input and output device 100 according to Embodiment 1 can control which finger (a touch position in which spatial order) of the user is to receive the vibration based on the spatial order of touch positions each previously associated with a corresponding one of multiple pieces of setting information to be used as options. Such features allow the user to easily check which piece of the setting information is received by the device. Moreover, such features make it possible to associate the spatial order of the touch positions with the setting information. Hence, the user can easily select multiple pieces of the setting information at any given position on the panel without selecting a GUI set on a specific position on the panel—that is watching the panel.

Embodiment 2

In addition to determining the tap input of Embodiment 1 which a user performs to selectively tap multiple touch positions, Embodiment 2 is devised to determine a shift input by which the user shifts the touch positions with his or her fingers kept touching the touch positions, and change, based on the shifting direction, the touch positions that provide vibrations. Consequently, the user can check through tactility the direction of the shift input and the moving direction of the target to be operated which the device has received.

Figure 16:
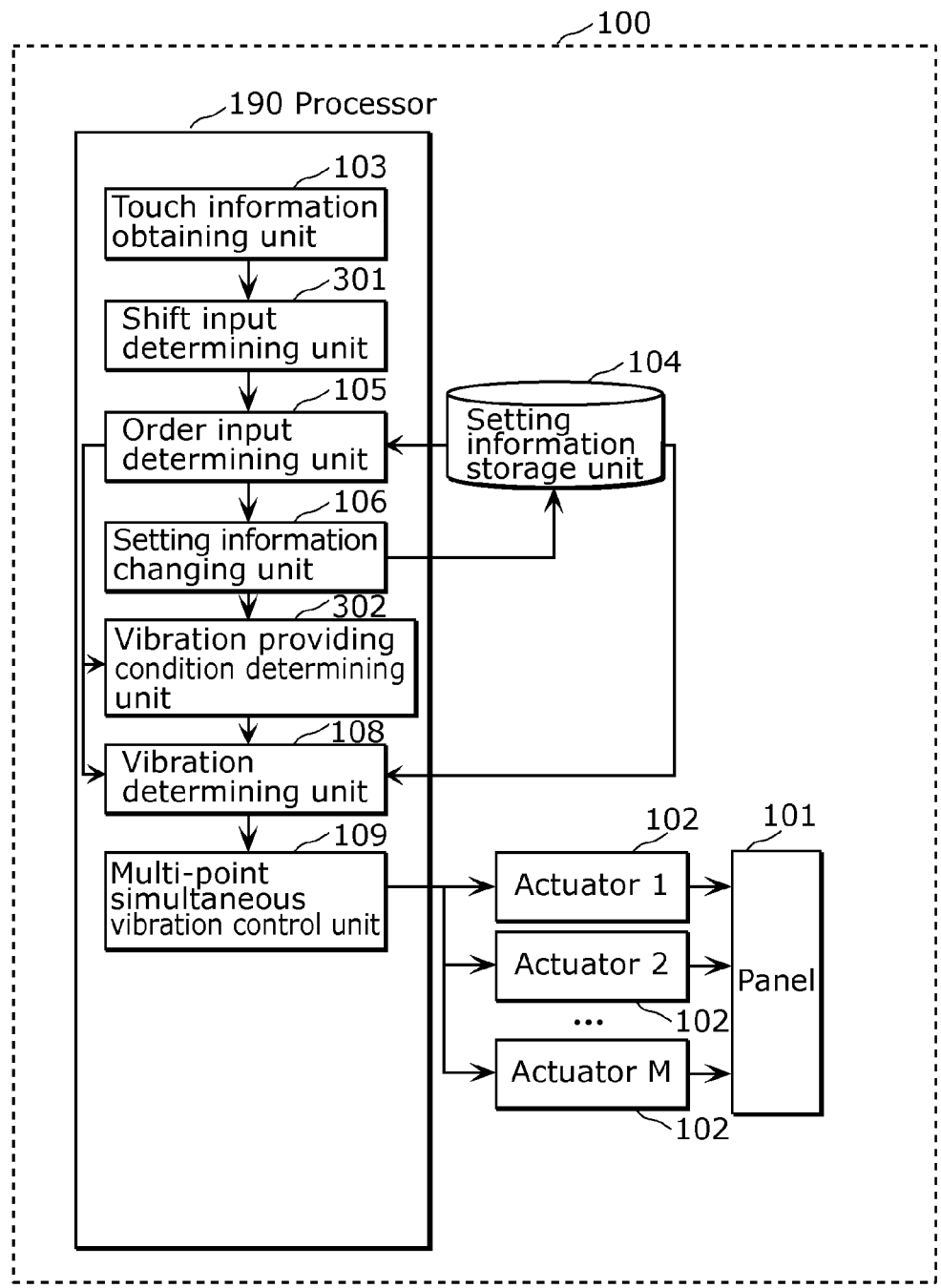
FIG. 16 depicts a block diagram showing a structure of a tactile input and output device according to Embodiment 2.

FIG. 16 depicts a block diagram showing a structure of a tactile input and output device according to Embodiment 2 of the present disclosure. The same numerical signs are assigned to the same constituent elements as those in the block diagrams showing the features of Embodiment 1. Embodiment 2 mainly describes the structures and operations of a shift input determining unit 301 and a vibration providing condition determining unit 302, which are not described in Embodiment 1.

[Shift Input Determining Unit 301]

Based on time-series information of multiple touch positions to be detected by the touch information obtaining unit 103 in response to the touch input to the panel 101, the shift input determining unit 301 calculates the shifts of the touch positions in the same direction and the spatial order of the touch positions with respect to the shifting direction. The setting information storage unit 104 stores pieces of setting information in association with the shifting direction. The shift input determining unit 301 compares the shifting direction with the pieces of the setting information stored in the setting information storage unit 104 and determines one of the pieces of the setting information corresponding to the shifting direction.

[Vibration Providing Condition Determining Unit 302]

The vibration providing condition determining unit 302 calculates the starting touch position with respect to the shifting direction among the touch positions, and determines the starting touch position as the first touch position for providing a vibration and another one of the touch positions than the starting touch position as a second touch position for providing no vibration. Such determination is also made in the case where the touch positions stay still where the shifts end.

The operation of the above-structured tactile input and output device 100 according to Embodiment 2 shall be described with reference to FIGS. 17 to 19.

Figure 17:
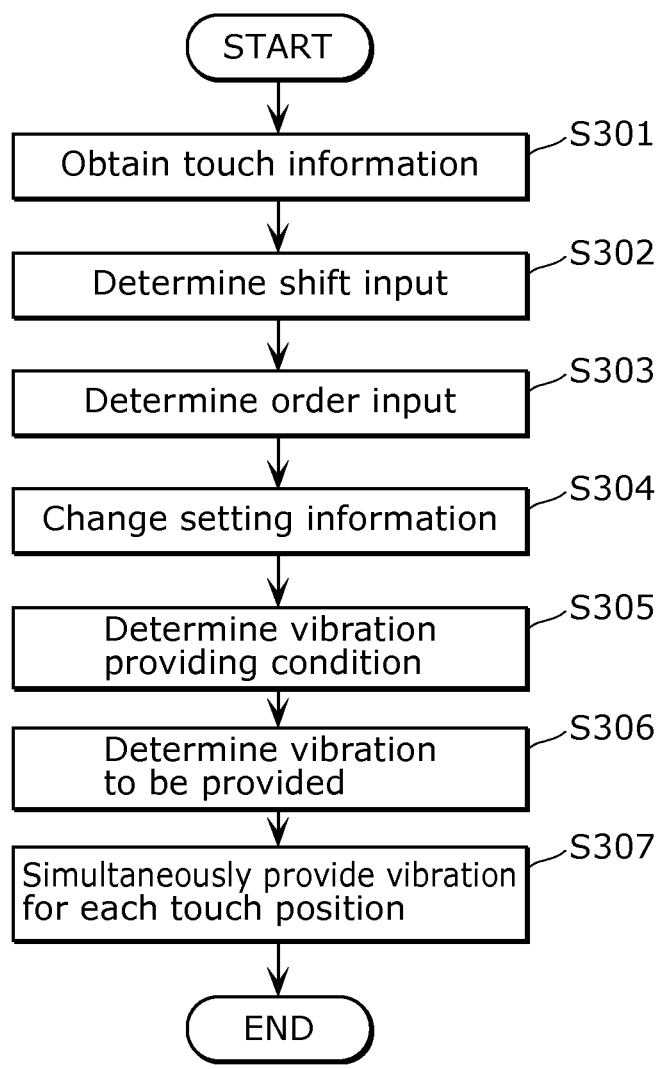
FIG. 17 depicts a flowchart showing an operation of the tactile input and output device according to Embodiment 2.

FIG. 17 depicts a flowchart showing an operation of the tactile input and output device 100 according to Embodiment 2.

Here, Embodiment 2 describes the operation in an exemplary case where the tactile input and output device 100 according to Embodiment 2 is included in an in-vehicle system such as a car navigation system. FIG. 18 shows exemplary setting items which the user inputs. Exemplified here is a sequence of determining the inputs [1] to [10] shown in FIG. 18, such as inputs for map scrolling, volume setting, and track setting, and providing through tactility a feedback to the user of an input result received by the tactile input and output device 100. As an exemplary in-vehicle system, the system may include the monitor 110 displaying a map and the like, and the panel 101 provided over the monitor 110 and made of a clear material. The panel 101 may also be separated from the monitor 110, and provided on the center console or an armrest. No matter how the tactile input and output device 100 is structured, Embodiment 2 is devised to allow the user not to watch the panel 101 when he or she is performing an input operation.

[Step S301: Obtaining Touch Information]

Figure 19A:
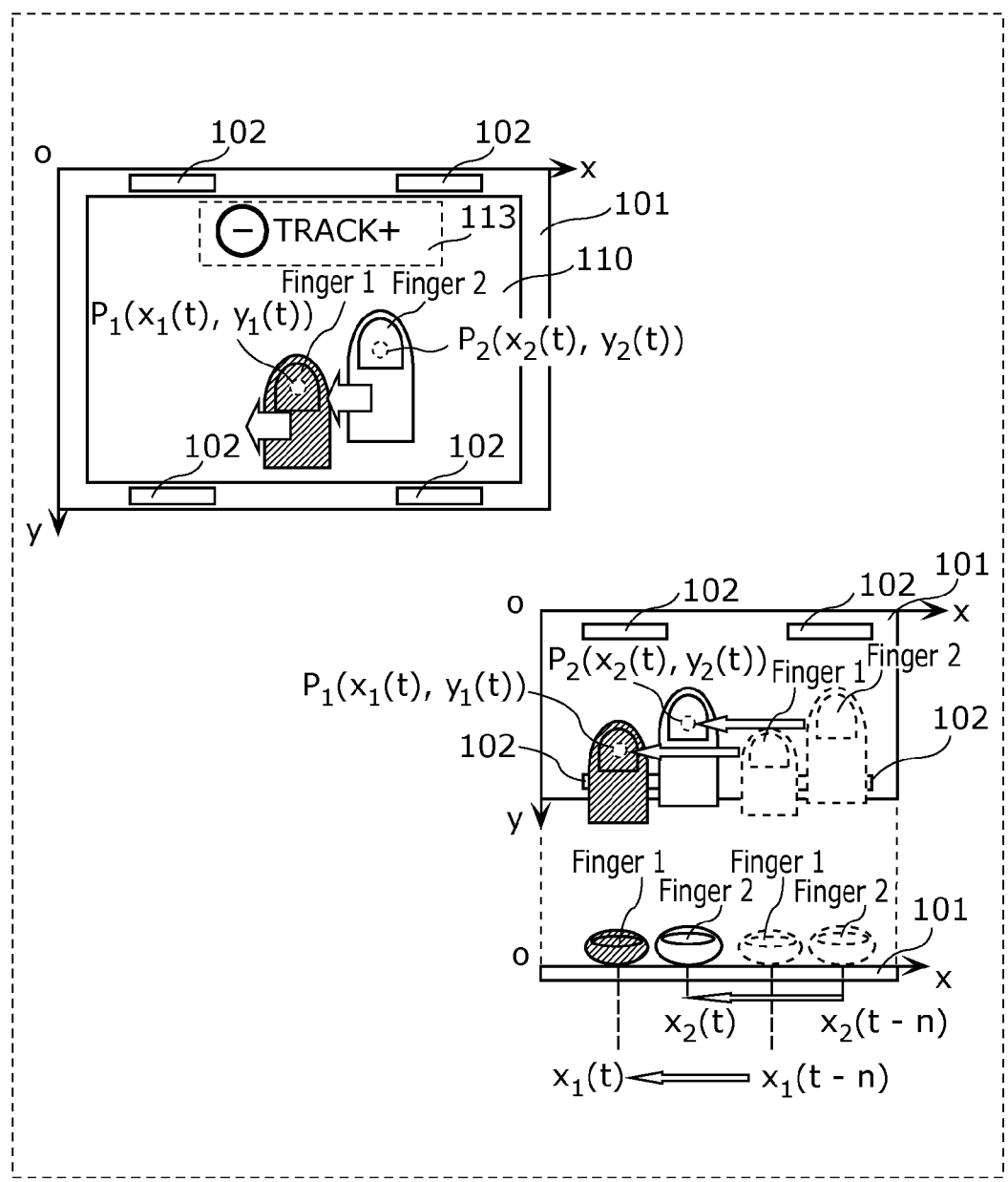
FIG. 19A shows an exemplary touch input for changing previous track setting.

The touch information obtaining unit 103 obtains, as time-series information, multiple touch positions shown by the user on the panel 101. When the user touches the panel 101 with two of his or her fingers, or the fingers 1 and 2, as shown in FIG. 19A, for example, the touch information obtaining unit 103 obtains, for an exemplary predetermined sampling interval $\Delta t$ of 20 ms, the touch position $P_1(x_1(t), y_1(t))$ of the finger 1 and the touch position $P_2(x_2(t), y_2(t))$ of the finger 2 at a time t.

[Step S302: Determining Shift Input]

Based on time-series information of multiple touch positions to be detected on the panel 101, the shift input determining unit 301 calculates the shifts of the touch positions in the same direction and the spatial order of the touch positions with respect to the shifting direction. The setting information storage unit 104 stores pieces of setting information in association with the shifting direction. Based on the shifting direction, the shift input determining unit 301 compares the spatial order with the setting information stored in the pieces of setting information storage unit 104 to determine one of the pieces of the setting information corresponding to the spatial information.

The shifting direction of the touch positions are calculated as described below. Calculated here is a shifting direction when the touch positions are shifted with the fingers left touched on the panel 101, based on the time-series information of the touch positions obtained in Step S301. Specifically, for each sampling interval $\Delta t$, a shifting vector $v1(x_1(t)-x1(t-1), y_1(t)-y1(t-1))$ represents the shifting direction of the touch position $P_1$, and a shifting vector $v2 (x_2(t)-x_2(t-1), y_2(t)-y_2(t-1))$ represents the shifting direction of the touch position $P_2$.

The shifting direction of the touch positions $P_1$ and $P_2$ are determined to be the same in the case where, for example, the cosine value of the angle $\theta$ between the shifting vectors v1 and v2 is smaller than a predetermined threshold value.

The shifting distances of the touch positions are calculated as described below. Expression (10) shows how to obtain a shifting distance $d_1(t)$ of a touch position between the time when the user touches the panel 101 with the finger 1 (t=0, the shifting starting position $P_1(x_1(0), y_1(0))$ and the time t (the touch position $P_1(x_1(t), y_1(t))$). Here, the shift input determining unit 301 determines that the shift of the touch position $P_1$ by the swipe of the finger 1 has stopped in the case where (i) the touch position $P_1(x_1(t), y_1(t))$ obtained at the time t and the touch position $P_1(x_1(t-1), y_1(t-1))$ obtained at the time $(t-\Delta t)$ are the same or (ii) the distance between the $P1(x_1(t), y_1(t))$ and the $P_1(x_1(t-1), y_1(t-1))$ is shorter than a predetermined distance. When determining that the touch position stopped shifting, the shift input determining unit 301 initializes the shifting starting position with $P_1(x_1(0), y_1(0))$. Setting, as the basing point, the time when the touch position is determined to stop shifting, the shift input determining unit 301, for each sampling interval $\Delta t$, checks whether or not a touch stops the same position as the shift of the touch position stopped, and records and updates the stopping time period t1s.

Expression (10) also shows how to obtain the shifting distance $d_2(t)$ of the touch position $P_2$ with the finger 2. The shift input determining unit 301 also records and updates the stopping time period t2s of $P_2$.

[Math. 10]

$$d_1(t) = \sum_{t=1}^{t} \sqrt{(x_1(t) - x_1(t-1))^2 + (y_1(t) - y_1(t-1))^2} \quad (10)$$

The spatial order of the touch positions to a shifting direction is calculated below. The touch positions $P_1$ and $P_2$ are projected on a straight line including either the shifting vector v1 or the shifting vector v2, and the order of the touch positions $P_1$ and $P_2$ is determined where the shifting direction is positive. Either the shifting vectors v1 or v2 may be selected. Here, the selected shifting vector may be the one whose shifting distance calculated in the above sequence is longer.

Described hereinafter is the sequence of how to determine a touch input of the user, based on the spatial order and the stopping time period of the touch position with respect to the shifting direction, the shifting distance, and the shifting direction of the touch positions calculated in the above sequence. As an example, described here is the sequence of how to determine which one is the user's touch input out of the inputs [1] to [10] shown in FIG. 18.

[Input Determination of Map Scrolling]

Input determination [1] is made when the touch information detecting unit 103 detects one touch, and the touch position $P_1$ is shifting in the direction along the shifting vector v1. Here, "map scrolling" is selected as the setting item. A specific input item to be selected is "shifting distance scrolling" for scrolling the map as far as the shifting distance of the touch position.

Input determination [2] is made when the touch information detecting unit 103 detects one touch, and the touch position $P_1$ shifts along the shifting vector v1, the shifting distance is greater than or equal to a predetermined threshold value D, and the stopping time period t1s of the touch position $P_1$ is greater than or equal to a predetermined threshold value Ts. Here, "map scrolling" is selected as the setting item. A specific input item to be selected is "continuous scrolling" for continuously scrolling the map when the touch position shifts as far as a predetermined distance and stops for a while.

[Input Determination of Volume Setting]

Each of Input determinations [3] and [5] is made when the touch information detecting unit 103 detects two touches, and the touch position does not shift. The processing proceeds to the order input determination in Step S303. Here, "volume setting" is selected as the setting item.

[Determining Input for Track Setting]

Each of Input determinations [7] to [10] is made when the touch information detecting unit 103 detects two touches as detected in the input determinations [3] to [6]. The input determinations [7] to [10] are detected when the shifting directions v1 and v2 of the touch positions are the same, and the shifting distances of the touch positions are greater than or equal to the predetermined threshold value D. Here, "track setting" is selected as the setting item. The track setting is an input operation by the user of audio equipment for changing a track of an album to the next track or to the track before.

Input determination [7] is made when the touch information detecting unit 103 detects two touches, the shifting directions v1 and v2 of the touch positions $P_1$ and $P_2$ are the same, the shifting directions are negative on a predetermined coordinate axis, and the shifting distances of the touch positions are greater than or equal to the predetermined threshold value D. Here, "track down" is selected as the input item. FIG. 19A shows an exemplary touch input for changing previous track setting. At the time (t−n), each of the fingers 1 and 2 simultaneously touches the panel 101. Each of the touch positions $P_1$ and $P_2$ is $x_1(t-n)$ and $x_2(t-n)$, respectively. Here, n is the number of samplings, and represents n samplings before the current time t. The shifting directions of the touch positions $P_1$ and $P_2$ of the fingers 1 and 2 are respectively represented as $v1=x_1(t)-x_1(t-n)$ and $v2=x_2(t)-x_2(t-n)$. The example of FIG. 19A shows the following: When the touch positions $P_2$ and $P_2$ shift in the same direction in parallel to a predetermined coordinate axis x, the shifting direction is negative, and the shifting distance $|v1|$ of $P_1$ or the shifting distance $|v2|$ of $P_2$ is greater than or equal to the predetermined threshold value D, and "track down" is selected as the input item.

Input determination [8] is made when the touch information detecting unit 103 detects two touches, the shifting directions v1 and v2 of the touch positions are the same, the shifting directions are negative on the predetermined coordinate axis, the shifting distances of the touch positions are greater than or equal to the predetermined threshold value D, and the stopping time period t1s of the touch positions is greater than or equal to a predetermined threshold value Ts. Here, "continuous track down" is selected as the input item.

Figure 19B:
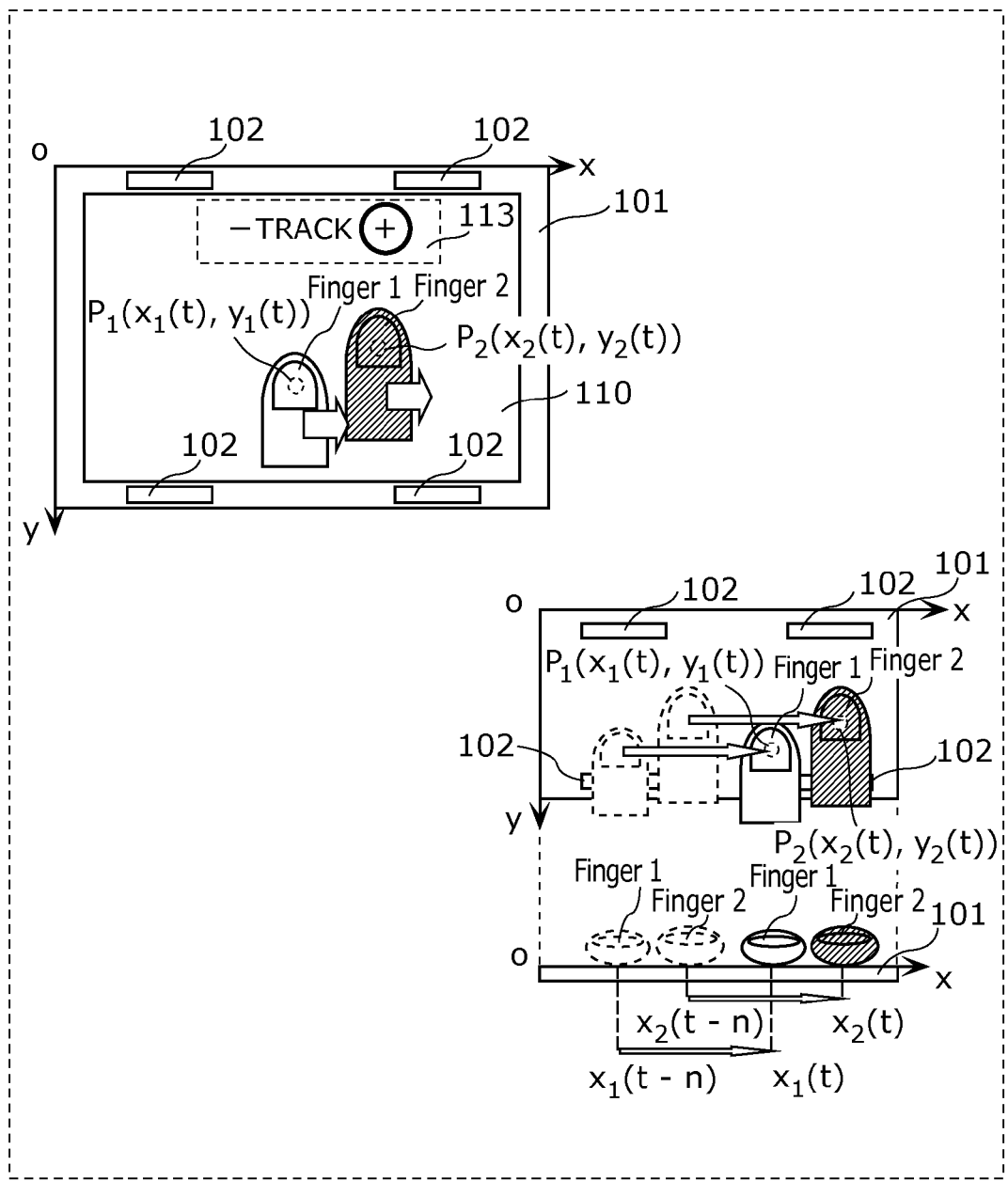
FIG. 19B shows an exemplary touch input for changing subsequent track setting.

Input determination [9] is made when the touch information detecting unit 103 detects two touches, the shifting directions v1 and v2 of the touch positions are the same, the shifting directions are positive on the predetermined coordinate axis, and the shifting distances of the touch positions are greater than or equal to the predetermined threshold value D. Here, "track up" is selected as the input item. FIG. 19B shows an exemplary touch input for changing subsequent track setting. At the time (t−n), each of the fingers 1 and 2 simultaneously touches the panel 101. Each of the touch position $P_1$ and $P_2$ is $x_1(t-n)$ and $x_2(t-n)$, respectively. Here, n is the number of samplings, and represents n samplings before the current time t. The shifting directions of the touch positions $P_1$ and $P_2$ of the fingers 1 and 2 are respectively represented as $v1=x_1(t)-x_1(t-n)$ and $v2=x_2(t)-x_2(t-n)$. The example of FIG. 19A shows the following: When the touch positions $P_2$ and $P_2$ shift in the same direction in parallel to the predetermined coordinate axis x, the shifting direction is positive, and the shifting distance $|v1|$ of $P_1$ or the shifting distance $|v2|$ of $P_2$ is greater than or equal to the predetermined threshold value D, "track up" is selected as the input item.

Input determination [10] is made when the touch information detecting unit 103 detects two touches, the shifting directions v1 and v2 of the touch positions are the same, the shifting directions are positive on the predetermined coordinate axis, the shifting distances of the touch positions are greater than or equal to the predetermined threshold value D, and the stopping time period t1s of the touch positions is greater than or equal to the predetermined threshold value Ts. Here, "continuous track up" is selected as the input item.

It is noted that exemplified here are the cases where the input determinations are made based on the threshold value for the shifting distances; moreover, the input determinations may be made based on a shifting speed. The use of a shifting speed contributes to selecting an input item and setting a setting value in more detail.

[Step S303: Determining Order Input]

As shown in Step S102 in Embodiment 1, the order input determining unit 105 detects that the user has performed tap input on the panel 101. In other words, the order input determining unit 105 determines, based on a spatial order of touch positions calculated from a touch position continuously detected on the panel 101 and another touch position simultaneously detected on the panel 101, an input item previously stored in the setting information storage unit 104 in association with the spatial order of touch positions.

When two touches are detected by the touch information detecting unit 103 and the touch positions do not shift in Embodiment 2, the order input determining unit 105 determines that the setting item is the volume setting indicated in Input determinations [3] to [6] in FIG. 18.

Input determinations [3] and [5] are made when two touches are detected by the touch information obtaining unit 103 and the two touches do not shift. Here, "volume setting" is selected as the setting item. Input determinations [3] and [5] are the same operations as the volume setting in Embodiment 1, and thus the details thereof shall be omitted.

Input determinations [4] and [6] are made when two touches are detected by the touch information obtaining unit 103, the two touches do not shift, and the stopping time period of the touch positions is greater than or equal to the predetermined threshold value Ts. Here, "continuous volume down" is selected as an input item when the spatial order of a touch position is the first touch position in the order, and "continuous volume up" is selected as an input item when the spatial order of a touch position is the second touch position in the order.

In Step S303, the order input determining unit 105 determines a tap input and a shift input. Hence, the user can easily perform a different input operation with the same number of touches.

[Step S304 Changing Setting Information]

The setting information changing unit 106 changes the setting values of the setting items determined by the shift input determining unit 301 and the order input determining unit 105.

[Changing Setting Value for Map Scrolling]

Described here is how to change a setting value for map scrolling, with reference to FIG. 18.

When Input determination [1] is made, the display area of the map to be displayed on the monitor 110 is shifted as far as the shifting distance $|v1|$ in the shifting direction v1 of the touch position $P_1$. In shifting the display area, for example, the user may designate an area to be displayed on the monitor 110 using the coordinate system of the map. When the user designate the area to be displayed in a rectangle, for example, the user can scroll the map by setting the top-left corner of the rectangle as the display reference coordinates for the map and shifting the display reference coordinates in −v1 direction.

When Input determination [2] is made and "continuous scrolling"—that is to continuously scroll the map when the touch position $P_1$ shifts farther than or equal to the predetermined distance D and stops for a while—is selected, the user continuously shifts the display reference coordinates of the map in the direction of $-\alpha v1$ at a predetermined time interval. Here, $\alpha$ represents a constant for controlling a shifting distance. For example, the constant $\alpha$ may be changed based on a shifting speed representing the shifting distance of the touch position $P_1$ per unit time period. Hence, when the touch position $P_1$ shifts fast and stops, the value of $\alpha$ is made larger and the shifting distance of a display reference position is made longer. In contrast, when the touch position $P_1$ shifts slow, the value of $\alpha$ is made smaller and the shifting distance of a display reference position is made shorter. Such features make it possible to easily set the shifting distance in scrolling depending on the intension of the user.

[Changing Setting Value for Volume Setting]

Described here is how to change a setting value for volume setting, with reference to FIG. 18.

When the input determination [3] is made—that is when the user performs a tap input at the first touch position in the order of the two touch positions—"volume down" is selected as the input item corresponding to the tap input. Here, the increase or decrease level of the setting value $\Delta V$ is −1, and the volume is decreased by 1 based on the volume level $V=V+\Delta V$. The monitor 110 may display the setting value displaying unit 113 in order to show the setting value to the user.

When Input determination [4] is made—that is when the user performs a tap input at the first touch position in the order of the two touch positions and the tap-inputted touch position is continuously detected for longer than or equal to the predetermined time period Ts—"continuous volume down" is selected as the input item corresponding to the tap input. Here, the increase or decrease level of the setting value $\Delta V$ is −1, and the volume is decreased by 1 based on the volume level $V=V+\Delta V$ at a predetermined time interval of, for example, Ts. The monitor 110 may display the setting value displaying unit 113 in order to show the setting value to the user.

When the input determination [5] is made—that is when the user performs a tap input at the second touch position in the order touch position of the two touch positions—"volume up" is selected as the input item corresponding to the tap input. Here, the increase or decrease level of the setting value $\Delta V$ is +1, and the volume is increased by 1 based on the volume level $V=V+\Delta V$. The monitor 110 may display the setting value displaying unit 113 in order to show the setting value to the user.

When the input determination [6] is made—that is when the user performs a tap input at the second touch position in the order touch position of the two touch positions and the tap-inputted touch position is continuously detected for longer than or equal to the predetermined time period Ts—"continuous volume up" is selected as the input item corresponding to the tap input. Here, the increase or decrease level of the setting value $\Delta V$ is +1, and the volume is increased by 1 based on the volume level $V=V+\Delta V$ at the predetermined time interval of, for example, Ts. The monitor 110 may display the setting value displaying unit 113 in order to show the setting value to the user.

[Changing Setting Value for Track Setting]

Described here is how to change a setting value for volume setting, with reference to FIG. 18. Exemplified here is the case where the track number Nt of a music title is set in operating audio equipment.

When Input determination [7] is made—that is when two touches are detected, the shifting directions $v_1$ and $v_2$ of the touch positions $P_1$ and $P_2$ are the same, the shifting directions are negative on a predetermined coordinate axis, and the shifting distances of the touch positions are greater than or equal to the predetermined threshold value D—"track down" is selected as the input item. Here, the increase or decrease level of the setting value $\Delta Nt$ is −1, and the track number is decreased by 1 based on $Nt=Nt+\Delta Nt$. The monitor 110 may display the setting value displaying unit 113 in order to show the setting value to the user.

When Input determination [8] is made—that is when two touches are detected, the shifting directions $v_1$ and $v_2$ of the touch positions $P_1$ and $P_2$ are the same, the shifting directions are negative on a predetermined coordinate axis, the shifting distances of the touch positions are greater than or equal to the predetermined threshold value D, and the stopping time period t1s of the touch positions is greater than or equal to a predetermined threshold value Ts—, "continuous track down" is selected as the input item. Here, the increase or decrease level of the setting value $\Delta Nt$ is −1, and the track number is decreased by 1 based on $Nt=Nt+\Delta Nt$ at a predetermined time interval of, for example, Ts. The monitor 110 may display the setting value displaying unit 113 in order to show the setting value to the user.

When Input determination [9] is made—that is when two touches are detected, the shifting directions $v_1$ and $v_2$ of the touch positions touch positions $P_1$ and $P_2$ are the same, the shifting directions are positive on the predetermined coordinate axis, and the shifting distances of the touch positions are greater than or equal to the predetermined threshold value D—, "track up" is selected as the input item. Here, the increase or decrease level of the setting value $\Delta Nt$ is +1, and the track number is increased by 1 based on $Nt=Nt+\Delta Nt$. Here, the monitor 110 may display the setting value displaying unit 113 in order to show the setting value to the user.

When Input determination [10] is made—that is when two touches are detected, the shifting directions $v_1$ and $v_2$ of the touch positions $P_1$ and $P_2$ are the same, the shifting directions are positive on the predetermined coordinate axis, the shifting distances of the touch positions are greater than or equal to the predetermined threshold value D, and the stopping time period t1s of the touch positions is greater than or equal to the predetermined threshold value Ts—, "continuous track up" is selected as the input item. Here, the increase or decrease level of the setting value $\Delta Nt$ is +1, and the track number is increased by 1 based on $Nt=Nt+\Delta Nt$. The monitor 110 may display the setting value displaying unit 113 in order to show the setting value to the user.

It is noted that the time interval Ts for setting a track number may be changed based on the shifting speed of the touch positions $P_1$ and $P_2$. Hence, when the touch positions $P_1$ and $P_2$ shift fast and stop, Ts may be made shorter and the track number may be changed at a shorter time interval. In contrast, when the touch positions $P_1$ and $P_2$ shift slow, Ts may be made longer and the track number may be changed slowly. Such features make it possible to easily set the change of the track number, depending on the intension of the user.

It is noted that in the case where there is a variation in easy-to-input shifting distance of a touch position user by user, the input determination based on a shifting distance is made, using the cumulative distance of shifting distances. Specifically, the input may be determined based on whether or not the cumulative value of the shifting distances by the shifts of multiple touch positions is greater than or equal to the predetermined threshold value D.

[Step S305: Determining Vibration Providing Condition]

When the user performs a shift input in which touch positions shift, the vibration providing condition determining unit 302 calculates the starting touch position to the shifting direction among the touch positions, and determines the starting touch position as the first touch position for providing a vibration and another one of the touch positions than the starting touch position as the second touch position for providing no vibration. Such determination is also made in the case where the touch positions stay still at the positions where the shifts end.

When an order input for determining the spatial order of the latest touch position is performed, the vibration providing condition determining unit 302 determines the first touch position for providing a vibration and the second touch position for providing no vibration. The first touch position is found in the spatial order corresponding to the determined input item. The second touch position is other than the first touch position.

FIG. 18 shows the first touch positions that provide vibrations in Input determinations [1] to [10]. Described below are conditions for providing vibrations.

[Vibration Providing Condition in Map Scrolling]

When Input determination [1] is made—that is when the determination is for "shifting distance map scrolling" based on the shifting distance of a touch position—, the touched one point is determined as the vibration position.

The vibration providing condition is determined based on the shifting distance of a touch position. For example, the vibration providing condition is determined based on the reduction scale of a map and the shifting distance of the map based on the shifting distance of the touch position. In other words, the vibration providing condition determining unit 302 obtains, for example, the reduction scale of the current map. When the map is displayed with the reference distance of 100 m, the vibration providing condition determining unit 302 may provide a vibration to the touch position $P_1$ when the touch position $P_1$ shifts the shifting distance of every 100 m on the map scale. Such a feature allows the user not to watch the map displayed on the monitor, so that the user can recognize how much he or she has shifted the map through tactility.

As a modification, in the case where the map area is not to be shifted but to be fixed, a vibration may be provided for each predetermined distance when a touch position is shifted on the map. Such a feature allows the user to recognize, through tactility, the distance to the destination and the distance halfway to the destination.

As another modification, a reference distance may be presented to the user with vocal guidance when, for example, the user starts to shift a touch position. Such a feature allows the user to understand, through tactility, the distance of, for example, 100 m, 200 m, and 300 m by counting how often the vibrations are presented. Furthermore, the vocal guidance may be presented in conjunction with the tactility for each predetermined distance of, for example, 300 m and 500 m. Frequently provided vocal feedbacks could be troublesome to the user in some cases. The use of vibration feedbacks in conjunction with vocal feedbacks can inform the user of necessary information in an appropriate measure.

When Input determination [2] is made—that is when the determination is for "continuous scrolling" based on the shifting distance of a touch position and the stopping time period of the touch position after the shift—, the touched one point is determined as the vibration position.

The vibration providing condition is determined based on the shifting distance and the stopping time period of a touch position. For example, for each distance for which the automatically scrolling map shifts, the shifting distance may be presented to the user through a tactile feedback with the vibration of the touch position. The touch position may be vibrated for each time a stopping time period passes for the predetermined threshold value Ts. In the case where the user has previously known how fast the map shifts, he or she can recognize how much time has passed by the times of vibrations to be presented, and approximately understand the shifting distance of the map.

It is noted that, as a modification, the vibrations may be provided when a previously stored facility is either displayed on the monitor 110 with the shift of the map, or arrives at a position on the map where the related information of the facility was obtained through a network and the vehicle information and communication system (VICS). Such a feature allows the user not to watch the map while he or she is shifting the map. When the feature is applied to, for example, an in-vehicle system, the user can concentrate on driving. In playing a content item, the user can concentrate on the content item.

As a modification, when the user continuously scrolls a list of content items such as video and music, a vibration may be provided when the categories or the albums change.

As a modification, when the user continuously turns the pages of an electronic book forward or backward along with the shifting direction of a touch position, a vibration may be provided when a previously marked page or a page whose content has been updated is displayed.

As a modification, when the user scrolls a map by shifting simultaneously-detected two touch positions, a vibration may be provided to the starting touch position with respect to the shifting direction of the map or of the fingers so that the user can check whether or not the shifting direction of the map and of the touch positions has been received as the user intends so. Moreover, when the user simultaneously shifts the two touch positions for a predetermined distance and stops the touch positions, and keeps touching the positions where the shift ends, a vibration may be provided to the starting touch position at a predetermined time period in order to show the shifting direction of the map. Furthermore, a vibration may be provided when a landmark such as a surrounding facility and a destination are displayed on the map of the monitor 110.

[Vibration Providing Condition for Volume Setting]

When the input setting [3] is determined—that is when the user performs a tap input at the first touch position in the order of the two touch positions—"volume down" is selected as the input item corresponding to the tap input. Here, of the two touch positions, the first touch position in the order is determined as the first touch position for providing a vibration, and the other is determined as the second touch position for providing no vibration. Hence, based on the spatial order of the fingers to which the vibration is provided, the user can recognize through tactility that "volume down" has been selected.

When the input setting [4] is determined—that is when the user performs a tap input at the first touch position in the order of the two touch positions and the tap-inputted touch position is continuously detected for longer than or equal to the predetermined time period Ts—"continuous volume down" is selected as the input item corresponding to the tap input. Here, of the two touch positions, the first touch position in the order is determined as the first touch position for providing a vibration, and the other is determined as the second touch position for providing no vibration. Moreover, it is determined that the vibration is provided to the first touch position for each time the touch position is continuously detected longer than or equal to the predetermined time period Ts. Hence, based on the spatial order of the fingers to which the vibration is provided and the continuously provided vibration, the user can recognize through tactility that "continuous volume down" has been selected.

When the input setting [5] is determined—that is when the user performs a tap input at the second touch position in the order touch position of the two touch positions—"volume up" is selected as the input item corresponding to the tap input. Here, of the two touch positions, the one in second touch position in the order is determined as the first touch position for providing a vibration, and the other is determined as the second touch position for providing no vibration. Hence, based on the spatial order of the fingers to which the vibration is provided, the user can recognize through tactility that "volume up" has been selected.

When the input setting [6] is determined—that is when the user performs a tap input at the second touch position in the order touch position of the two touch positions and the tap-inputted touch position is continuously detected for longer than or equal to the predetermined time period Ts—, "continuous volume up" is selected as the input item corresponding to the tap input. Here, of the two touch positions, the one in second touch position in the order is determined as the first touch position for providing a vibration, and the other is determined as the second touch position for providing no vibration. Moreover, it is determined that the vibration is provided to the first touch position for each time the touch position is continuously detected longer than or equal to the predetermined time period Ts. Hence, thanks to the spatial order of the fingers to which the vibration is provided and the continuously provided vibration, the user can recognize through tactility that "continuous volume up" has been selected.

It is noted that, here, the input items of "volume down" and "volume up" are respectively assigned to the first touch position in the order and the second touch position in the order touch position, and the input item of the more recent touch position of the two touch positions is selected. Instead, any given setting item may be set. For example, setting items may be associated with "page turn forward" and "page turn backward" of an electronic book, up and down of TV channels, and up and down of a content list or menu items.

[Vibration Providing Condition for Track Setting]

When Input determination [7] is determined—that is when two touches are detected, the shifting directions v1 and v2 of the touch positions $P_1$ and $P_2$ are the same, the shifting directions are negative on a predetermined coordinate axis, and the shifting distances of the touch positions are greater than or equal to the predetermined threshold value D—"track down" is selected as the input item. Here, as shown in the spatial order (first touch position) of FIG. 18, the starting touch position of the two touch positions in the spatial order with respect to the shifting direction is determined as the first touch position for providing a vibration, and the other touch position (here, $P_2$) is determined as the second touch position for providing no vibration. As exemplified in FIG. 19A, the touch positions $P_1$ and $P_2$ shift in the same negative direction to the x-axis. With respect to the shifting direction, the starting touch position; namely $P_1$, is determined as the first touch position for providing a vibration. Hence, the vibration is provided to the shaded finger 1, and no vibration is provided to the finger 2. As a result, the user recognizes, through the vibrating starting touch position $P_1$ to the shifting direction and the other non-vibrating touch position (here, $P_2$), the fact that his or her input by shifting the touch positions $P_1$ and $P_2$ in the negative direction has been received by the device. Consequently, the user can easily understand the direction in which the input is received.

When Input determination [8] is determined—that is when two touches are detected, the shifting directions v1 and v2 of the touch positions $P_1$ and $P_2$ are the same, the shifting directions are negative on a predetermined coordinate axis, the shifting distances of the touch positions are greater than or equal to the predetermined threshold value D, and the stopping time period t1s of the touch positions is greater than or equal to a predetermined threshold value Ts—, "continuous track down" is selected as the input item. Here, similar to the case of the Input determination [7], the touch positions $P_1$ and $P_2$ shift in the same negative direction to the x-axis. The starting touch position with respect to the shifting direction is $P_1$. The touch position $P_1$ is the first touch position for providing a vibration, and the other touch position (here, $P_2$) is the second touch position for providing no vibration. Hence, similar to the case of Input determination [7], the above feature (i) informs the user of the shifting direction received by the device by providing the vibration to the touch position $P_1$ and providing no vibration to the touch position $P_2$, and (ii) makes it possible to provide the vibration to the touch position $P_1$ at the predetermined time interval Ts. Consequently, the user can recognize the track number is continuously decreasing.

When Input determination [9] is determined—that is when two touches are detected, the shifting directions v1 and v2 of the touch positions $P_1$ and $P_2$ are the same, the shifting directions are positive on the predetermined coordinate axis, and the shifting distances of the touch positions are greater than or equal to the predetermined threshold value D—, "track up" is selected as the input item. Here, as shown in the spatial order (first touch position) of FIG. 18, the starting touch position of the two touch positions in the spatial order with respect to the shifting direction is determined as the first touch position for providing a vibration, and the other touch position (here, $P_2$) is determined as the second touch position for providing no vibration. As exemplified in FIG. 19B, the touch positions $P_1$ and $P_2$ shift in the same positive direction to the x-axis. With respect to the shifting direction, the starting touch position; namely $P_2$, is determined as the first touch position for providing a vibration. Hence, the vibration is provided to the shaded finger 2, and no vibration is provided to the finger 1. As a result, the user recognizes the fact that, through the vibrating starting touch position $P_2$ with respect to the shifting direction and the other non-vibrating touch position (here, $P_1$), his or her input by shifting the touch positions $P_1$ and $P_2$ in the positive direction has been received by the device. Consequently, the user can easily understand the direction in which the input is received.

When Input determination [10] is made—that is when two touches are detected, the shifting directions v1 and v2 of the touch positions $P_1$ and $P_2$ are the same, the shifting directions are positive on the predetermined coordinate axis, the shifting distances of the touch positions are greater than or equal to the predetermined threshold value D, and the stopping time period t1s of the touch positions is greater than or equal to the predetermined threshold value Ts—, "continuous track up" is selected as the input item. Here, similar to the case of the Input determination [9], the touch positions $P_1$ and $P_2$ shift in the same positive direction to the x-axis. The starting touch position with respect to the shifting direction is $P_2$. The touch position $P_2$ is the first touch position for providing a vibration, and the other touch position (here, $P_1$) is the second touch position for providing no vibration. Hence, similar to the case of Input determination [9], the above feature (i) informs the user of the shifting direction received by the device by providing the vibration to the touch position $P_2$ and providing no vibration to the touch position $P_1$, and (ii) makes it possible to provide the vibration to the touch position $P_2$ at the predetermined time interval Ts. Consequently, the user can recognize that the track number is continuously increasing.

It is noted that the time interval Ts for setting the track number may be changed based on the shifting speed of the touch positions $P_1$ or $P_2$. Hence, when the touch positions $P_1$ and $P_2$ shift fast and stop, Ts may be made shorter and the track number may be changed at a shorter time interval. In contrast, when the touch positions $P_1$ and $P_2$ shift slow, Ts may be made longer and the track number may be changed slowly. Such features make it possible to easily set the change of the track number, depending on the intension of the user.

Furthermore, in the case where a vibration is provided for each track number when Ts is extremely short, the user might have problem recognizing the change between track numbers. Hence, similar to the fast-forward and rewind of a content item according to Embodiment 1, levels of the fast-forward and rewind may be set for the track numbers, and the values of the levels may be provided to the user via vibration as feedbacks.

It is noted that, when the result of a touch input is sent to the user through a vibration, the user could feel the vibration while the touch position is shifting. Instead, the vibration may also be provided when the shift of the touch position stops or when the shifting speed of the touch position is slow, so that the user can feel the vibration on each touch position more easily. In other words, when the result of the shift input is provided to the user through a vibration as a feedback, the vibration as a feedback may be provided when the touch position stops shifting as well as when the touch position is shifting. Such a feature allows the user to recognize the vibration more easily and to be informed of the received input.

It is noted that, in Embodiment 2, multiple touch positions are shifted and then kept stopping as an exemplary vibration providing condition to be determined by the vibration providing condition determining unit 302, so that the setting value is continuously changed. Instead, when the touch positions make a complete stop, the current setting value may be conveyed to the user through a vibration at a predetermined time interval.

It is noted that exemplified here is the case where multiple touch positions are shifted in the same direction. Another exemplary case may be, when there are two touch positions and one of them stays still and the other shifts along the x-axis in the positive or negative direction, only the shifting touch position may be vibrated and, as a setting item, one of "fast-forward" and "rewind" or one of "increase track number" and "decrease track number" may be performed. The vibration to the shifting touch position may be provided one of when the touch position is shifting and when the touch position makes a complete stop or before or after the stop. The user feels the vibration more easily when the touch position makes a complete stop or before or after the stop, which allows him or her to easily check the input result.

[Step S306: Determining Vibration to be Provided]

The vibration determining unit 108 determines a tactile feedback signal which indicates the vibration to be provided to the first touch position, based on the setting value and an increase or decrease level of the setting value determined in Step S304, and the vibration providing condition determined in Step S305.

As shown in Embodiment 1, the vibration determining unit 108 provides a setting value and an increase or decrease level of the setting value, using a tactile feedback signal such as the single-stimulus signal in FIG. 7A and the double-stimulus signal in FIG. 7B. For example, the vibration determining unit 108 determines the following tactile feedback signal: the single-stimulus signal when the increase or decrease level of the setting value is 1; the double-stimulus signal in FIG. 7B when the increase or decrease level of the setting value is 2; and a triple-stimulus signal composed of the double-stimulus signal followed by the single-stimulus signal.

[Step S307: Simultaneously Controlling Multiple Points]

The multi-point simultaneous vibration control unit 109 calculates a drive signal for each of the actuators 102 in order to provide, to the first touch position, the vibration indicated by the tactile feedback signal and provide no vibration to the second touch position. Then, the multi-point simultaneous vibration control unit 109 drives the actuators using the calculated driving signals and simultaneously controls vibrations on the panel 101 for each of the touch positions.

The operation in Step S307 is the same as that in Step S106 according to Embodiment 1, and the details thereof shall be omitted.

As detailed in the above structure and operations, the tactile input and output device 100 according to Embodiment 2 is the one according to Embodiment 1 additionally including the shift input determining unit 301. The tactile input and output device 100 according to Embodiment 2 causes (i) the shift input determining unit 301 to determine a shift input by which the user shifts the touch positions in the same direction while his or her fingers keep touching the touch positions, (ii) the vibration providing condition determining unit 302 to determine the starting touch position with respect to the shifting direction, and (iii) the multi-point simultaneous vibration control unit 109 to provide a vibration to the starting touch position with respect to the shifting direction and to provide no vibration to a touch position other than the starting touch position. Such features allow the user to check through tactility the moving direction of the item on which he or she is working, such as the direction of the shift input which the device has received, a map, and a music track. Moreover, without watching and touching a GUI, the user can work on the setting of the device at any given position on the panel, using the shift input and the order input.

Embodiment 3

Embodiment 3 is devised so that the user can perform input setting without watching the panel for touch input even in a system having functions of multiple devices such as an air conditioner and an audio instrument.

Figure 20:
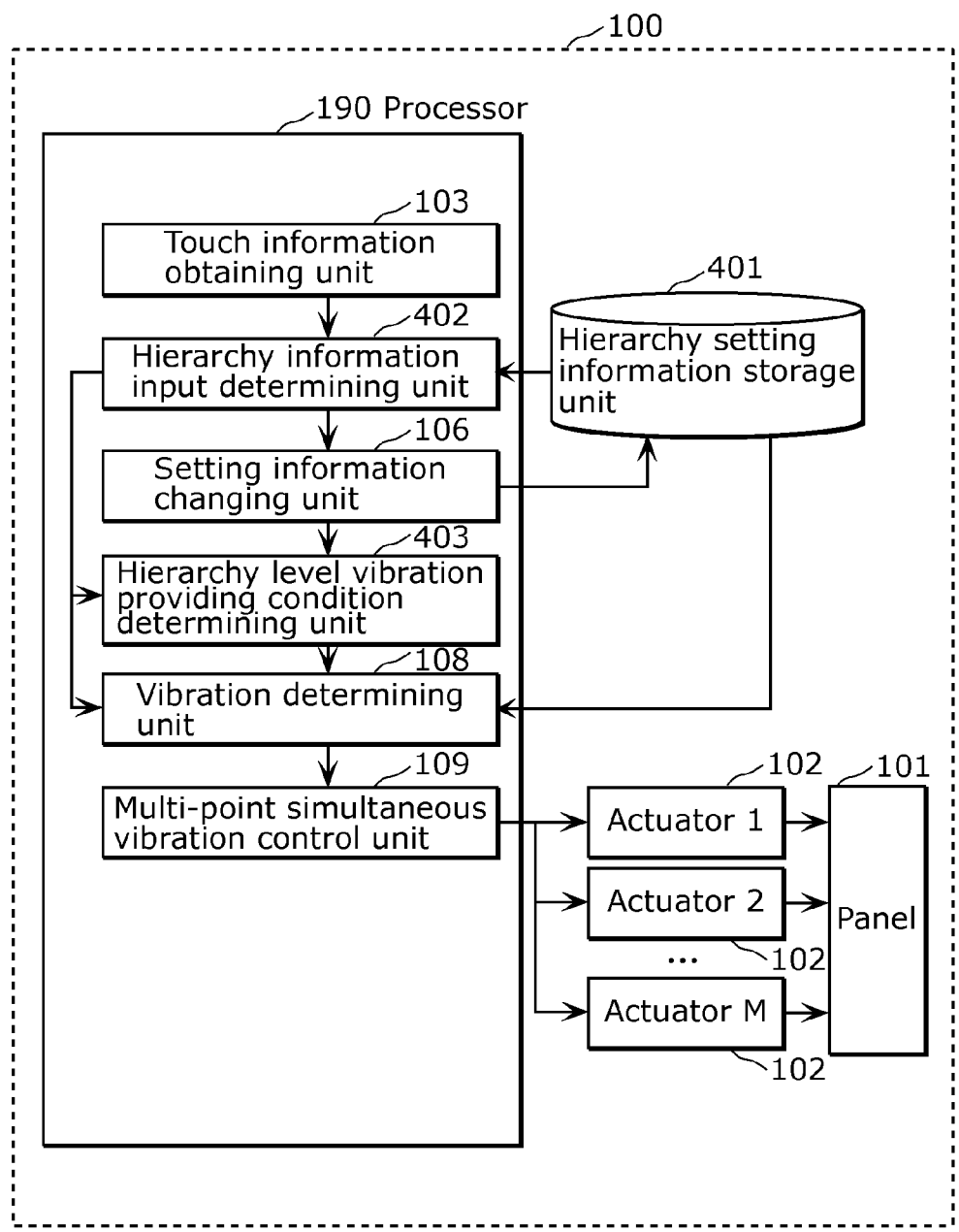
FIG. 20 depicts a block diagram showing a structure of the tactile input and output device according to Embodiment 2.

FIG. 20 depicts a block diagram showing a structure of a tactile input and output device according to Embodiment 3 of the present disclosure. The same numerical signs are assigned to the same constituent elements as those in the block diagrams showing the features of Embodiment 1. Embodiment 3 mainly describes the structures and operations of a hierarchy setting information storage unit 401, a hierarchy input determining unit 402, and a hierarchy level vibration providing condition determining unit 403, which are not described in Embodiment 1.

[Hierarchy Setting Information Storage Unit 401]

Figure 21:
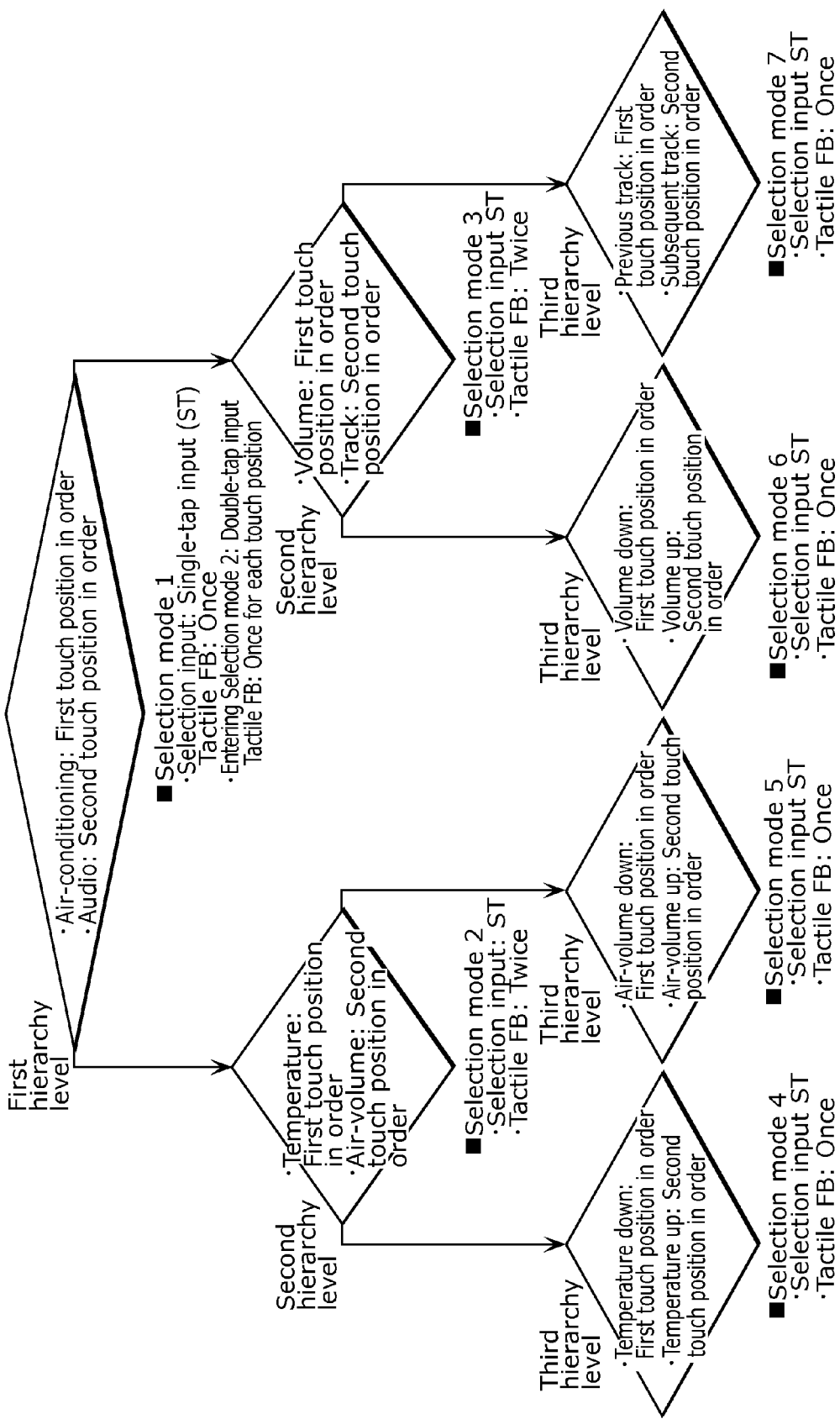
FIG. 21 shows an example of hierarchy setting information.

The hierarchy setting information storage unit 401 arranges the setting information of the device in a hierarchy and stores the setting information in association with the spatial order of touch positions. FIG. 21 shows an example of the stored hierarchy setting information. Exemplified in Embodiment 3 is a system including an air conditioner and an audio instrument. As shown in FIG. 21, exemplified here is the case where seven selection modes from Selection mode 1 to Selection mode 7 are arranged in three hierarchy levels.

The first hierarchy level includes Selection mode 1 for selecting air-conditioning setting or audio setting.

The second hierarchy level includes Selection mode 2 for selecting temperature setting or air-volume setting and Selection mode 3 for selecting volume setting or track setting.

The third hierarchy level includes Selection mode 4 for selecting temperature up or temperature down, Selection mode 5 for selecting air-volume down or air-volume up, Selection mode 6 for selecting volume down or volume up, and Selection mode 7 for selecting track down or track up.

[Hierarchy Information Input Determining Unit 402]

The hierarchy information input determining unit 402 determines a target setting item by selecting a selection mode stored in the hierarchy setting information storage unit 401 and assigned to the Nth hierarchy level, based on the time-series information of multiple touch positions obtained by the touch information obtaining unit 103.

Specifically, based on the time-series information of the touch positions to be inputted into the panel 101, the hierarchy information input determining unit 402 (i) calculates the detection order and the spatial order of the touch positions to be simultaneously detected to enter (a) a selection mode in the first hierarchy level when the first input pattern is detected and (b) a selection mode in the N−1th hierarchy level when the second input pattern is detected, and (ii) based on the spatial order of the touch positions selected based on the detection order and a spatial order of a setting item in a selection mode previously stored in the hierarchy setting information storage unit 401 and included in a selection mode in the Nth hierarchy level, determines the setting item corresponding to the spatial order of the touch positions and enter a selection mode in the N+1th hierarchy level

[Hierarchy Level Vibration Providing Condition Determining Unit 403]

The hierarchy level vibration providing condition determining unit 403 calculates the starting touch position with respect to the shifting direction among the touch positions, and determines the starting touch position as the first touch position for providing a vibration and another one of the touch positions than the starting touch position as a second touch position for providing no vibration. Such determination is also made in the case where the touch positions stay still where the shifts end.

The operation of the above-structured tactile input and output device 100 according to Embodiment 3 shall be described with reference to FIGS. 21 to 23.

Figure 22:
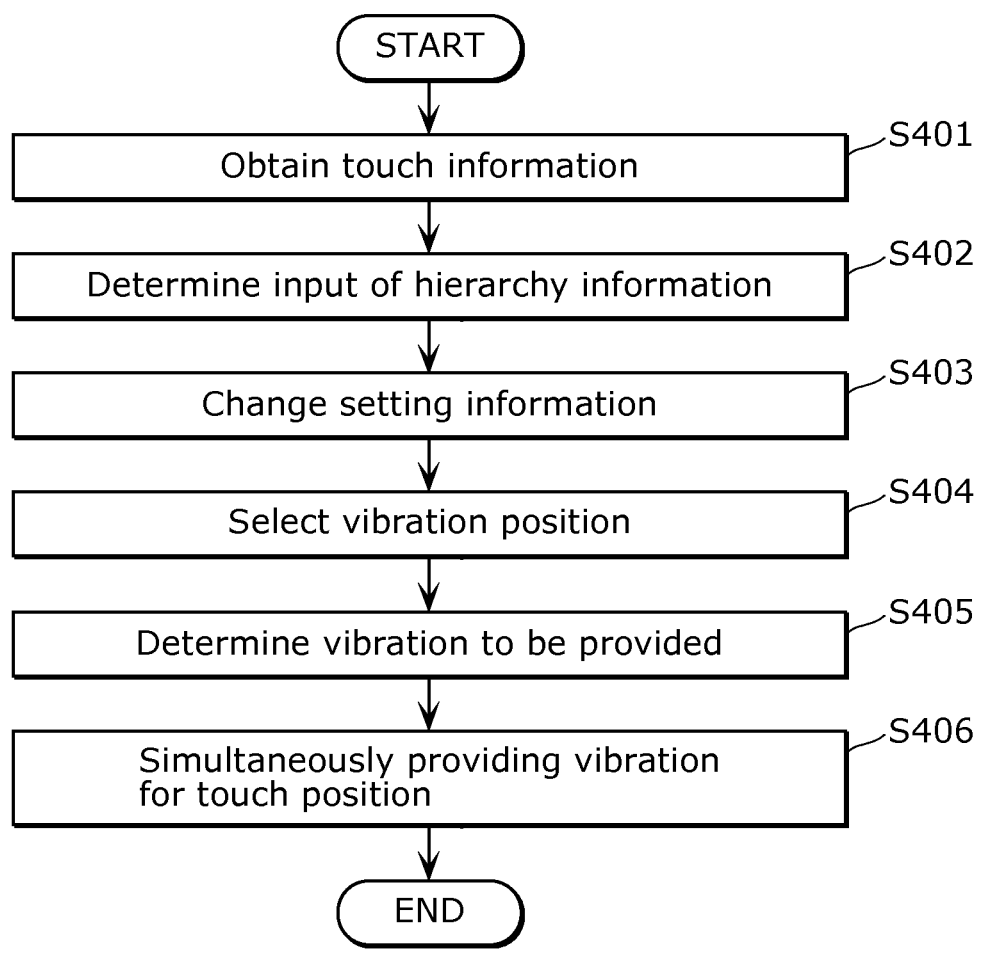
FIG. 22 depicts a flowchart showing an operation of the tactile input and output device according to Embodiment 2.

FIG. 22 depicts a flowchart showing an operation of the tactile input and output device 100 according to Embodiment 3.

Here, Embodiment 3 describes the operation in an exemplary case where the tactile input and output device 100 according to Embodiment 3 is included in an in-vehicle system such as a car navigation system. FIG. 18 shows exemplary setting items which the user inputs. Exemplified here is a sequence of determining the inputs [1] to [10], such as inputs for map scrolling, volume setting, and track setting, shown in FIG. 18 and providing a feedback to the user of an input result received by the tactile input and output device 100 through tactility. As an exemplary in-vehicle system, the system may include the monitor 110 displaying a map and the like, and the panel 101 provided over the monitor 110 and made of a clear material. The panel may also be separated from the monitor 110, and provided on the center console or an armrest. No matter how the tactile input and output device 100 is structured, Embodiment 3 is devised to allow the user not to watch the panel 101 to perform an input operation.

[Step S401: Obtaining Touch Information]

The touch information obtaining unit 103 obtains, as time-series information, multiple touch positions shown by the user on the panel 101. When the user touches the panel 101 with two of his or her fingers, or the fingers 1 and 2, as shown in FIG. 19A, for example, the touch information obtaining unit 103 obtains, for an exemplary predetermined sampling interval $\Delta t$ of 20 ms, the touch position $P_1(x_1(t), y_1(t))$ of the finger 1 and the touch position $P_2(x_2(t), y_2(t))$ of the finger 2 at a time t.

[Step S402: Determining Input of Hierarchy]

The hierarchy information input determining unit 402 selects a selection mode stored in the hierarchy setting information storage unit 401 and assigned to the Nth hierarchy level, and, based on the time-series information of multiple touch positions obtained by the touch information obtaining unit 103, determines a target setting item.

Specifically, based on the time-series information of the touch positions to be inputted into the panel 101 and obtained by the touch information obtaining unit 103, the hierarchy information input determining unit 402 (i) calculates the detection order and the spatial order of the touch positions to be simultaneously detected, and (ii) based on the spatial order of the touch positions selected based on the detection order and a spatial order of setting items in a selection mode assigned to the Nth hierarchy level and previously stored in the hierarchy setting information storage unit 401, determines one of the setting items which corresponds to the spatial order of the touch positions to enter a selection mode in the N+1th hierarchy level. Furthermore, based on the time-series information of the touch positions, the hierarchy information input determining unit 402 enters (i) a selection mode in the first hierarchy level when the first input pattern is detected, and (ii) a selection mode in the N−1th hierarchy level when the second input pattern is detected.

To be more specific, the hierarchy information input determining unit 402 determines, as "selection input", one of the cases (hereinafter referred to as "single-tap input") in the Nth hierarchy level where (i) there is one touch position and the touch continues within a predetermined time period (for example, within a time period between 100 ms and 500 ms) or (ii) when at least one touch position continues to be detected, another new touch position is detected at another location. Then, the hierarchy information input determining unit 402 selects a setting item corresponding to the spatial order of the new touch position and found in the selection mode in the Nth hierarchy level, and enters the N+1th hierarchy level.

Moreover, as the first input pattern, the hierarchy information input determining unit 402 determines, as "initial selection input", an exemplary case where two or more touch positions are detected twice (hereinafter referred to as "double-tap input") within a predetermined time period (for example, within a time period between 100 ms and 500 ms). Then, the hierarchy information input determining unit 402 returns to Selection mode 1 in the first hierarchy level.

In addition, as the second input pattern, the hierarchy information input determining unit 402 determines an exemplary case as "return input": In a selection mode in the Nth hierarchy level, as many touch positions as options are continuously detected and at least one other new touch position is simultaneously detected. Then, the hierarchy information input determining unit 402 returns to a selection mode in the N−1th hierarchy level.

Based on the above sequences, the hierarchy information input determining unit 402 determines "selection input", "initial selection input", and "return input", and determines the setting item of the user's desire.

With reference to FIG. 21, described hereinafter is an exemplary sequence for determining a target setting item from among setting items arranged in a hierarchy. Exemplified here is the case where each of Selection modes 1 to 7 includes two options, such as air-conditioner adjustment or audio instrument adjustment, and temperature adjustment or air-volume adjustment. It is noted that the number of options shall not be limited to two; instead, more options may be provided for the user to select with one hand or both hands.

With reference to FIG. 21, described hereinafter is an exemplary sequence to implement the air-conditioning setting and the audio setting only with two kinds of touch inputs; namely, "selection input" and "initial selection input". FIG. 23 exemplifies how to determine a setting item with three kinds of touch inputs; namely "return input", as well as the "selection input" and "initial selection input". The determination sequence shall be described later.

[Selecting Setting Item with Selection Mode 1 in First Hierarchy Level]

When a double-tap input is detected, the hierarchy information input determining unit 402 determines that the input is "initial selection input", so that the selection mode enters Selection mode 1 in the first hierarchy level. Selection mode 1 is for selecting a setting item for an air conditioner or for an audio instrument. In selecting an air-conditioning setting, the user performs a single-tap input with the finger 1 representing the first touch position in the order. In selecting audio setting, the user performs a single-tap input with the finger 2 representing the second touch position in the order. In the case where at least one touch position is continuously detected, followed by another new touch position detected in a different location, the hierarchy information input determining unit 402 determines the case as "selection input", and determines the spatial order of the new touch position. Similar to the input determination of the volume setting performed in Step S102 in Embodiment 1 with reference to FIGS. 5B and 5C, the determination of the spatial order of the new touch position is made to find out whether the spatial order of the new touch position is the first touch position in the order or the second touch position in the order. In the case where the spatial order of the new touch position is the first touch position in the order, as shown in FIG. 21, the hierarchy information input determining unit 402 compares the spatial order of the new touch position with a spatial order stored in the hierarchy setting information storage unit 401 in association with a setting item, and selects the air-conditioning setting having the same spatial order as that of the new touch position. Then, the selection mode enters Selection mode 2 in the second hierarchy level. Similarly, in the case where the spatial order of the new touch position is the second touch position in the order, the hierarchy information input determining unit 402 selects the audio setting, so that the selection mode enters Selection mode 3 in the second hierarchy level, as shown in FIG. 21.

[Selecting Setting Item with Selection Mode 2 in Second Hierarchy Level]

Selection mode 2 is for selecting a temperature setting or an air-volume setting in the air-conditioning setting. Similar to Selection mode 1, the user performs a single-tap input with (i) the finger 1 representing the first touch position in the order when selecting the temperature setting, and (ii) the finger 2 representing the second touch position in the order when selecting the air-volume setting. In the case where at least one touch position is continuously detected, followed by another new touch position detected in a different location, the hierarchy information input determining unit 402 determines the case as "selection input". Here, in the case where the spatial order of the new touch position is the first touch position in the order, as shown in FIG. 21, the hierarchy information input determining unit 402 compares the spatial order of the new touch position with a spatial order stored in the hierarchy setting information storage unit 401 in association with a setting item, and selects the temperature setting that is stored in association with the first touch position in the order. Then, the selection mode enters Selection mode 4 in the third hierarchy level. In the case where the spatial order of the new touch position is the second touch position in the order, the hierarchy information input determining unit 402 selects the air-volume setting and enters Selection mode 5 in the third hierarchy level, as shown in FIG. 21.

[Selecting Setting Item with Selection Mode 3 in Second Hierarchy Level]

Selection mode 3 is for selecting the volume setting or the track setting in the audio setting. Similar to Selection mode 1, the user performs a single-tap input with (i) the finger 1 representing the first touch position in the order when selecting the volume setting, and (ii) the finger 2 representing the second touch position in the order when selecting the track setting. In the case where at least one touch position is continuously detected, followed by another new touch position detected in a different location, the hierarchy information input determining unit 402 determines the case as "selection input". Here, in the case where the spatial order of the new touch position is the first touch position in the order, as shown in FIG. 21, the hierarchy information input determining unit 402 compares the spatial order of the new touch position with a spatial order stored in the hierarchy setting information storage unit 401 in association with a setting item, and selects the volume setting that is stored in association with the first touch position in the order. Then, the selection mode enters Selection mode 6 in the third hierarchy level. In the case where the spatial order of the new touch position is the second touch position in the order, the hierarchy information input determining unit 402 selects the track setting and enters Selection mode 7 in the third hierarchy level, as shown in FIG. 21.

[Selecting Setting Item with Selection Modes 4 and 5 in Third Hierarchy Level]

Selection mode 4 is for selecting a setting for turning the temperature setting down (temperature setting down) or a setting for turning the temperature setting up (temperature setting up) in the air-conditioning setting. Similar to Selection mode 1, the user performs a single-tap input with (i) the finger 1 representing the first touch position in the order when selecting the temperature setting down, and (ii) the finger 2 representing the second touch position in the order when selecting the temperature setting up. In the case where the spatial order of the new touch position is the first touch position in the order, similar to the determination of the selection input in the first and second hierarchy levels, the hierarchy information input determining unit 402 selects the temperature setting down stored in association with the first touch position in the order as shown in FIG. 21. In the case where the spatial order of the new touch position is the second touch position in the order, the hierarchy information input determining unit 402 selects the temperature setting up as shown in FIG. 21.

Selection mode 5 is for selecting a setting for turning the air-volume setting down (air-volume setting down) or a setting for turning the air-volume setting up (air-volume setting up) in the air-conditioning setting. Similar to Selection mode 1, the user performs a single-tap input with (i) the finger 1 representing the first touch position in the order when selecting the air-volume setting down, and (ii) the finger 2 representing the second touch position in the order when selecting the air-volume setting up. In the case where the spatial order of the new touch position is the first touch position in the order, similar to the determination of the selection input in Selection mode 4, the hierarchy information input determining unit 402 selects the air-volume setting down stored in association with the first touch position in the order as shown in FIG. 21. In the case where the spatial order of the new touch position is the second touch position in the order, the hierarchy information input determining unit 402 selects the air-volume setting up as shown in FIG. 21.

[Selecting Setting Item with Selection Modes 6 and 7 in Third Hierarchy Level]

Selection mode 6 is for selecting a setting for turning the volume setting down (volume setting down) or a setting for turning the volume setting up (volume setting up) in the audio setting. Similar to Selection mode 1, the user performs a single-tap input with (i) the finger 1 representing the first touch position in the order when selecting the volume setting down, and (ii) the finger 2 representing the second touch position in the order when selecting the volume setting up. In the case where the spatial order of the new touch position is the first touch position in the order, similar to the determination of the selection input in Selection mode 4, the hierarchy information input determining unit 402 selects the volume setting down stored in association with the first touch position in the order as shown in FIG. 21. In the case where the spatial order of the new touch position is the second touch position in the order, the hierarchy information input determining unit 402 selects the volume setting up as shown in FIG. 21.

Selection mode 7 is for selecting a setting for selecting the track before (previous track setting) or a setting for selecting the track next (subsequent track setting) in the audio setting. Similar to Selection mode 1, the user performs a single-tap input with (i) the finger 1 representing the first touch position in the order when selecting the previous track setting, and (ii) the finger 2 representing the second order when selecting the subsequent track setting. In the case where the spatial order of the new touch position is the first touch position in the order, similar to the determination of the selection input in Selection mode 6, the hierarchy information input determining unit 402 selects the previous track setting stored in association with the first touch position in the order as shown in FIG. 21. In the case where the spatial order of the new touch position is the second touch position in the order, the hierarchy information input determining unit 402 selects the subsequent track setting as shown in FIG. 21.

[Step S403: Changing Setting Information]

The setting information changing unit 106 changes the setting values of the setting items determined by the hierarchy information input determining unit 402. The first and second hierarchy levels involve only the selection of setting items. The third hierarchy level involves the change of the setting information on a setting item determined in Selection modes 4 to 7.

The setting information is changed in the sequence implemented for the volume setting and the track setting in Step S304 in Embodiment 2.

[Changing Setting Information with Selection Modes 4 and 5 in Third Hierarchy Level]

When the determination of the temperature setting down is made in Selection mode 4; that is when the first touch position in the order of the two touch positions is a new touch position inputted with a single tap, the setting information changing unit 106 sets the increase or decrease level of the temperature setting to $\Delta T=-1$, and decreases the temperature level T of the setting value by 1 according to $T=T+\Delta T$, similar to the increase or decrease level of the setting value for the volume setting in FIG. 18. The setting value is changed when, for example, a new touch position where a single-tap input is performed is detected.

When the determination of the temperature setting up is made in Selection mode 4; that is when the second touch position in the order touch position of the two touch positions is a new touch position inputted with a single tap, the setting information changing unit 106 sets the increase or decrease level of the temperature setting to $\Delta T=+1$, and increases the temperature level T of the setting value by 1 according to $T=T+\Delta T$, similar to the increase or decrease level of the setting value for the volume setting in FIG. 18.

When one of the cases where the determination of the air-volume setting down and the air-volume setting up is made in Selection mode 5, the setting information changing unit 106 respectively sets the increase or decrease level of the setting value of the air-volume $\Delta W$ to one of $-1$ and $+1$, and changes the setting value of the air volume level W according to $W=W+\Delta W$.

The setting value is changed when, for example, a new touch position where a single-tap input is performed is detected.

[Changing Setting Information with Selection Modes 6 and 7 in Third Hierarchy Level]

When the determination of the volume setting down is made in Selection mode 6; that is when the first touch position in the order of the two touch positions is a new touch position inputted with a single tap, the setting information changing unit 106 sets the increase or decrease level of the volume setting to $\Delta V=-1$, and decreases the volume level V of the setting value by 1 according to $V=V+\Delta V$, similar to the increase or decrease level of the setting value for the volume setting in FIG. 18.

When the determination of the volume setting up is made in Selection mode 6; that is when the second touch position in the order touch position of the two touch positions is a new touch position inputted with a single tap, the setting information changing unit 106 sets the increase or decrease level of the temperature setting to $\Delta V=+1$, and increases the temperature level T of the setting value by 1 according to $V=V+\Delta V$, similar to the increase or decrease level of the setting value for the volume setting in FIG. 18.

When one of the cases where the determination of the previous track setting and the subsequent track setting is made in Selection mode 7, the setting information changing unit 106 respectively sets the increase or decrease level of the track number $\Delta Nt$ to one of $-1$ and $+1$, and changes the setting value of the track number according to $Nt=Nt+\Delta Nt$.

The setting value is changed when, for example, a new touch position where a single-tap input is performed is detected.

[Step S404: Determining Vibration Providing Condition for Each Hierarchy Level]

For each hierarchy level and selection mode, the hierarchy level vibration providing condition determining unit 403 determines the first touch position for providing a vibration and the second touch position for providing no vibration.

[Vibration Providing Condition in the First Hierarchy Level]

When a double-tap input is detected and the detected input is determined as "initial selection input", as shown in FIG. 21, the hierarchy level vibration providing condition determining unit 403 determines that a vibration is provided once for each of the detected touch positions within a predetermined time period. For example, to the two touch positions where the double tap has been detected, the hierarchy level vibration providing condition determining unit 403 first determines the first touch position in the order as the first touch position for providing a vibration and the second touch position in the order touch position as the second touch position for providing no vibration. Then, after an exemplary predetermined time period of 250 ms, the hierarchy level vibration providing condition determining unit 403 determines the second touch position in the order touch position as the first touch position for providing a vibration and the first touch position in the order as the second touch position for providing no vibration. Such a feature allows the user to recognize the number of the received touch positions; that is to recognize the number of selection items and the entrance to Selection mode 1.

It is noted that in the case where multiple touch positions have simultaneously been detected, a vibration may be provided to one of the touch positions and an interval of 250 ms may be set to provide the vibration to another one of the touch positions. Such a feature allows the user to easily recognize that the vibrations have been provided to his or her fingers in order.

In Embodiment 3, the user may leave his or her finger on a touch position after the user performs a double-tap input so that a vibration notifies the user of the entrance to a selection mode. Moreover, for example, when the user touches two positions, he or she may leave his or her finger on one of the touch positions on the panel 101, and perform a single-tap input on the other touch position so that the user can use one of the fingers as the supporting point. Such an input technique allows the user to easily perform a single-tap input, and to easily recognize which one of the two options has been selected.

In addition, in the case where a single-tap input is detected and the detected input is determined as "selection input" as shown in FIG. 21, the hierarchy level vibration providing condition determining unit 403 determines the new touch position as the first touch position for providing a vibration and a touch position other than the new touch position as the second touch position for providing no vibration in order to inform the user that (i) "selection input" has been received to enter the next selection mode, and (ii) the selected setting item is whether that of the first touch position in the order or that of the second touch position in the order touch position.

[Vibration Providing Condition in the Second Hierarchy Level]

In the case where a single-tap input is detected and the detected input is determined as "selection input" as shown in FIG. 21, the hierarchy level vibration providing condition determining unit 403 determines the new touch position as the first touch position for providing a vibration and a touch position other than the new touch position as the second touch position for providing no vibration in order to inform the user that (i) "selection input" has been received to enter the next selection mode, and (ii) the selected setting item is whether that of the first touch position in the order or that of the second touch position in the order touch position.

Such a feature allows the user to recognize through tactility that, in Selection mode 2, selected is whether the temperature setting (first touch position in the order) or the air-volume setting (second touch position in the order), depending on the spatial order of his or her finger on a touch position where a vibration is provided. Furthermore, in Selection mode 3, the user can recognize through tactility that selected is whether the volume setting (first touch position in the order) or the track setting (second touch position in the order).

[Vibration Providing-Condition in the Third Hierarchy Level]

In the case where a single-tap input is detected and the detected input is determined as "selection input" as shown in FIG. 21, the hierarchy level vibration providing condition determining unit 403 determines the new touch position as the first touch position for providing a vibration and a touch position other than the new touch position as the second touch position for providing no vibration in order to inform the user that (i) "selection input" has been received to enter the next selection mode, and (ii) the selected setting item is whether that of the first touch position in the order or that of the second touch position in the order touch position.

Such a feature allows the user to recognize through tactility that, in Selection mode 4, selected is whether the temperature setting down (first touch position in the order) or the temperature setting up (second touch position in the order), depending on the spatial order of his or her finger on a touch position where a vibration is provided. Furthermore, in Selection mode 5, the user can recognize through tactility that selected is whether the air-volume setting down (first touch position in the order) or the air-volume setting up (second touch position in the order). Furthermore, in Selection mode 6, the user can recognize through tactility that selected is whether the volume setting down (first touch position in the order) or the volume setting up (second touch position in the order). Furthermore, in Selection mode 7, the user can recognize through tactility that selected is whether the previous track setting (first touch position in the order) or the subsequent track setting (second touch position in the order).

[Step S405: Determining Vibration to be Provided]

The vibration determining unit 108 determines a tactile feedback signal which indicates the vibration to be provided to the first touch position, based on the setting value and the increase or decrease level of the setting value determined in Step S403, and the vibration providing condition determined in Step S404.

Similar to Embodiment 1, the vibration determining unit 108 informs the user of the reception of the selection input or of a setting value and an increase or decrease level of the setting value, using the tactile feedback signals in FIGS. 7A and 7B such as the single-stimulus signal and the double-stimulus signal. For example, the vibration determining unit 108 determines a tactile feedback signal to be the single-stimulus signal in the case where the increase or decrease level of the setting value is 1. In the case where the selection input is specified in the second hierarchy level, the vibration determining unit 108 determines a tactile feedback signal to be the double-stimulus signal shown in FIG. 7B and informs the user that the specified selection input has been performed in the second hierarchy level. In other words, the vibration determining unit 108 provides as many tactile feedback signals as the number of the Nth hierarchy levels in order to inform the user that the selection input is performed in the Nth hierarchy level.

[Vibration to be Provided in First Hierarchy Level]

In the case where, in the first hierarchy level in Step S402, a double-tap input is detected and the detected input is determined as "initial selection input" so that the selection mode enters Selection mode 1, and, in Step S404, a determination is made to provide a vibration once to each of the detected touch positions within a predetermined time period, the vibration determining unit 108 determines, for example, the single-stimulus signal in FIG. 7A as a tactile feedback signal. Such a feature allows the user to recognize the number of the received touch positions; that is to recognize the number of selection items and the entrance to Selection mode 1. In the case where a single-tap input is detected in Step S402 and the detected input is determined as "selection input", the vibration determining unit 108 determines, for example, the single-stimulus signal in FIG. 7A as a tactile feedback signal. Such a feature makes it possible to inform the user that (i) "selection input" has been received to enter the next selection mode, and (ii) the selected setting item is whether that of the first touch position in the order or that of the second touch position in the order touch position.

[Vibration to be Provided in Second Hierarchy Level]

In Step S402, in the case where a single-tap input is detected and the detected input is determined as "selection input" in either one of Selection modes 2 and 3 in the second hierarchy level, the vibration determining unit 108 determines the double-stimulus signal in FIG. 7B as a tactile feedback signal in order to inform the user that, in the second hierarchy level, (i) "selection input" has been received to enter the next selection mode, and (ii) the selected setting item is whether that of the first touch position in the order or that of the second touch position in the order touch position.

[Vibration to be Provided in Third Hierarchy Level]

In Step S402, in the case where a single-tap input is detected and the detected input is determined as "selection input" in any one of Selection modes 4 to 7 in the third hierarchy level, the vibration determining unit 108 determines the single-stimulus signal as a tactile feedback signal when, for example, the increase or decrease level of the setting value is 1. Hence, the vibration determining unit 108 informs the user that the setting value is increased or decreased by 1, by providing a vibration with the single-stimulus signal to the touch position of the panel 101 where the user has performed the single-tap input.

It is noted that in the case where, for example, in Selection mode 5, the setting value is a discrete value which varies in several stages, such as when the user sets an air-volume level, the vibration determining unit 108 may vibrate the panel 101 with a single-stimulus signal to a quintuple-stimulus signal when the user performs a single-tap input and leaves his or her finger on the touch position for a predetermined time period, and inform the user of the current setting value with a tactile feedback.

Furthermore, in the case where the same touch position has continuously been detected after the change of the setting value, the vibration determining unit 108 may inform the user of the changed setting value for a predetermined time interval with a tactile feedback.

In addition, even though a touch position has continuously been detected after a tactile feedback for the setting value has lasted for a predetermined time period or has continued for a predetermined times, the vibration determining unit 108 may stop the vibration.

It is noted that, in the case where a touch position has continuously been detected in each hierarchy level and the user has not performed any input for entering the next hierarchy level for longer than or equal to a predetermined time period, the vibration determining unit 108 may determine that the user is wondering which setting item to select, and provide the user of the name of a setting item via speech and the like. The vibration determining unit 108 may repeat providing a vibration once for each of touch positions for a predetermined time interval in order to inform the user of the number of options and a position which is received as the touch position as feedbacks.

Moreover, in the case where the number of touch positions does not match with the number of options in a setting item in each hierarchy level, the vibration determining unit 108 may notify the user of the mismatch after, for example, a predetermined time period, by providing (i) a vibration which is different in frequency and amplitude from the vibration indicating the setting value or (ii) a speech.

[Step S406: Simultaneously Providing Multiple-Point Vibration]

The multi-point simultaneous vibration control unit 109 calculates a drive signal for each of the actuators 102 in order to provide, to the first touch position determined in Step S404, a vibration indicated in the tactile feedback signal determined in Step S405, and provide no vibration to the second touch position determined in Step S404. Then, the multi-point simultaneous vibration control unit 109 drives the actuators 102 based on the calculated drive signal and simultaneously controls vibrations on the panel 101 for each of the touch positions.

The operation in Step S406 is the same as that in Step S106 according to Embodiment 1, and the details thereof shall be omitted.

According to the above features and operations, the tactile input and output device 100 according to Embodiment 3 allows the user to easily select a setting item assigned to a hierarchy level and check the result of his or her input through tactility. In the example of FIG. 21, the user first causes the selection mode to enter Selection mode 1, by performing a double-tap input with two of his or her fingers. Here, after the double-tap input, the multi-point simultaneous vibration control unit 109 provides a vibration once for each of the fingers that are left stopping on the panel 101. Hence, the user can check through tactility that the number of received touches matches with the number of selection items. Next, in Selection mode 1, the user performs a single-tap input with one of the two touching fingers in order to select the air-conditioning setting or the audio setting. When the spatial order of the new touch position is the first touch position in the order, the air-conditioning setting is selected. When the spatial order of the new touch position is the second touch position in the order, the audio setting is selected. Here, the multi-point simultaneous vibration control unit 109 provides a vibration to the new touch position and provides no vibration to the other touch position. Hence, the user can easily check which setting item has been selected.

When the air-conditioning is selected in Selection mode 1, the selection mode enters Selection mode 2 in the second hierarchy level. Similar to Selection mode 1, the user performs in Selection mode 2 a single-tap input with one of the two touching fingers in order to select the temperature setting or the air-volume setting. When the spatial order of the new touch position is the first touch position in the order, the temperature setting is selected. When the spatial order of the new touch position is the second touch position in the order, the air-volume setting is selected. Here, the multi-point simultaneous vibration control unit 109 provides a vibration to the new touch position and provides no vibration to the other touch position. Hence, the user can easily check which setting item has been selected. When the temperature setting is selected in Selection mode 2, the selection mode enters Selection mode 4 in the third hierarchy level. When the air-volume setting is selected in Selection mode 2, the selection mode enters Selection mode 5 in the third hierarchy level. In Selection mode 4, the user performs a single-tap input with one of the two touching fingers in order to select the temperature setting down or the temperature setting up. When the spatial order of the new touch position is the first touch position in the order, the temperature setting down is selected. When the spatial order of the new touch position is the second touch position in the order, the temperature setting up is selected. Here, the multi-point simultaneous vibration control unit 109 provides a vibration to the new touch position and provides no vibration to the other touch position. Hence, the user can easily check which setting item has been selected. In Selection mode 5, the user performs a single-tap input with one of the two touching fingers in order to select the temperature setting down or the temperature setting up. When the spatial order of the new touch position is the first touch position in the order, the temperature setting down is selected. When the spatial order of the new touch position is the second touch position in the order, the temperature setting up is selected. Here, the multi-point simultaneous vibration control unit 109 provides a vibration to the new touch position and provides no vibration to the other touch position. Hence, the user can easily check which setting item has been selected.

When the audio is selected in Selection mode 1, the selection mode enters Selection mode 3 in the second hierarchy level. Similar to Selection mode 1, the user performs in Selection mode 3 a single-tap input with one of the two touching fingers in order to select the volume setting or the track setting. When the spatial order of the new touch position is the first touch position in the order, the volume setting is selected. When the spatial order of the new touch position is the second touch position in the order, the track setting is selected. Here, the multi-point simultaneous vibration control unit 109 provides a vibration to the new touch position and provides no vibration to the other touch position. Hence, the user can easily check which setting item has been selected. When the volume setting is selected in Selection mode 3, the selection mode enters Selection mode 6 in the third hierarchy level. When the track setting is selected in Selection mode 3, the selection mode enters Selection mode 7 in the third hierarchy level. In Selection mode 6, the user performs a single-tap input with one of the two touching fingers in order to select the volume setting down or the volume setting up. When the spatial order of the new touch position is the first touch position in the order, the volume setting down is selected. When the spatial order of the new touch position is the second touch position in the order, the volume setting up is selected. Here, the multi-point simultaneous vibration control unit 109 provides a vibration to the new touch position and provides no vibration to the other touch position. Hence, the user can easily check which setting item has been selected. In Selection mode 7, the user performs a single-tap input with one of the two touching fingers in order to select the previous track setting or the subsequent track setting. When the spatial order of the new touch position is the first touch position in the order, the previous track setting is selected. When the spatial order of the new touch position is the second touch position in the order, the subsequent track setting is selected. Here, the multi-point simultaneous vibration control unit 109 provides a vibration to the new touch position and provides no vibration to the other touch position. Hence, the user can easily check which setting item has been selected.

It is noted that in Steps S401 to S406, implemented is the case where, when the user selects a new setting item—that is, for example, when the user sets a temperature, and then an audio volume level—, he or she performs a double-tap input to go back to Selection mode 1 in the first hierarchy level once, and selects one of the selection modes.

Exemplified here is a sequence of determining a setting item, taking into consideration "return input"—that is to return from the Nth hierarchy level to the N–1th hierarchy level. Specifically in Step S402, the hierarchy information input determining unit 402 determines the following case as "return input": In the Nth hierarchy level, as many touch positions as options are continuously detected and at least one other new touch position is simultaneously detected. Then, the hierarchy information input determining unit 402 returns to a selection mode in the N–1th hierarchy level.

Described hereinafter with reference to FIG. 23 is an exemplary sequence to determine hierarchy setting information: While "selection input" with a single-tap input, "initial selection input" with a double-tap input, and as many touch positions as the options in each of the selection modes have been detected, at least one other touch position is detected.

In the example in FIG. 23, the user simultaneously performs a double-tap input on two touch positions so that the selection mode enters Selection mode 1. Next, when one touch position is continuously detected, followed by the detection of a double-tap input at another touch position, it is determined that "selection input" with "double-tap input on one position" is performed. A double-stimulus signal is used as a vibration feedback so that the user can check that the sequence enters the second hierarchy level.

In the case where the air-conditioning setting is selected in the first hierarchy level, the selection mode enters Selection mode 2 in the second hierarchy level. Here, when as many touch positions as the number of options are detected, followed by the detection of a double-tap input at another third touch position, it is determined that "return input" is performed. In this case, a vibration is sent to the user so that he or she can check that the sequence returns from the second hierarchy level to the first hierarchy level. As the vibration, a single-stimulus signal is provided only to the third touch position to inform the user of the return. In Selection mode 2, when one touch position is continuously detected followed by the detection of a double-tap input at another touch position in order for the user to select either the temperature setting or the air-volume setting, it is determined that "selection input" with "double-tap input on a single position" is performed. A triple-stimulus signal is provided to the other touch position as a vibration feedback so that the user can check that the sequence enters the third hierarchy level.

In the case where the temperature setting is selected in the second hierarchy level, the selection mode enters Selection mode 4 in the third hierarchy level. Here, when as many touch positions as the number of options are detected, followed by the detection of a double-tap input at another third touch position, it is determined that "return input" is performed. In this case, a vibration is sent to the user so that he or she can check that the sequence returns from the third hierarchy level to the second hierarchy level. As the vibration, a double-stimulus signal is provided only to the third touch position to inform the user of the return. In Selection mode 3, when one touch position is continuously detected followed by the detection of a single-tap input at another touch position in order for the user to select either the temperature setting down or the temperature setting up, it is determined that "selection input" with "single-tap input" is performed. A single-stimulus signal is used to provide a vibration feedback to the other touch position, so that the user can check the increase or decrease level of the setting value of the temperature.

In the case where the air-volume setting is selected in the second hierarchy level, the selection mode enters Selection mode 5 in the third hierarchy level. Here, when as many touch positions as the number of options are detected, followed by the detection of a double-tap input at another third touch position, it is determined that "return input" is performed. In this case, a vibration is sent to the user so that he or she can check that the sequence returns from the third hierarchy level to the second hierarchy level. As the vibration, a double-stimulus signal is provided only to the third touch position to inform the user of the return. In Selection mode 5, when one touch position is continuously detected, followed by the detection of a single-tap input at another touch position in order for the user to select the air-volume setting down or the air-volume setting up, it is determined that "selection input" with "single-tap input" is performed. A single-stimulus signal is used to provide a vibration feedback to the other touch position, so that the user can check the increase or decrease level of the setting value of the air-volume.

In the case where the audio setting is selected in the first hierarchy level, the selection mode enters Selection mode 3 in the second hierarchy level: Here, when as many touch positions as the number of options are detected, followed by the detection of a double-tap input at another third touch position, it is determined that "return input" is performed. In this case, a vibration is sent to the user so that he or she can check that the sequence returns from the second hierarchy level to the first hierarchy level. As the vibration, a single-stimulus signal is provided only to the third touch position to inform the user of the return. In Selection mode 3, when one touch position is continuously detected followed by the detection of a double-tap input at another touch position, in order for the user to select either the volume setting or the track setting, it is determined that "selection input" with "double-tap input on a single position" is performed. A triple-stimulus signal is provided to the other touch position as a vibration feedback so that the user can check that the sequence enters the third hierarchy level.

In the case where the volume setting is selected in the second hierarchy level, the selection mode enters Selection mode 6 in the third hierarchy level. Here, when as many touch positions as the number of options are detected, followed by the detection of a double-tap input at another third touch position, it is determined that "return input" is performed. In this case, a vibration is sent to the user so that he or she can check that the sequence returns from the third hierarchy level to the second hierarchy level. As the vibration, a double-stimulus signal is provided only to the third touch position to inform the user of the return. In Selection mode 6, when one touch position is continuously detected, followed by the detection of a single-tap input at another touch position in order for the user to select the volume setting down or the volume setting up, it is determined that "selection input" with "single-tap input" is performed. A single-stimulus signal is used to provide a vibration feedback to the other touch position, so that the user can check the increase or decrease level of the setting value of the volume.

In the case where the track setting is selected in the second hierarchy level, the selection mode enters Selection mode 7 in the third hierarchy level. Here, when as many touch positions as the number of options are detected, followed by the detection of a double-tap input at another third touch position, it is determined that "return input" is performed. In this case, a vibration is sent to the user so that he or she can check that the sequence returns from the third hierarchy level to the second hierarchy level. As the vibration, a double-stimulus signal is provided only to the third touch position to inform the user of the return. In Selection mode 7, when one touch position is continuously detected, followed by the detection of a single-tap input at another touch position in order for the user to select the previous track setting or the subsequent track setting, it is determined that "selection input" with "single-tap input" is performed. A single-stimulus signal is used to provide a vibration feedback to the other touch position, so that the user can check the increase or decrease level of the setting value of the track.

It is noted that exemplified here are the cases where there are two options for a selection mode, and it is determined that "return input" is performed when two touch positions are detected followed by the detection of another third touch position. However, there may be another exemplary case: The spatial order of touch positions is simultaneously determined; and when, for example, (number of options +1)th touch position is on the far right (the largest coordinates on the x-axis), the selection mode enters a selection mode in the next hierarchy level; and when, (number of options +1)th touch position is on the far left (the smallest coordinates on the x-axis), the selection mode returns to the one in the previous hierarchy level.

The above-operating tactile input and output device 100 according to Embodiment 3 with the above-described structure causes: the hierarchy information input determining unit 402 to determine "return input" observed one of when (i) "selection input" with a single-tap input is detected, (ii) "initial selection input" with a double-tap input is detected, and (iii) as many touch positions as the number of options are continuously detected in each selection mode followed by the determination of at least one other touch position, in order to select a stored setting item assigned in a hierarchy level; the hierarchy level vibration providing condition determining unit 403 to determine, for each hierarchy level or each selection mode, the first touch position for providing a vibration and the second touch position for providing no vibration; and the multi-point simultaneous vibration control unit 109 to provide a vibration to a touch position where the setting item is selected and provide no vibration to another touch position. Hence, even in a system having functions of multiple devices such as an air conditioner and an audio instrument, the tactile input and output device allows a vibration to inform the user that he or she has selected which setting item that assigned to a hierarchy level is selected in which hierarchy level. Thus, the user can perform input setting without watching the panel for touch input.

It is noted that in the case where no touch position is detected in Embodiments 1 to 3, the actuators 102 may stop driving and the panel 101 may stop vibrating. However, the status of an input and of the device may be provided to the user in the form of a vibration feedback when a finger of the user leaves a touch position.

It is noted that, in Embodiments 1 to 3, a detection order, a shifting direction, and a spatial order are calculated based on the time-series information of the touch position. However, the calculation shall not be defined as it is. The calculation may be executed in conjunction with the number of touches, a touch number, and touch events, such as a touch continuing event, and a touch ending event, that are observed between the touch panel driver and the operating system.

Moreover, as an example in Embodiments 1 to 3, a vibration is provided when a touch position is detected, is shifting, and makes a complete stop after its shifting. However, providing the vibration shall not be limited to such a case. The vibration may be provided when one of the following cases is detected: (i) the pressing force applied in touching is greater than a predetermined threshold value, (ii) the touching area of a finger at a touch position is greater than a predetermined threshold value, and (iii) another multi-touch gesture is detected.

The tactile input and output device according to any one of Embodiments 1 to 3 as described above allows the user to perform a setting operation of the device without watching a touch panel and a touch pad for an input when the user operates the device with a touch input. Hence, the tactile input and output device is applicable to an in-vehicle system such as a car navigation system on which the user is expected not to watch a hand-held remote controller when operating the remote controller while watching a content item on the monitor and on which the user is expected not to watch the monitor as often as possible for the operation. Moreover, the tactile input and output device associates a setting item with the spatial order of a touch position, and vibrates only the touch position associated with the selected setting item, so that the user can easily check through tactility a setting item received by the device. Such a feature allows the tactile input and output device to be applied to an operation of various devices including a touch input device. For example, the feature is applicable to a tactile input and output device, such as a tablet terminal, a game console, a TV remote controller, a digital camera, a digital camcorder, a personal computer, a handheld terminal, a cellular phone, an electronics black board, and a display for digital signage which include a touch panel and a touch pad to be operated with a touch input. In addition, the feature is applicable to a tactile input and output device for an electric household appliance including a touch panel, such as a washing machine and a microwave, and an appliance including a touch panel, such as a cellular phone and a tablet terminal that are capable of controlling a household appliance.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

A tactile input and output device according to the present disclosure is applicable to operations for various appliances including a touch input device, as well as operations for a car navigation system. For example, the tactile input and output device can be used for a tablet terminal, a hand-held game console, a TV remote controller, a digital camera, a digital camcorder, a personal computer, a handheld terminal, a cellular phone, an electronics black board, and a display for digital signage which include a touch panel and a touch pad to be operated with a touch input.

The invention claimed is:

1. A tactile input and output device including a panel which receives a touch input from a user and generates a vibration, and shows a result of the touch input, the tactile input and output device comprising:
   the panel;
   actuators each of which is provided to a different position on the panel and vibrates the panel;
   a touch information obtaining unit configured to obtain touch positions which are simultaneously detected at positions on the panel;
   a setting information storage unit configured to store pieces of setting information, to be inputted through the touch input, in association with a stored shifting direction of the touch positions;
   a shift input determining unit configured to (i) calculate, based on time-series information of the touch positions which are detected on the panel, a shifting direction of the touch positions, and (ii) compare the calculated shifting direction with the stored shifting direction and determine one of the pieces of the setting information corresponding to the calculated shifting direction;
   a setting information changing unit configured to change a setting value of the one piece of the setting information determined by the shift input determining unit, based on one of (i) whether or not the touch positions have shifted, (ii) how far the touch positions have shifted, (iii) how often the touch positions have shifted, and (iv) how fast the touch positions have shifted;
   a vibration providing condition determining unit configured to, when the touch positions shift in a same direction, calculate a starting touch position with respect to the same shifting direction among the touch positions, and determine the starting touch position as a first touch position for providing the vibration and one of the touch positions other than the starting touch position as a second touch position providing no vibration;
   a vibration determining unit configured to generate, based on the setting value of the one piece of the setting information, a tactile feedback signal indicating the vibration to be provided to the first touch position; and
   a multi-point simultaneous vibration control unit configured to calculate, for each of the actuators, a drive signal which provides the vibration to the first touch position and provides no vibration to the second touch position, and drive each of the actuators based on the calculated drive signal and simultaneously control the vibration on the panel for each of the touch positions,
   wherein the vibration providing condition determining unit is configured to, when the touch positions shift in a same direction, calculate a starting touch position with respect to the same shifting direction among the touch positions, and determine, in the case where the touch positions are kept detected in the shifting and/or in an area in which the touch positions stop shifting, (i) the starting touch position as a first touch position for providing the vibration and (ii) one of the touch positions other than the starting touch position as a second touch position for providing no vibration.

2. A tactile input and output device including a panel which receives a touch input from a user and generates a vibration, and showing a result of the touch input, the tactile input and output device comprising:
   the panel;
   a touch information obtaining unit configured to obtain touch positions which are simultaneously detected at positions on the panel;
   actuators each of which is provided to a different position on the panel and vibrates the panel;
   a hierarchy setting information storage unit configured to organize setting information of the device into selection modes and arrange the selection modes in a hierarchy, and store the arranged selection modes in association with a spatial order of the touch positions;
   a hierarchy information input determining unit configured to:
   calculate, based on time-series information of the touch positions which are simultaneously detected on the panel, a detection order and a spatial order of the simultaneously detected touch positions;
   based on (i) the calculated spatial order of the touch positions selected based on the detection order and (ii) the spatial order of a setting item in one of the selection modes found in an $N^{th}$ hierarchy level and stored in the hierarchy setting information storage unit, determine the setting item corresponding to the spatial order of the selected touch positions and enter one of the selection modes in an $(N+1)^{th}$ hierarchy level; and
   further, enter (i) one of the selection modes in a first hierarchy level when a first input pattern is detected, and (ii) one of the selection modes in the $(N-1)^{th}$ hierarchy level when a second input pattern is detected, the $N^{th}$ hierarchy level being a higher hierarchy level than the first hierarchy level, a setting information changing unit configured to change a setting value of the setting information determined by the hierarchy information input determining unit;

a hierarchy level vibration providing condition determining unit configured to determine for each of the hierarchy levels or the selection modes, a first touch position for providing the vibration and a second touch position for providing no vibration;

a vibration determining unit configured to determine a tactile feedback signal indicating the vibration to be provided to the first touch position based on at least one of the first input pattern, the second input pattern, the setting value of the setting information, and a number N of the $N^{th}$ hierarchy level; and a multi-point simultaneous vibration control unit configured to calculate, for each of the actuators, a drive signal which provides a predetermined vibration to the first touch position and provides no predetermined vibration to the second touch position, and drive each of the actuators based on the calculated drive signal and simultaneously control the vibration on the panel for each of the touch positions.

3. The tactile input and output device according to claim 2, wherein in the second input pattern in each of the selection modes, as many touch positions as options are detected and a touch position other than the previously detected touch positions is detected.

4. A tactile input and output method for vibrating a panel based on a touch input from a user, and causing actuators each of which is provided to a different position near the panel to vibrate the panel, the method comprising:

obtaining touch positions which are simultaneously detected at positions on the panel;

calculating, based on time-series information on the touch positions which are detected on the panel, a shifting direction of the touch positions;

determining setting information corresponding to the shifting direction of the touch positions;

changing a setting value of the determined setting information, based on one of (i) whether or not the touch positions have shifted, (ii) how far the touch positions have shifted, (iii) how often the touch positions have shifted, and (iv) how fast the touch positions have shifted;

calculating, when the touch positions shift in a same direction, a starting touch position with respect to the same shifting direction among the touch positions, and determining the starting touch position as a first touch position for providing the vibration and one of the touch positions other than the starting touch position as a second touch position providing no vibration;

generating, based on the setting value of the setting information, a tactile feedback signal indicating the vibration to be provided to the first touch position; and calculating, for each of the actuators, a drive signal which provides the vibration to the first touch position and provides no vibration to the second touch position, and driving each of the actuators based on the calculated drive signal and simultaneously controlling the vibration on the panel for each of the touch positions, wherein in the determining of a first touch position and a second touch position, when the touch positions shift in a same direction, a starting touch position with respect to the same shifting direction among the touch positions is calculated, and in the case where the touch positions are kept detected in the shifting and/or in an area in which the touch positions stop shifting, (i) the starting touch position is determined as a first touch position for providing the vibration and (ii) one of the touch positions other than the starting touch position is determined as a second touch position for providing no vibration.

* * * * *